US009713228B2

(12) United States Patent
Reed

(10) Patent No.: US 9,713,228 B2
(45) Date of Patent: Jul. 18, 2017

(54) APPARATUS AND METHOD OF ENERGY EFFICIENT ILLUMINATION USING RECEIVED SIGNALS

(71) Applicant: Express Imaging Systems, LLC, Seattle, WA (US)

(72) Inventor: William G. Reed, Seattle, WA (US)

(73) Assignee: EXPRESS IMAGING SYSTEMS, LLC, Seattle, WA (US)

( * ) Notice: Subject to any disclaimer, the term of this patent is extended or adjusted under 35 U.S.C. 154(b) by 85 days.

(21) Appl. No.: 14/557,275

(22) Filed: Dec. 1, 2014

(65) Prior Publication Data

US 2015/0084520 A1    Mar. 26, 2015

Related U.S. Application Data

(62) Division of application No. 13/085,301, filed on Apr. 12, 2011, now Pat. No. 8,901,825.

(51) Int. Cl.
*H05B 37/02* (2006.01)

(52) U.S. Cl.
CPC ..... *H05B 37/0218* (2013.01); *H05B 37/0227* (2013.01); *H05B 37/0245* (2013.01);
(Continued)

(58) Field of Classification Search
None
See application file for complete search history.

(56) References Cited

U.S. PATENT DOCUMENTS 2,240,050 A    4/1941 Nuebling
2,745,055 A    5/1956 Woerdemann
(Continued)

FOREIGN PATENT DOCUMENTS

CN    103162187 A    6/2013
DE    4001980 A1    8/1990
(Continued)

OTHER PUBLICATIONS

International Search Report and Written Opinion, mailed May 7, 2015, for corresponding International Application No. PCT/US2015/013512, 15 pages.
(Continued)

*Primary Examiner* — Douglas W Owens
*Assistant Examiner* — Srinivas Sathiraju
(74) *Attorney, Agent, or Firm* — Seed Intellectual Property Law Group LLP

(57) ABSTRACT

Illumination sources are turned ON and turned OFF in response to detected levels of illumination in an ambient environment reaching respective thresholds, which may be user set. The detection of these turn ON and turn OFF events is verified, for instance against expected events or conditions for the particular location, date and/or time. An alert or log entry may be generated if a detected event or condition appears to be invalid. For instance, if an amount of illumination in the environment is different than predicted by a threshold amount or if a time that the event occurs or is detected is different than expected or predicted by more than a threshold amount. A level of illumination may be decreased to some non-zero level after a specified time after turn ON, and increased at some specified time before turn OFF. Use of information from external sources (e.g., satellites, cell towers) may allow times to be using local time, including daylight savings if applicable.

41 Claims, 13 Drawing Sheets

(52) U.S. Cl.
CPC .......... *H05B 37/0281* (2013.01); *Y02B 20/42* (2013.01); *Y02B 20/44* (2013.01); *Y02B 20/46* (2013.01)

(56) References Cited

U.S. PATENT DOCUMENTS

| | | | |
|---|---|---|---|
| 3,374,396 A | 3/1968 | Bell et al. | |
| 4,153,927 A | 5/1979 | Owens | |
| 4,237,377 A | 12/1980 | Sansum | |
| 4,663,521 A | 5/1987 | Maile | |
| 5,086,379 A | 2/1992 | Denison et al. | |
| 5,160,202 A | 11/1992 | Légaré | |
| 5,161,107 A | 11/1992 | Mayeaux et al. | |
| 5,230,556 A | 7/1993 | Canty et al. | |
| 5,276,385 A | 1/1994 | Itoh et al. | |
| 5,343,121 A | 8/1994 | Terman et al. | |
| 5,349,505 A | 9/1994 | Poppenheimer | |
| 5,450,302 A | 9/1995 | Maase et al. | |
| 5,561,351 A * | 10/1996 | Vrionis | H05B 41/24 315/111.21 |
| 5,589,741 A | 12/1996 | Terman et al. | |
| 5,808,294 A | 9/1998 | Neumann | |
| 5,838,226 A | 11/1998 | Houggy et al. | |
| 5,869,960 A | 2/1999 | Brand | |
| 5,892,331 A | 4/1999 | Hollaway | |
| 5,892,335 A | 4/1999 | Archer | |
| 5,936,362 A | 8/1999 | Alt et al. | |
| 6,111,739 A | 8/2000 | Wu et al. | |
| 6,149,283 A | 11/2000 | Conway et al. | |
| 6,154,015 A | 11/2000 | Ichiba | |
| 6,160,353 A | 12/2000 | Mancuso | |
| 6,377,191 B1 | 4/2002 | Takubo | |
| 6,612,720 B1 | 9/2003 | Beadle | |
| 6,681,195 B1 | 1/2004 | Poland et al. | |
| 6,746,274 B1 | 6/2004 | Verfuerth | |
| 6,753,842 B1 | 6/2004 | Williams et al. | |
| 6,828,911 B2 | 12/2004 | Jones et al. | |
| 6,841,947 B2 | 1/2005 | Berg-johansen | |
| 6,880,956 B2 | 4/2005 | Zhang | |
| 6,902,292 B2 | 6/2005 | Lai | |
| 6,985,827 B2 | 1/2006 | Williams et al. | |
| 7,019,276 B2 | 3/2006 | Cloutier et al. | |
| 7,066,622 B2 | 6/2006 | Alessio | |
| 7,081,722 B1 | 7/2006 | Huynh et al. | |
| 7,122,976 B1 | 10/2006 | Null et al. | |
| 7,188,967 B2 | 3/2007 | Dalton et al. | |
| 7,190,121 B2 | 3/2007 | Rose et al. | |
| 7,218,056 B1 | 5/2007 | Harwood | |
| 7,239,087 B2 | 7/2007 | Ball | |
| 7,270,441 B2 | 9/2007 | Fiene | |
| 7,281,820 B2 | 10/2007 | Bayat et al. | |
| 7,294,973 B2 | 11/2007 | Takahama et al. | |
| 7,317,403 B2 | 1/2008 | Grootes et al. | |
| 7,330,568 B2 | 2/2008 | Nagaoka et al. | |
| 7,339,323 B2 | 3/2008 | Bucur | |
| 7,339,471 B1 | 3/2008 | Chan et al. | |
| 7,405,524 B2 | 7/2008 | Null et al. | |
| 7,440,280 B2 | 10/2008 | Shuy | |
| 7,468,723 B1 | 12/2008 | Collins | |
| 7,547,113 B2 | 6/2009 | Lee | |
| 7,559,674 B2 | 7/2009 | He et al. | |
| 7,564,198 B2 | 7/2009 | Yamamoto et al. | |
| 7,569,802 B1 | 8/2009 | Mullins | |
| 7,578,596 B2 | 8/2009 | Martin | |
| 7,623,042 B2 * | 11/2009 | Huizenga | H01H 47/24 340/641 |
| 7,638,743 B2 | 12/2009 | Bartol et al. | |
| 7,677,753 B1 | 3/2010 | Wills | |
| 7,688,002 B2 | 3/2010 | Ashdown et al. | |
| 7,688,222 B2 | 3/2010 | Peddie et al. | |
| 7,697,925 B1 | 4/2010 | Wilson et al. | |
| 7,702,135 B2 | 4/2010 | Hill et al. | |
| 7,703,951 B2 | 4/2010 | Piepgras et al. | |
| 7,746,003 B2 | 6/2010 | Verfuerth et al. | |
| D621,410 S | 8/2010 | Verfuerth et al. | |
| D621,411 S | 8/2010 | Verfuerth et al. | |
| 7,798,669 B2 | 9/2010 | Trojanowski et al. | |
| 7,804,200 B2 | 9/2010 | Flaherty | |
| 7,828,463 B1 | 11/2010 | Willis | |
| 7,834,922 B2 | 11/2010 | Kurane | |
| 7,872,423 B2 | 1/2011 | Biery et al. | |
| 7,940,191 B2 | 5/2011 | Hierzer | |
| 7,952,609 B2 | 5/2011 | Simerly et al. | |
| 7,983,817 B2 | 7/2011 | Breed | |
| 8,174,212 B2 | 5/2012 | Tziony et al. | |
| 8,183,797 B2 * | 5/2012 | McKinney | H05B 33/0815 315/247 |
| 8,207,830 B2 | 6/2012 | Rutjes et al. | |
| 8,260,575 B2 | 9/2012 | Walters et al. | |
| 8,290,710 B2 | 10/2012 | Cleland et al. | |
| 8,344,665 B2 | 1/2013 | Verfuerth et al. | |
| 8,376,583 B2 | 2/2013 | Wang et al. | |
| 8,390,475 B2 | 3/2013 | Feroldi | |
| 8,395,329 B2 | 3/2013 | Jutras et al. | |
| 8,427,076 B2 | 4/2013 | Bourquin et al. | |
| 8,436,556 B2 | 5/2013 | Eisele et al. | |
| 8,445,826 B2 | 5/2013 | Verfuerth | |
| 8,457,793 B2 * | 6/2013 | Golding | H05B 37/00 700/275 |
| 8,476,565 B2 | 7/2013 | Verfuerth | |
| 8,547,022 B2 | 10/2013 | Summerford | |
| 8,586,902 B2 | 11/2013 | Verfuerth | |
| 8,604,701 B2 | 12/2013 | Verfuerth et al. | |
| 8,674,608 B2 | 3/2014 | Holland et al. | |
| 8,749,403 B2 | 6/2014 | King et al. | |
| 8,749,635 B2 | 6/2014 | Högasten et al. | |
| 8,764,237 B2 | 7/2014 | Wang et al. | |
| 8,779,340 B2 | 7/2014 | Verfuerth et al. | |
| 8,779,686 B2 | 7/2014 | Jin | |
| 8,866,392 B2 | 10/2014 | Chen | |
| 8,866,582 B2 | 10/2014 | Verfuerth et al. | |
| 8,872,430 B2 | 10/2014 | Yang | |
| 8,884,203 B2 | 11/2014 | Verfuerth et al. | |
| 8,901,825 B2 * | 12/2014 | Reed | H05B 37/0218 315/149 |
| 8,921,751 B2 | 12/2014 | Verfuerth | |
| 8,975,827 B2 * | 3/2015 | Chobot | H05B 37/02 315/291 |
| 8,988,005 B2 | 3/2015 | Jungwirth et al. | |
| 9,002,522 B2 * | 4/2015 | Mohan | H05B 37/0218 700/275 |
| 9,084,310 B2 | 7/2015 | Bedell et al. | |
| 9,107,026 B1 | 8/2015 | Viswanadham et al. | |
| 9,119,270 B2 | 8/2015 | Chen et al. | |
| 9,312,451 B2 | 4/2016 | Reed et al. | |
| 9,357,618 B2 | 5/2016 | Pandharipande et al. | |
| 2002/0084767 A1 | 7/2002 | Arai | |
| 2002/0113192 A1 | 8/2002 | Antila | |
| 2003/0016143 A1 | 1/2003 | Ghazarian | |
| 2003/0184672 A1 | 10/2003 | Wu et al. | |
| 2004/0095772 A1 | 5/2004 | Hoover et al. | |
| 2004/0105264 A1 | 6/2004 | Spero | |
| 2004/0120148 A1 | 6/2004 | Morris et al. | |
| 2004/0192227 A1 | 9/2004 | Beach et al. | |
| 2005/0117344 A1 | 6/2005 | Bucher et al. | |
| 2005/0135101 A1 | 6/2005 | Richmond | |
| 2005/0174762 A1 | 8/2005 | Fogerlic | |
| 2005/0174780 A1 | 8/2005 | Park | |
| 2005/0179404 A1 | 8/2005 | Veskovic et al. | |
| 2005/0231133 A1 | 10/2005 | Lys | |
| 2005/0243022 A1 | 11/2005 | Negru | |
| 2005/0254013 A1 | 11/2005 | Engle et al. | |
| 2006/0001384 A1 | 1/2006 | Tain et al. | |
| 2006/0014118 A1 | 1/2006 | Utama | |
| 2006/0066264 A1 | 3/2006 | Ishigaki et al. | |
| 2006/0098440 A1 | 5/2006 | Allen | |
| 2006/0146652 A1 | 7/2006 | Huizi et al. | |
| 2006/0158130 A1 | 7/2006 | Furukawa | |
| 2006/0202914 A1 | 9/2006 | Ashdown | |
| 2006/0208667 A1 | 9/2006 | Lys et al. | |
| 2006/0259080 A1 | 11/2006 | Vaisnys et al. | |
| 2006/0277823 A1 | 12/2006 | Barnett et al. | |
| 2007/0032990 A1 | 2/2007 | Williams et al. | |
| 2007/0096118 A1 | 5/2007 | Mahalingam et al. | |

(56) References Cited

U.S. PATENT DOCUMENTS

| | | |
|---|---|---|
| 2007/0102033 A1 | 5/2007 | Petrocy |
| 2007/0164689 A1 | 7/2007 | Suzuki |
| 2007/0224461 A1 | 9/2007 | Oh |
| 2007/0225933 A1 | 9/2007 | Shimomura |
| 2007/0247853 A1 | 10/2007 | Dorogi |
| 2007/0279921 A1 | 12/2007 | Alexander et al. |
| 2008/0018261 A1 | 1/2008 | Kastner |
| 2008/0025020 A1 | 1/2008 | Kolb |
| 2008/0043106 A1 | 2/2008 | Hassapis et al. |
| 2008/0062687 A1 | 3/2008 | Behar et al. |
| 2008/0130304 A1 | 6/2008 | Rash et al. |
| 2008/0215279 A1 | 9/2008 | Salsbury et al. |
| 2008/0224623 A1 | 9/2008 | Yu |
| 2008/0232116 A1 | 9/2008 | Kim |
| 2008/0248837 A1 | 10/2008 | Kunkel |
| 2008/0266839 A1 | 10/2008 | Claypool et al. |
| 2008/0271065 A1 | 10/2008 | Buonasera et al. |
| 2009/0046151 A1 | 2/2009 | Nagaoka et al. |
| 2009/0058320 A1 | 3/2009 | Chou et al. |
| 2009/0129067 A1 | 5/2009 | Fan et al. |
| 2009/0153062 A1 | 6/2009 | Guo et al. |
| 2009/0160358 A1 | 6/2009 | Leiderman |
| 2009/0161356 A1 | 6/2009 | Negley et al. |
| 2009/0167203 A1 | 7/2009 | Dahlman et al. |
| 2009/0195162 A1 | 8/2009 | Maurer et al. |
| 2009/0195179 A1 | 8/2009 | Joseph et al. |
| 2009/0230883 A1 | 9/2009 | Haug |
| 2009/0235208 A1 | 9/2009 | Nakayama et al. |
| 2009/0261735 A1 | 10/2009 | Sibalich et al. |
| 2009/0268023 A1 | 10/2009 | Hsieh |
| 2009/0273290 A1 | 11/2009 | Ziegenfuss |
| 2009/0278474 A1 | 11/2009 | Reed et al. |
| 2009/0278479 A1 | 11/2009 | Platner et al. |
| 2009/0284155 A1 | 11/2009 | Reed et al. |
| 2009/0315485 A1 | 12/2009 | Verfuerth et al. |
| 2010/0001652 A1 | 1/2010 | Damsleth |
| 2010/0052557 A1 | 3/2010 | Van Der Veen et al. |
| 2010/0060130 A1 | 3/2010 | Li |
| 2010/0090577 A1 | 4/2010 | Reed et al. |
| 2010/0096460 A1 | 4/2010 | Carlson et al. |
| 2010/0123403 A1 | 5/2010 | Reed |
| 2010/0164406 A1 | 7/2010 | Kost et al. |
| 2010/0171442 A1 | 7/2010 | Draper et al. |
| 2010/0244708 A1 | 9/2010 | Cheung et al. |
| 2010/0246168 A1 | 9/2010 | Verfuerth et al. |
| 2010/0259193 A1 | 10/2010 | Umezawa et al. |
| 2010/0270945 A1 | 10/2010 | Chang et al. |
| 2010/0271802 A1 | 10/2010 | Recker et al. |
| 2010/0277082 A1 | 11/2010 | Reed et al. |
| 2010/0295454 A1 | 11/2010 | Reed |
| 2010/0295455 A1 | 11/2010 | Reed |
| 2010/0295946 A1 | 11/2010 | Reed et al. |
| 2010/0309310 A1 | 12/2010 | Albright |
| 2010/0328946 A1 | 12/2010 | Borkar et al. |
| 2011/0001626 A1 | 1/2011 | Yip et al. |
| 2011/0006703 A1 | 1/2011 | Wu et al. |
| 2011/0026264 A1 | 2/2011 | Reed et al. |
| 2011/0175518 A1 | 7/2011 | Reed et al. |
| 2011/0204845 A1 | 8/2011 | Paparo et al. |
| 2011/0215724 A1* | 9/2011 | Chakravarty .......... H05B 37/02 315/152 |
| 2011/0215731 A1 | 9/2011 | Jeong et al. |
| 2011/0221346 A1 | 9/2011 | Lee et al. |
| 2011/0248812 A1 | 10/2011 | Hu et al. |
| 2011/0251751 A1* | 10/2011 | Knight .................. G07C 5/008 701/31.4 |
| 2011/0282468 A1* | 11/2011 | Ashdown ............... H05B 37/02 700/90 |
| 2011/0310605 A1 | 12/2011 | Renn et al. |
| 2012/0001566 A1* | 1/2012 | Josefowicz ........ H05B 33/0851 315/291 |
| 2012/0019971 A1 | 1/2012 | Flaherty et al. |
| 2012/0038490 A1* | 2/2012 | Verfuerth ........... H05B 37/0272 340/910 |
| 2012/0098439 A1* | 4/2012 | Recker ............... H05B 33/0815 315/152 |
| 2012/0119669 A1 | 5/2012 | Melanson et al. |
| 2012/0119682 A1 | 5/2012 | Warton |
| 2012/0143383 A1 | 6/2012 | Cooperrider et al. |
| 2012/0153854 A1 | 6/2012 | Setomoto et al. |
| 2012/0169053 A1 | 7/2012 | Tchoryk, Jr. et al. |
| 2012/0169239 A1* | 7/2012 | Chen ................. H05B 33/0851 315/152 |
| 2012/0181935 A1 | 7/2012 | Velazquez |
| 2012/0194054 A1 | 8/2012 | Johnston et al. |
| 2012/0209755 A1 | 8/2012 | Verfuerth et al. |
| 2012/0221154 A1 | 8/2012 | Runge |
| 2012/0224363 A1 | 9/2012 | Van De Ven |
| 2012/0230584 A1 | 9/2012 | Kubo et al. |
| 2012/0242254 A1 | 9/2012 | Kim et al. |
| 2012/0262069 A1* | 10/2012 | Reed ................. H05B 37/0218 315/130 |
| 2012/0286770 A1 | 11/2012 | Schröder et al. |
| 2013/0033183 A1 | 2/2013 | Verfuerth et al. |
| 2013/0043792 A1 | 2/2013 | Reed |
| 2013/0049613 A1 | 2/2013 | Reed |
| 2013/0057158 A1 | 3/2013 | Josefowicz et al. |
| 2013/0126715 A1 | 5/2013 | Flaherty |
| 2013/0131882 A1 | 5/2013 | Verfuerth et al. |
| 2013/0141000 A1 | 6/2013 | Wei et al. |
| 2013/0141010 A1 | 6/2013 | Reed et al. |
| 2013/0154488 A1 | 6/2013 | Sadwick et al. |
| 2013/0163243 A1 | 6/2013 | Reed |
| 2013/0193857 A1 | 8/2013 | Tlachac et al. |
| 2013/0235202 A1 | 9/2013 | Nagaoka et al. |
| 2013/0249429 A1 | 9/2013 | Woytowitz et al. |
| 2013/0249479 A1 | 9/2013 | Partovi |
| 2013/0307418 A1 | 11/2013 | Reed |
| 2013/0313982 A1 | 11/2013 | Reed |
| 2013/0340353 A1 | 12/2013 | Whiting et al. |
| 2014/0001961 A1 | 1/2014 | Anderson et al. |
| 2014/0028200 A1 | 1/2014 | Van Wagoner et al. |
| 2014/0070964 A1 | 3/2014 | Rupprath et al. |
| 2014/0078308 A1 | 3/2014 | Verfuerth |
| 2014/0097759 A1 | 4/2014 | Verfuerth et al. |
| 2014/0203714 A1 | 7/2014 | Zhang et al. |
| 2014/0244044 A1 | 8/2014 | Davis et al. |
| 2014/0265894 A1 | 9/2014 | Weaver |
| 2014/0265897 A1 | 9/2014 | Taipale et al. |
| 2014/0313719 A1 | 10/2014 | Wang et al. |
| 2014/0320027 A1 | 10/2014 | Reed |
| 2014/0359078 A1 | 12/2014 | Liu |
| 2015/0015716 A1 | 1/2015 | Reed et al. |
| 2015/0069920 A1 | 3/2015 | Denteneer et al. |
| 2015/0077019 A1 | 3/2015 | Reed et al. |
| 2015/0123563 A1 | 5/2015 | Dahlen |
| 2015/0208479 A1 | 7/2015 | Radermacher et al. |
| 2015/0280782 A1 | 10/2015 | Airbinger et al. |
| 2015/0312983 A1 | 10/2015 | Hu et al. |

FOREIGN PATENT DOCUMENTS

| | | |
|---|---|---|
| EP | 1 734 795 A1 | 12/2006 |
| EP | 2 320 713 A2 | 5/2011 |
| EP | 2 559 937 A1 | 2/2013 |
| EP | 2 629 491 A1 | 8/2013 |
| EP | 1 459 600 B1 | 2/2014 |
| EP | 2 781 138 A1 | 9/2014 |
| FR | 2 883 306 A1 | 9/2006 |
| JP | 6-335241 A | 12/1994 |
| JP | 2001-333420 A | 11/2001 |
| JP | 2004-279668 A | 10/2004 |
| JP | 2004-320024 A | 11/2004 |
| JP | 2004-349065 A | 12/2004 |
| JP | 2005-93171 A | 4/2005 |
| JP | 2005-198238 A | 7/2005 |
| JP | 2005-310997 A | 11/2005 |
| JP | 2006-179672 A | 7/2006 |
| JP | 2006-244711 A | 9/2006 |
| JP | 2008-59811 A | 3/2008 |
| JP | 2008-509538 A | 3/2008 |
| JP | 2008-130523 A | 6/2008 |
| JP | 2008-159483 A | 7/2008 |

(56) References Cited

FOREIGN PATENT DOCUMENTS

| | | |
|---|---|---|
| JP | 2008-177144 A | 7/2008 |
| JP | 2008-529177 A | 7/2008 |
| JP | 2008-535279 A | 8/2008 |
| JP | 2010-504628 A | 2/2010 |
| KR | 2005078403 A | 8/2005 |
| KR | 10-2006-0071869 | 6/2006 |
| KR | 10-2006-0086254 A | 7/2006 |
| KR | 10-2008-0100140 A | 11/2008 |
| KR | 10-2009-0042400 A | 4/2009 |
| KR | 10-0935736 B1 | 1/2010 |
| KR | 20-2010-0007230 U | 7/2010 |
| KR | 10-1001276 B1 | 12/2010 |
| KR | 10-1044224 B1 | 6/2011 |
| KR | 10-1150876 B1 | 5/2012 |
| WO | 02/076068 A1 | 9/2002 |
| WO | 03/056882 A1 | 7/2003 |
| WO | 2005/003625 A1 | 1/2005 |
| WO | 2006/057866 A2 | 6/2006 |
| WO | 2007/023454 A1 | 3/2007 |
| WO | 2007/036873 A2 | 4/2007 |
| WO | 2008/030450 A2 | 3/2008 |
| WO | 2008/034242 A1 | 3/2008 |
| WO | 2009/040703 A2 | 4/2009 |
| WO | WO 2010086757 A1 * 8/2010 ............ H05B 37/02 |
| WO | 2010/133719 A1 | 11/2010 |
| WO | 2011/063302 A2 | 5/2011 |
| WO | 2011/129309 A1 | 10/2011 |
| WO | 2012/006710 A1 | 1/2012 |
| WO | 2012/142115 A2 | 10/2012 |
| WO | 2013/074900 A1 | 5/2013 |
| WO | 2014/018773 A1 | 1/2014 |
| WO | 2014/039683 A1 | 3/2014 |
| WO | 2014/078854 A1 | 5/2014 |

OTHER PUBLICATIONS

Reed et al., "Apparatus and Method for Schedule Based Operation of a Luminaire" Amendment filed Jun. 1, 2015, for U.S. Appl. No. 14/552,274, 14 pages.
Reed et al., "Apparatus and Method for Schedule Based Operation of a Luminaire" Notice of Allowance mailed Jun. 19, 2015, for U.S. Appl. No. 14/552,274, 9 pages.
Reed et al., "Apparatus and Method of Operating a Luminaire," Notice of Allowance mailed Apr. 27, 2015, for U.S. Appl. No. 13/558,191, 8 pages.
Reed et al., "Remotely Adjustable Solid-State Lamp," Amendment filed Apr. 1, 2015, for U.S. Appl. No. 13/875,130, 14 pages.
Reed et al., "Remotely Adjustable Solid-State Lamp," Amendment filed Jul. 20, 2015, for U.S. Appl. No. 13/875,130, 15 pages.
Reed et al., "Remotely Adjustable Solid-State Lamp," Notice of Allowance mailed Aug. 12, 2015, for U.S. Appl. No. 13/875,130, 11 pages.
Reed et al., "Remotely Adjustable Solid-State Lamp," Office Action mailed Apr. 21, 2015, for U.S. Appl. No. 13/875,130, 10 pages.
Reed et al., "Systems and Methods That Employ Object Recognition," Amendment filed May 6, 2015, for U.S. Appl. No. 13/411,321, 21 pages.
Reed et al., "Systems and Methods That Employ Object Recognition," Amendment filed Jul. 7, 2015, for U.S. Appl. No. 13/411,321, 21 pages.
Reed, "Detection and Correction of Faulty Photo Controls in Outdoor Luminaires," U.S. Appl. No. 62/183,505, filed Jun. 23, 2015, 71 pages.
Reed, "Electronic Control to Regulate Power for Solid-State Lighting and Methods Thereof," Notice of Allowance mailed Apr. 23, 2015, for U.S. Appl. No. 12/619,535, 8 pages.
Reed, "Electronic Control to Regulate Power for Solid-State Lighting and Methods Thereof," U.S. Appl. No. 14/806,500, filed Jul. 22, 2015, 52 pages.
Reed, "Luminaire With Ambient Sensing and Autonomous Control Capabilities," Notice of Allowance mailed Aug. 6, 2015, for U.S. Appl. No. 13/786,332, 8 pages.
Reed, "Luminaire With Ambient Sensing and Autonomous Control Capabilities," Office Action mailed May 29, 2015, for U.S. Appl. No. 13/786,332, 7 pages.
Reed, "Luminaire With Ambient Sensing and Autonomous Control Capabilities," Amendment filed Jul. 23, 2015, for U.S. Appl. No. 13/786,332, 17 pages.
Japanese Office Action, dated Jan. 6, 2015, for corresponding Japanese Application No. 2011-536564, 6 pages.
Reed et al., "Apparatus and Method of Operating a Luminaire," Office Action mailed Dec. 22, 2014, for U.S. Appl. No. 13/558,191, 17 pages.
Reed, "Adjustable Output Solid-State Lighting Device," Office Acton mailed Jan. 2, 2015, for U.S. Appl. No. 13/707,123, 24 pages.
Reed, "Electronic Control to Regulate Power for Solid-State Lighting and Methods Thereof," Amendment filed Dec. 15, 2014, for U.S. Appl. No. 12/619,535, 21 pages.
Reed, "Luminaire With Ambient Sensing and Autonomous Control Capabilities," Office Action mailed Dec. 17, 2014, for U.S. Appl. No. 13/786,332, 20 pages.
Extended European Search Report, dated Oct. 15, 2015, for corresponding European Application No. 12825132.9-1802, 5 pages.
Extended European Search Report, dated Sep. 28, 2015, for corresponding European Application No. 12850159.0-1802, 6 pages.
Extended European Search Report dated Oct. 21, 2015, for corresponding EP Application No. 13835001.2-1802, 7 pages.
Extended European Search Report dated Jan. 4, 2016, for corresponding EP Application No. 13823055.2-1802, 7 pages.
International Search Report and Written Opinion, mailed Jan. 13, 2016. For PCT/US2015/053009, 15 pages.
International Search Report and Written Opinion, mailed Feb. 29, 2016, for PCT/US2015/053000, 20 pages.
International Search Report and Written Opinion, mailed Feb. 29, 2016, for PCT/US2015/053006, 21 pages.
Korean Office Action with English Translation, dated Nov. 18, 2015, for corresponding KR Application No. 10-2011-7014088, 14 pages.
Reed et al., "Long-Range Motion Detection for Illumination Control," Office Action mailed Sep. 17, 2015, for U.S. Appl. No. 14/500,512, 17 pages.
Reed et al., "Long-Range Motion Detection for Illumination Control," Amendment filed Dec. 10, 2015, for U.S. Appl. No. 14/500,512, 18 pages.
Reed et al., "Long-Range Motion Detection for Illumination Control," Office Action mailed Mar. 4, 2016, for U.S. Appl. No. 14/500,512, 18 pages.
Reed et al., "Systems and Methods That Employ Object Recognition," Office Action mailed Dec. 7, 2015, for U.S. Appl. No. 13/411,321, 47 pages.
Reed et al., "Systems and Methods That Employ Object Recognition," Amendment filed Mar. 7, 2016, for U.S. Appl. No. 13/411,321, 16 pages.
Reed, "Adjustable Output Solid-State Lighting Device," Office Action mailed Oct. 5, 2015, for U.S. Appl. No. 13/707,123, 24 pages.
Reed, "Adjustable Output Solid-State Lighting Device," Amendment filed Jan. 8, 2016, for U.S. Appl. No. 13/707,123, 11 pages.
Reed, "Adjustable Output Solid-State Lighting Device," Notice of Allowance mailed Feb. 25, 2016, for U.S. Appl. No. 13/707,123, 9 pages.
Reed, "Asset Management System for Outdoor Luminaires," U.S. Appl. No. 14/869,501, filed Sep. 29, 2015, 57 pages.
Reed, "Centralized Control Area Lighting Hours of Illumination," U.S. Appl. No. 14/869,511, filed Sep. 29, 2015, 39 pages.
Reed, "Detection and Correction of Faulty Photo Controls in Outdoor Luminaires," U.S. Appl. No. 14/869,492, filed Sep. 29, 2015, 71 pages.
Reed, "High Efficiency Power Controller for Luminaire," Office Action mailed Sep. 10, 2015, for U.S. Appl. No. 14/546,354, 15 pages.
Reed, "High Efficiency Power Controller for Luminaire," Amendment filed Feb. 9, 2016, for U.S. Appl. No. 14/546,354, 11 pages.
Reed, "Low Power Photocontrol for Luminaire," U.S. Appl. No. 14/994,569, filed Jan. 13, 2016, 36 pages.

(56) References Cited

OTHER PUBLICATIONS

Reed, "Low Power Photocontrol for Luminaire," U.S. Appl. No. 14/844,944, filed Sep. 3, 2015, 45 pages.
Reed et al., "Luminaire With Adjustable Illumination Pattern," U.S. Appl. No. 14/939,856, filed Nov. 12, 2015, 69 pages.
Reed, "Luminaire With Ambient Sensing and Autonomous Control Capabilities," U.S. Appl. No. 14/950,823, filed Nov. 24, 2015, 72 pages.
Reed, "Luminaire With Switch-Mode Converter Power Monitoring," Notice of Allowance mailed Nov. 18, 2015, for U.S. Appl. No. 14/074,166, 9 pages.
Reed, "Solid State Lighting, Drive Circuit and Method of Driving Same," Notice of Allowance Mailed Aug. 4, 2015, for U.S. Appl. No. 13/875,000, 10 pages.
Reed, "Systems, Methods, and Apparatuses for Using a High Current Switching Device as a Logic Level Sensor," Notice of Allowance for U.S. Appl. No. 14/179,737, mailed Nov. 6, 2015, 9 pages.
Extended European Search Report, dated Apr. 11, 2016, for corresponding European Application No. 16152644.7, 8 pages.
Extended European Search Report, dated May 3, 2016, for corresponding European Application No. 12771286.7, 9 pages.
Reed, "Centralized Control of Area Lighting Hours of Illumination," Office Action mailed Mar. 24, 2016 for U.S. Appl. No. 14/869,511, 31 pages.
Reed, "Electronic Control to Regulate Power for Solid-State Lighting and Methods Thereof," Office Action mailed May 9, 2016 for U.S. Appl. No. 14/806,500, 18 pages.
Reed, "High Efficiency Power Controller for Luminaire," Notice of Allowance mailed Apr. 11, 2016, for U.S. Appl. No. 14/546,354, 5 pages.
Reed, "Low Power Photocontrol for Luminaire," Office Action mailed Apr. 27, 2016, for U.S. Appl. No. 14/844,944, 10 pages.
Reed, "Luminaire With Ambient Sensing and Autonomous Control Capabilities," Notice of Allowance mailed May 4, 2016, for U.S. Appl. No. 14/950,823, 10 pages.
Reed, "Solid State Hospitality Lamp," Office Action mailed Apr. 15, 2016, for U.S. Appl. No. 13/973,696, 11 pages.
Korean Office Action with English Translation, dated May 16, 2016, for corresponding KR Application No. 10-2011-7014088, 22 pages.
Reed et al., "Apparatus and Method for Schedule Based Operation of a Luminaire," Amendment filed Jun. 7, 2016, for U.S. Appl. No. 14/552,274, 14 pages.
Reed, "Detection and Correction of Faulty Photo Controls in Outdoor Luminaires," Notice of Allowance mailed May 19, 2016 for U.S. Appl. No. 14/869,492, 9 pages.
Reed, "Low Power Photocontrol for Luminaire," Amendment filed Jun. 13, 2016, for U.S. Appl. No. 14/844,944, 10 pages.
"Lcd Backlight I/O Ports and Power Protection Circuit Design," dated May 2, 2011, retrieved Jun. 10, 2011, retrieved from http://www.chipoy.info/gadgets/lcd-backlight-i-o-ports-and-power-pr . . . , 4 pages.
EE Herald, "Devices to protect High brightness LED from ESD," dated Mar. 16, 2009, retrieved Jun. 10, 2011, retrieved from http://www.eeherald.com/section/new-products/np100779.html, 1 page.
Extended European Search Report, dated Aug. 13, 2014, for corresponding European Application No. 09826926.9, 8 pages.
Fairchild Semiconductor, "LED Application Design Guide Using Half-Bridge LLC Resonant Converter for 100W Street Lighting," AN-9729, Fairchild Semiconductor Corporation, Rev. 1.0.0, Mar. 22, 2011, 17 pages.
Huang, "Designing an LLC Resonant Half-Bridge Power Converter," 2010 Texas Instruments Power Supply Design Seminar, SEM1900, Topic 3, TI Literature Number: SLUP263, Copyright 2010, 2011, Texas Instruments Incorporated, 28 pages.
International Search Report, mailed Jul. 9, 2009, for PCT/US2009/043171, 5 pages.
International Search Report, mailed Jun. 21, 2010, for PCT/US2009/064625, 3 pages.
International Search Report, mailed Dec. 13, 2010, for PCT/US2010/035649, 3 pages.
International Search Report, mailed Dec. 15, 2010, for PCT/US2010/035658, 3 pages.
International Search Report, mailed Dec. 28, 2010, for PCT/US2010/035651, 3 pages.
International Search Report, mailed Sep. 30, 2011, for PCT/US2011/021359, 3 pages.
International Search Report, mailed Oct. 8, 2012, for PCT/US2012/033059, 3 pages.
International Search Report, mailed Jan. 14, 2013, for PCT/US2012/052009, 3 pages.
International Search Report, mailed Feb. 27, 2013, for PCT/US2012/065476, 3 pages.
International Search Report, mailed Nov. 19, 2013, for PCT/US2013/052092, 4 pages.
International Search Report, mailed Dec. 30, 2013, for PCT/US2013/058266, 3 pages.
International Search Report, mailed Feb. 26, 2014, for PCT/US2013/070794, 3 pages.
International Search Report mailed Nov. 11, 2014, for International Application No. PCT/US2014/047867, 3 pages.
Kadirvel et al., "Self-Powered, Ambient Light Sensor Using bq25504," Texas Instruments, Application Report, SLUA629—Jan. 2012, 6 pages.
Littelfuse, "Application Note: Protecting LEDs in Product Designs," 2009, 2 pages.
Panasonic Electronic Components, "LED Lighting Solutions," 2009, 6 pages.
Poplawski, "Exploring Flicker & LEDs," 2010 DOE SSL Market Introduction Workshop, U.S. Department of Energy, Jul. 22, 2010, 16 pages.
Reed et al., "Adjustable Output Solid-State Lamp With Security Features," U.S. Appl. No. 61/561,616, filed Nov. 18, 2011, 33 pages.
Reed et al., "Adjustable Output Solid-State Lamp With Security Features," Office Action mailed Feb. 27, 2014, for U.S. Appl. No. 13/679,687, 11 pages.
Reed et al., "Adjustable Output Solid-State Lamp With Security Features," Amendment filed Jun. 24, 2014, for U.S. Appl. No. 13/679,687, 11 pages.
Reed et al., "Adjustable Output Solid-State Lamp With Security Features," Notice of Allowance mailed Aug. 29, 2014, for U.S. Appl. No. 13/679,687, 9 pages.
Reed et al., "Apparatus and Method for Schedule Based Operation of a Luminaire," U.S. Appl. No. 13/604,327, filed Sep. 5, 2012, 44 pages.
Reed et al., "Apparatus and Method for Schedule Based Operation of a Luminaire," Office Action mailed Mar. 26, 2014, for U.S. Appl. No. 13/604,327, 10 pages.
Reed et al., "Apparatus and Method for Schedule Based Operation of a Luminaire," Amendment filed Jun. 24, 2014, for U.S. Appl. No. 13/604,327, 14 pages.
Reed et al., "Apparatus and Method for Schedule Based Operation of a Luminaire," Notice of Allowance mailed Jul. 7, 2014, for U.S. Appl. No. 13/604,327, 8 pages.
Reed et al., "Apparatus and Method of Operating a Luminaire," U.S. Appl. No. 13/558,191, filed Jul. 25, 2012, 84 pages.
Reed et al., "Apparatus, Method to Change Light Source Color Temperature With Reduced Optical Filtering Losses," U.S. Appl. No. 61/295,519, filed Jan. 15, 2010, 35 pages.
Reed et al., "Apparatus, Method to Change Light Source Color Temperature With Reduced Optical Filtering Losses," U.S. Appl. No. 61/406,490, filed Oct. 25, 2010, 46 pages.
Reed et al., "Apparatus, Method to Enhance Color Contrast in Phosphor-Based Solid State Lights," U.S. Appl. No. 61/534,722, filed Sep. 14, 2011, 53 pages.
Reed et al., "Electrically Isolated Heat Sink for Solid-State Light," U.S. Appl. No. 61/229,435, filed Jul. 29, 2009, 29 pages.
Reed et al., "Gas-Discharge Lamp Replacement," U.S. Appl. No. 61/052,924, filed May 13, 2008, 32 pages.
Reed et al., "Gas-Discharge Lamp Replacement With Passive Cooling," U.S. Appl. No. 61/174,913, filed May 1, 2009, 29 pages.

(56) References Cited

OTHER PUBLICATIONS

Reed et al., "Long-Range Motion Detection for Illumination Control," U.S. Appl. No. 61/180,017, filed May 20, 2009, 32 pages.
Reed et al., "Long-Range Motion Detection for Illumination Control," Office Action mailed Dec. 21, 2012, for U.S. Appl. No. 12/784,080, 26 pages.
Reed et al., "Long-Range Motion Detection for Illumination Control," Amendment filed Apr. 22, 2013, for U.S. Appl. No. 12/784,080, 17 pages.
Reed et al., "Long-Range Motion Detection for Illumination Control," Office Action mailed Jul. 22, 2013, for U.S. Appl. No. 12/784,080, 29 pages.
Reed et al., "Long-Range Motion Detection for Illumination Control," Amendment filed Sep. 27, 2013, for U.S. Appl. No. 12/784,080, 20 pages.
Reed et al., "Long-Range Motion Detection for Illumination Control," Office Action mailed Jan. 30, 2014, for U.S. Appl. No. 12/784,080, 26 pages.
Reed et al., "Long-Range Motion Detection for Illumination Control," Amendment filed Apr. 28, 2014, for U.S. Appl. No. 12/784,080, 20 pages.
Reed et al., "Long-Range Motion Detection for Illumination Control," Notice of Allowance mailed Jun. 20, 2014, for U.S. Appl. No. 12/784,080, 7 pages.
Reed et al., "Low-Profile Pathway Illumination System," U.S. Appl. No. 61/051,619, filed May 8, 2008, 25 pages.
Reed et al., "Low-Profile Pathway Illumination System," Office Action, dated May 5, 2011, for U.S. Appl. No. 12/437,472, 24 pages.
Reed et al., "Low-Profile Pathway Illumination System," Amendment filed Jul. 29, 2011, for U.S. Appl. No. 12/437,472, 19 pages.
Reed et al., "Low-Profile Pathway Illumination System," Notice of Allowance, dated Oct. 14, 2011, for U.S. Appl. No. 12/437,472, 9 pages.
Reed et al., "Remotely Adjustable Solid-State Lamp," U.S. Appl. No. 61/641,781, filed May 2, 2012, 65 pages.
Reed et al., "Remotely Adjustable Solid-State Lamp," U.S. Appl. No. 13/875,130, filed May 1, 2013, 65 pages.
Reed et al., "Systems and Methods That Employ Object Recognition," U.S. Appl. No. 13/411,321, filed Mar. 2, 2012, 51 pages.
Reed et al., "Systems and Methods That Employ Object Recognition," Office Action mailed Aug. 25, 2014, for U.S. Appl. No. 13/411,321, 35 pages.
Reed et al., "Systems and Methods That Employ Object Recognition," Amendment filed Nov. 21, 2014, for U.S. Appl. No. 13/411,321, 20 pages.
Reed et al., "Turbulent Flow Cooling for Electronic Ballast," U.S. Appl. No. 61/088,651, filed Aug. 13, 2008, 23 pages.
Reed, "Adjustable Output Solid-State Lighting Device," U.S. Appl. No. 61/567,308, filed Dec. 6, 2011, 49 pages.
Reed, "Ambient Light Control in Solid State Lamps and Luminaires," U.S. Appl. No. 61/933,733, filed Jan. 30, 2014, 8 pages.
Reed, "Apparatus and Method of Energy Efficient Illumination," Office Action mailed Aug. 28, 2014, for U.S. Appl. No. 14/329,508, 8 pages.
Reed, "Apparatus and Method of Energy Efficient Illumination," Amendment filed Sep. 30, 2014, for U.S. Appl. No. 14/329,508, 18 pages.
Reed, "Apparatus and Method of Energy Efficient Illumination," Notice of Allowance mailed Nov. 5, 2014, for U.S. Appl. No. 14/329,508, 10 pages.
Reed, "Apparatus and Method of Energy Efficient Illumination," U.S. Appl. No. 61/333,983, filed May 12, 2010, 57 pages.
Reed, "Apparatus and Method of Energy Efficient Illumination," Office Action mailed Dec. 5, 2012, for U.S. Appl. No. 12/784,091, 18 pages.
Reed, "Apparatus and Method of Energy Efficient Illumination," Amendment filed Apr. 4, 2013, for U.S. Appl. No. 12/784,091, 15 pages.
Reed, "Apparatus and Method of Energy Efficient Illumination," Office Action mailed Apr. 24, 2013, for U.S. Appl. No. 12/784,091, 12 pages.
Reed, "Apparatus and Method of Energy Efficient Illumination," Amendment filed May 14, 2013, for U.S. Appl. No. 12/784,091, 9 pages.
Reed, "Apparatus and Method of Energy Efficient Illumination," Notice of Allowance mailed May 23, 2013, for U.S. Appl. No. 12/784,091, 6 pages.
Reed, "Apparatus and Method of Energy Efficient Illumination," U.S. Appl. No. 61/346,263, filed May 19, 2010, 67 pages.
Reed, "Apparatus and Method of Energy Efficient Illumination," Office Action mailed Dec. 5, 2012, for U.S. Appl. No. 12/784,093, 13 pages.
Reed, "Apparatus and Method of Energy Efficient Illumination," Amendment filed Apr. 2, 2013, for U.S. Appl. No. 12/784,093, 13 pages.
Reed, "Apparatus and Method of Energy Efficient Illumination," Notice of Allowance mailed Apr. 12, 2013, for U.S. Appl. No. 12/784,093, 9 pages.
Reed, "Apparatus and Method of Energy Efficient Illumination," Office Action mailed Nov. 27, 2013, for U.S. Appl. No. 13/943,537, 8 pages.
Reed, "Apparatus and Method of Energy Efficient Illumination," Notice of Allowance mailed Apr. 11, 2014, for U.S. Appl. No. 13/943,537, 9 pages.
Reed, "Apparatus and Method of Energy Efficient Illumination Using Received Signals," Office Action mailed Oct. 1, 2013, for U.S. Appl. No. 13/085,301, 11 pages.
Reed, "Apparatus and Method of Energy Efficient Illumination Using Received Signals," Amendment filed Jan. 2, 2014, for U.S. Appl. No. 13/085,301, 26 pages.
Reed, "Apparatus and Method of Energy Efficient Illumination Using Received Signals," Office Action mailed Apr. 23, 2014, for U.S. Appl. No. 13/085,301, 12 pages.
Reed, "Apparatus and Method of Energy Efficient Illumination Using Received Signals," Amendment filed Jul. 23, 2014, for U.S. Appl. No. 13/085,301, 12 pages.
Reed, "Apparatus and Method of Energy Efficient Illumination Using Received Signals," Notice of Allowance mailed Jul. 30, 2014, for U.S. Appl. No. 13/085,301, 5 pages.
Reed, "Asset Management System for Outdoor Luminaires," U.S. Appl. No. 62/082,463, filed Nov. 20, 2014, 56 pages.
Reed, "Centralized Control Area Lighting Hours of Illumination," U.S. Appl. No. 62/057,419, filed Sep. 30, 2014, 39 pages.
Reed, "Detection and Correction of Faulty Photo Controls in Outdoor Luminaires," U.S. Appl. No. 62/068,517, filed Oct. 24, 2014, 47 pages.
Reed, "Electronic Control to Regulate Power for Solid-State Lighting and Methods Thereof," U.S. Appl. No. 61/115,438, filed Nov. 17, 2008, 51 pages.
Reed, "Electronic Control to Regulate Power for Solid-State Lighting and Methods Thereof," U.S. Appl. No. 61/154,619, filed Feb. 23, 2009, 62 pages.
Reed, "Electronic Control to Regulate Power for Solid-State Lighting and Methods Thereof," Office Action mailed Feb. 28, 2013, for U.S. Appl. No. 12/619,535, 17 pages.
Reed, "Electronic Control to Regulate Power for Solid-State Lighting and Methods Thereof," Amendment filed May 24, 2013, for U.S. Appl. No. 12/619,535, 21 pages.
Reed, "Electronic Control to Regulate Power for Solid-State Lighting and Methods Thereof," Office Action mailed Jul. 30, 2013, for U.S. Appl. No. 12/619,535, 15 pages.
Reed, "Electronic Control to Regulate Power for Solid-State Lighting and Methods Thereof," Amendment filed Oct. 30, 2013, for U.S. Appl. No. 12/619,535, 5 pages.
Reed, "Electronic Control to Regulate Power for Solid-State Lighting and Methods Thereof," Office Action mailed Mar. 26, 2014, for U.S. Appl. No. 12/619,535, 16 pages.
Reed, "Electronic Control to Regulate Power for Solid-State Lighting and Methods Thereof," Amendment filed May 27, 2014, for U.S. Appl. No. 12/619,535, 22 pages.

(56) References Cited

OTHER PUBLICATIONS

Reed, "Electronic Control to Regulate Power for Solid-State Lighting and Methods Thereof," Office Action mailed Aug. 14, 2014, for U.S. Appl. No. 12/619,535, 16 pages.
Reed, "Electrostatic Discharge Protection for Luminaire," Office Action mailed Mar. 15, 2013, for U.S. Appl. No. 13/212,074, 11 pages.
Reed, "Electrostatic Discharge Protection for Luminaire," Amendment filed Jun. 17, 2013, for U.S. Appl. No. 13/212,074, 11 pages.
Reed, "Electrostatic Discharge Protection for Luminaire," Notice of Allowance mailed Sep. 12, 2013, for U.S. Appl. No. 13/212,074, 6 pages.
Reed, "High Efficiency Power Controller for Luminaire," U.S. Appl. No. 61/905,699, filed Nov. 18, 2013, 5 pages.
Reed, "High Efficiency Power Controller for Luminaire," U.S. Appl. No. 14/546,354, filed Nov. 18, 2014, 33 pages.
Reed, "Luminaire With Ambient Sensing and Autonomous Control Capabilities," U.S. Appl. No. 61/728,150, filed Nov. 19, 2012, 83 pages.
Reed, "Luminaire With Ambient Sensing and Autonomous Control Capabilities," U.S. Appl. No. 13/786,332, filed Mar. 5, 2013, 86 pages.
Reed, "Luminaire With Atmospheric Electrical Activity Detection and Visual Alert Capabilities," U.S. Appl. No. 61/694,159, filed Aug. 28, 2012, 52 pages.
Reed, "Luminaire With Atmospheric Electrical Activity Detection and Visual Alert Capabilities," U.S. Appl. No. 13/786,114, filed Mar. 5, 2013, 52 pages.
Reed, "Luminaire With Atmospheric Electrical Activity Detection and Visual Alert Capabilities," Notice of Allowance mailed Jul. 1, 2014, for U.S. Appl. No. 13/786,114, 9 pages.
Reed, "Luminaire With Switch-Mode Converter Power Monitoring," U.S. Appl. No. 61/723,675, filed Nov. 7, 2012, 73 pages.
Reed, "Luminaire With Switch-Mode Converter Power Monitoring," U.S. Appl. No. 14/074,166, filed Nov. 7, 2013, 73 pages.
Reed, "Photocontrol for Luminaire Consumes Very Low Power," U.S. Appl. No. 61/849,841, filed Jul. 24, 2013, 41 pages.
Reed, "Photocontrol for Luminaire Consumes Very Low Power," U.S. Appl. No. 14/158,630, filed Jan. 17, 2014, 71 pages.
Reed, "Resonant Network for Reduction of Flicker Perception in Solid State Lighting Systems," U.S. Appl. No. 61/527,029, filed Aug. 24, 2011, 41 pages.
Reed, "Resonant Network for Reduction of Flicker Perception in Solid State Lighting Systems," Notice of Allowance mailed Sep. 30, 2013, for U.S. Appl. No. 13/592,590, 9 pages.
Reed, "Solid State Hospitality Lamp," U.S. Appl. No. 61/692,619, filed Aug. 23, 2012, 32 pages.
Reed, "Solid State Hospitality Lamp," U.S. Appl. No. 13/973,696, filed Aug. 22, 2013, 32 pages.
Reed, "Solid State Lighting, Drive Circuit and Method of Driving Same," U.S. Appl. No. 61/640,963, filed May 1, 2012, 24 pages.
Reed, "Systems, Methods, and Apparatuses for Using a High Current Switching Device as a Logic Level Sensor," U.S. Appl. No. 61/764,395, filed Feb. 13, 2013, 48 pages.
Reed, "Systems, Methods, and Apparatuses for Using a High Current Switching Device as a Logic Level Sensor," U.S. Appl. No. 14/179,737, filed Feb. 13, 2014, 48 pages.
Renesas Electronics, "Zener Diodes for Surge Absorption—Applications of high-intensity LED," Apr. 2010, 1 page.
Renn et al., "Solid State Lighting Device and Method Employing Heat Exchanger Thermally Coupled Circuit Board," U.S. Appl. No. 61/357,421, filed Jun. 22, 2010, 49 pages.
Tyco Electronics, "Circuit Protection," retrieved Jun. 10, 2011, retrieved from http://www.tycoelectronics.com/en/products/circuit-protection.html, 2 pages.
Written Opinion, mailed Jul. 9, 2009 for PCT/US2009/043171, 8 pages.
Written Opinion, mailed Jun. 21, 2010 for PCT/US2009/064625, 5 pages.
Written Opinion, mailed Dec. 13, 2010 for PCT/US2010/035649, 4 pages.
Written Opinion, mailed Dec. 15, 2010 for PCT/US2010/035658, 3 pages.
Written Opinion, mailed Dec. 28, 2010 for PCT/US2010/035651, 3 pages.
Written Opinion, mailed Sep. 30, 2011 for PCT/US2011/021359, 4 pages.
Written Opinion, mailed Oct. 8, 2012 for PCT/US2012/033059, 3 pages.
Written Opinion, mailed Jan. 14, 2013 for PCT/US2012/052009, 5 pages.
Written Opinion, mailed Feb. 27, 2013, for PCT/US2012/065476, 8 pages.
Written Opinion, mailed Nov. 19, 2013 for PCT/US2013/052092, 7 pages.
Written Opinion, mailed Dec. 30, 2013 for PCT/US2013/058266, 8 pages.
Written Opinion, mailed Feb. 26, 2014, for PCT/US2013/070794, 10 pages.
Written Opinion mailed Nov. 11, 2014, for International Application No. PCT/US2014/047867, 5 pages.
Extended European Search Report dated Aug. 25, 2016, for corresponding EP Application No. 14843796.5-1757, 6 pages.
Reed et al., "Apparatus and Method for Schedule Based Operation of a Luminaire" Amendment filed Dec. 7, 2016, for U.S. Appl. No. 14/552,274, 11 pages.
Reed et al., "Systems and Methods That Employ Object Recognition," Notice of Allowance mailed Jul. 18, 2016, for U.S. Appl. No. 13/411,321, 15 pages.
Reed, "Asset Management System for Outdoor Luminaires," Office Action mailed Aug. 31, 2016, for U.S. Appl. No. 14/869,501, 15 pages.
Reed, "Electronic Control to Regulate Power for Solid-State Lighting and Methods Thereof," Office Action mailed Sep. 6, 2016 for U.S. Appl. No. 14/806,500, 18 pages.
Reed, "Low Power Photocontrol for Luminaire," Notice of Allowance mailed Aug. 24, 2016, for U.S. Appl. No. 14/844,944, 7 pages.
Notice of Allowance mailed Oct. 5, 2016 for U.S. Appl. No. 14/869,511, Reed, "Centralized Control of Area Lighting Hours of Illumination," 8 pages.
Office Action mailed Jan. 18, 2017 for U.S. Appl. No. 14/806,500, Reed, "Electronic Control to Regulate Power for Solid-State Lighting and Methods Thereof," 18 pages.
Office Action mailed Sep. 19, 2016, for U.S. Appl. No. 14/552,274, Reed et al., "Apparatus and Method for Schedule Based Operation of a Luminaire," 9 pages.
Reed, "Electronic Control to Regulate Power for Solid-State Lighting and Methods Thereof," Response Under 37 CFR 1.116 filed Dec. 5, 2016 for U.S. Appl. No. 14/806,500, 12 pages.
Vendetti et al., "Systems and Methods for Controlling Luminaire Wireless Network Using Smart Appliance," U.S. Appl. No. 62/458,970, filed Feb. 14, 2017, 50 pages.
Reed et al., "Apparatus and Method for Schedule Based Operations of a Luminaire," Office Action mailed Mar. 2, 2015, for U.S. Appl. No. 14/552,274, 7 pages.
Reed et al., "Apparatus and Method of Operating a Luminaire," Amendment filed Mar. 19, 2015, for U.S. Appl. No. 13/558,191, 20 pages.
Reed et al., "Systems and Methods That Employ Object Recognition," Office Action mailed Feb. 9, 2015, for U.S. Appl. No. 13/411,321, 40 pages.
Reed, "Adjustable Output Solid-State Lighting Device," Amendment filed Apr. 2, 2015, for U.S. Appl. No. 13/707,123, 14 pages.
Reed, "Ambient Light Control in Solid State Lamps and Luminaires," Amendment filed Jan. 29, 2015, for U.S. Appl. No. 14/609,168, 12 pages.
Reed, "Ambient Light Control in Solid State Lamps and Luminaires," U.S. Appl. No. 14/609,168, filed Jan. 29, 2015, 77 pages.
Reed, "Low Power Photocontrol for Luminaire," U.S. Appl. No. 62/137,666, filed Mar. 24, 2015, 36 pages.
Reed, "Luminaire With Adjustable Illumination Pattern," U.S. Appl. No. 62/114,826, filed Feb. 11, 2015, 68 pages.

(56) References Cited

OTHER PUBLICATIONS

Reed, "Luminaire With Ambient Sensing and Autonomous Control Capabilities," Amendment filed Mar. 13, 2015, for U.S. Appl. No. 13/786,332, 23 pages.
Reed, "Electronic Control to Regulate Power for Solid-State Lighting and Methods Thereof," Amendment filed May 23, 2017 for U.S. Appl. No. 14/806,500, 11 pages.
Reed, "High Reliability Photocontrol Controls With 0 to 10 Volt Dimming Signal Line and Method," U.S. Appl. No. 62/507,730, filed May 17, 2017, 17 pages.
Vendetti et al., "Luminaire Dimming Module Uses 3 Contact Nema Photocontrol Socket," U.S. Appl. No. 15/496,985, filed Apr. 25, 2017, 23 pages.

* cited by examiner

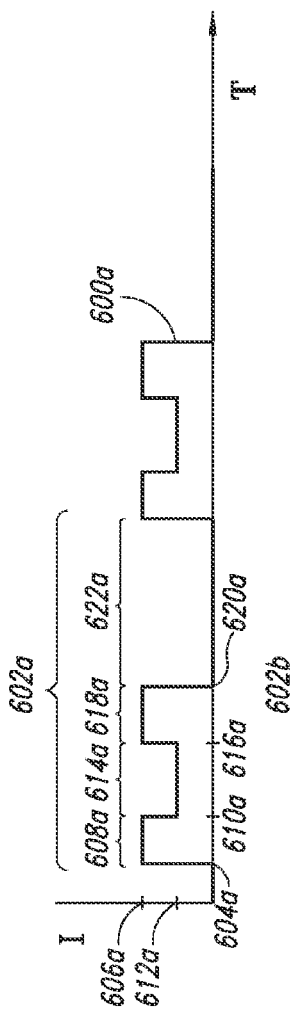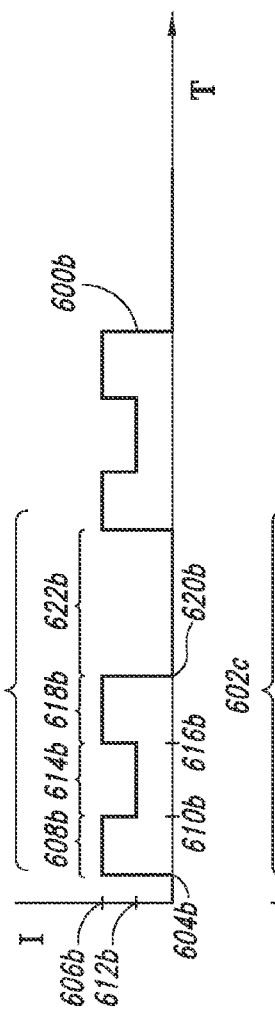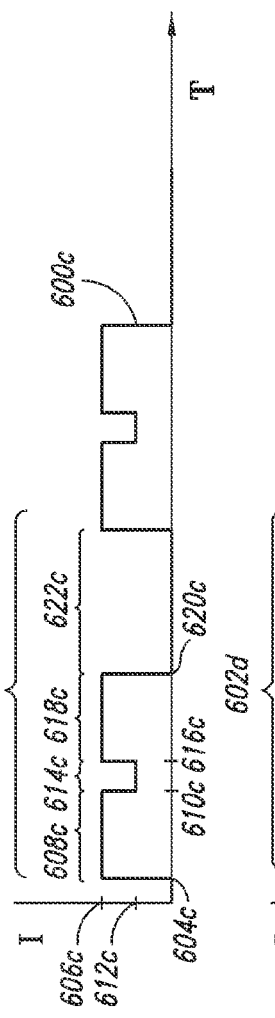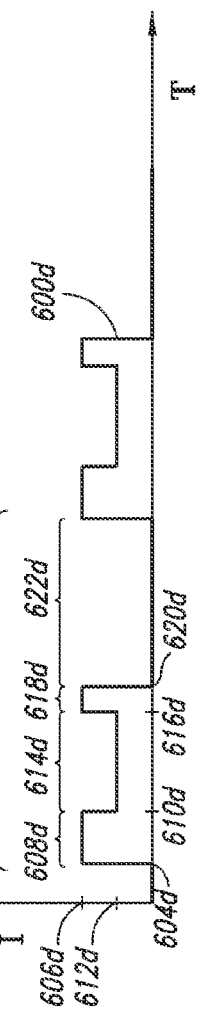
FIG. 6A
FIG. 6B
FIG. 6C
FIG. 6D

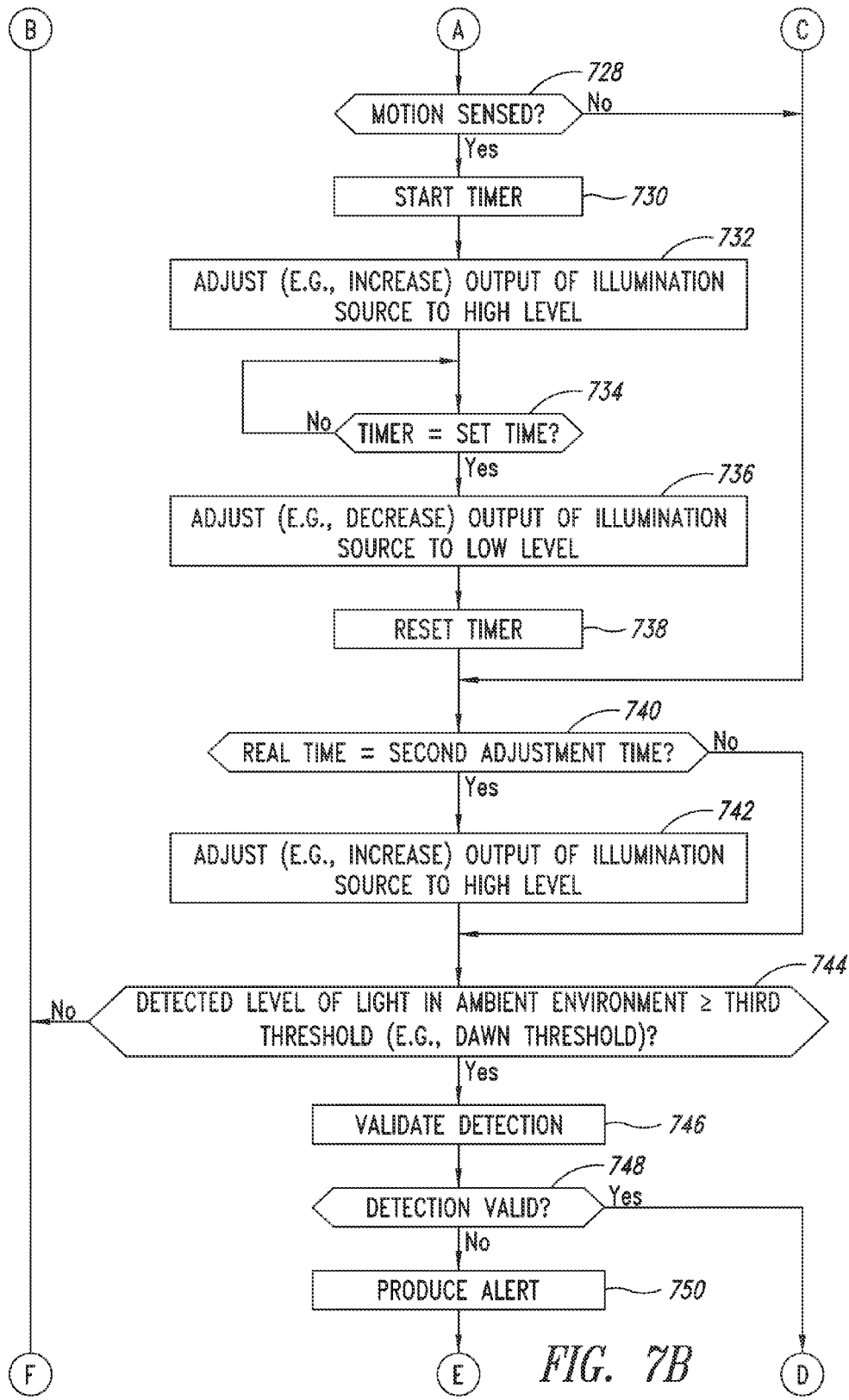

APPARATUS AND METHOD OF ENERGY EFFICIENT ILLUMINATION USING RECEIVED SIGNALS

BACKGROUND

Technical Field

The present disclosure generally relates to the field of illumination devices and, more particularly, to control of illumination to improve energy efficiency and security.

Description of the Related Art

Energy conservation has become of ever increasing importance. Efficient use of energy can result in a variety of benefits, including financial benefits such as cost savings and environmental benefits such as preservation of natural resources and reduction in "green house" (e.g., $CO_2$) gas emissions.

Residential, commercial, and street lighting which illuminate interior and exterior spaces consume a significant amount of energy. Conventional lighting devices or luminaires exist in a broad range of designs, suitable for various uses. Lighting devices employ a variety of conventional light sources, for example incandescent lamps, florescent lamps such as high-intensity discharge (HID) lamps (e.g., mercury vapor lamps, high-pressure sodium lamps, metal halide lamps).

There appear to be two primary approaches to reducing energy consumption associated with lighting systems. One approach employs higher efficiency light sources. The other approach selectively provides light only when needed.

Use of higher efficiency light sources may, for instance, include replacing incandescent lamps with florescent lamps or even with solid-state light sources (e.g., light emitting diodes (LEDs), organic LEDs (OLEDs), polymer LEDs (PLEDs)) to increase energy efficiency. In some instances, these higher efficiency light sources may present a number of problems. For example, florescent and HID light sources take a relatively long time after being turned ON to achieve their full rated level of output light or illumination. Such light sources also typically have a high energy consumption during warm-up. Many of higher efficiency light sources emit light with a low color rendering index (CRI). For reference, sunlight has a CRI of 100 and represents "ideal light" which contains a continuous spectrum of visible radiation. Low CRI light is less pleasing to the human eye. Surfaces illuminate with low CRI light may not be perceived in their "true" color. Low CRI light makes it more difficult to discern details, often requiring a higher level of output light or illumination to discern details that would otherwise be discernable in high CRI light. Further, higher efficiency light sources may require additional circuitry (e.g., ballasts) and/or thermal management techniques (e.g., passive or active cooling).

Providing illumination only when needed can be achieved manually by a user of the lighting system, or automatically by a control mechanism. Automatic control mechanisms generally fall into two broad categories, timers and environmental sensors. Timer based control mechanisms turn light sources ON and OFF based on time. The times are typically user configurable. Such relies on the user to account for changes in length of day light which may occur throughout a year. Very often, timer based control mechanisms are set once and never updated. Environmental sensor based control mechanisms sense light or illumination level and/or motion or proximity. Light or illumination level based control mechanisms are commonly referred to dusk-to-dawn sensors. Dusk-to-dawn light or illumination level based control mechanisms turn the light sources ON when a level of light or illumination in an environment falls below a turn ON threshold, and turn the light sources OFF when the level of light or illumination exceeds a turn OFF threshold. Light or illumination level based control subsystems advantageously automatically accommodate changes in length of day light throughout the year. Motion or proximity based control mechanisms (e.g., passive infrared sensor based) turn light sources ON when motion or proximity is detected. Motion or proximity based control mechanisms turn light sources OFF after some period of time if no motion or proximity is detected during that period of time. Sensitivity of such motion or proximity based control mechanisms is typically user configurable, as is the duration between turn ON and turn OFF. However, motion or proximity based control mechanisms have limited range (e.g., 10 meters), limiting the number of applications in which such may be effectively employed. Motion or proximity based control mechanisms may also be ineffective where the ambient air temperature or temperature of an object is close to that of the trigger temperature (e.g., temperature of human body). Some lighting control mechanisms employ both light or illumination level based and motion or proximity based techniques. Such lighting control mechanisms turn light sources ON only if motion is detected while the level of light or illumination in the environment is below the turn ON threshold. Thus, the motion or proximity sensing is active only between dusk and dawn.

Sometimes these approaches are incompatible with each other. For example, the relatively long time for florescent light sources to produce full output hinders the effective use of such light sources with motion or proximity based control mechanisms. Further, many control mechanisms are built into the luminaire. Such makes it difficult or even impossible to modify operation of the control mechanism beyond some simple user settings (e.g., sensitivity, duration between turn ON and turn OFF).

New approaches to improving the energy efficiency of lighting systems are desirable.

BRIEF SUMMARY

As previously explained, lighting systems which use dusk-to-dawn control mechanisms typically provides light at a continuous, relatively high, level from dusk to dawn. The exception to such appears to be when motion or proximity based sensing is included in such a control mechanism. In many instances, a high level of lighting or illumination is not necessary throughout the entire period. For instance, in retail business or corporate office parking lots high levels of light or illumination are typically only useful into the late evening hours (e.g., 10 PM or 11 PM) and early morning hours (e.g., 4 AM or 5 AM). High level lighting or illumination between the late evening and early morning hours provide little benefit. A lower level of light or illumination during such hours may achieve sufficient illumination for some desired purpose (e.g., security), while reducing energy consumption. Such may useful with a simple dusk-to-dawn control mechanism. Use of a low level lighting or illumination during such hours may also make practical use of relatively slow warm up light sources with motion or proximity based control mechanisms since the illumination sources may only need to be warmed up from an already turned ON, but reduced output state, instead of warming up from an OFF state.

Illumination systems may be used in secured environments or in situations where security is important. Thus, it would be particular advantageous if the lighting control mechanism of the illumination system is designed to handle unintentional conditions, for example the failure of a component such as an ambient light sensor. It would also be particularly advantageous if the lighting control mechanism of the illumination system is designed to handle intentional tampering, for example tampering in the form of shining focused light on a light sensor in an attempt to prevent illumination of a surrounding area by the lighting system. It would additionally be advantageous if the lighting control system continued to operate as programmed even if a component failed, for example even if a light sensor failed. It may further be advantageous if the lighting control mechanism did not require extensive training, learning or adjustment to the existing ambient environmental conditions. For instance, it would be advantageous if the lighting control system could quickly adjust to the daily cycle (e.g., solar noon, solar midnight) for the particular geographic location at which the illumination system is installed, without the need to first obtain samples over multiple days or even weeks. It would be very advantageous if the lighting control system automatically determined the local time of day for a particular geographic location at which the illumination system is installed. Such would allow lighting levels to be programmed to coincide with local activity such a retail store business hours. Such local activity typically occurs at fixed hours, regardless of the length of day or seasonal changes in length of day. For example, it would be advantageous to turn the lighting system to a high level of illumination at dusk, and reduce the output to a lower level of illumination at a fixed time of day (e.g., 10 PM local time).

A method of operating an illumination system including at least one light source and at least one controller may be summarized as from time-to-time, detecting a level of light in an ambient environment; comparing by the at least one controller the detected level of light in the ambient environment to a first threshold; validating by the at least one controller a result of the comparison of the detected level of light in the ambient environment to the first threshold with respect to at least one expected condition; and adjusting by the at least one controller an output of the at least one light source if both the detected level of light in the ambient environment at least satisfies the first threshold and the result of the comparison is valid with respect to the at least one expected condition.

Validating a result of the comparison of the detected level of light in the ambient environment to the first threshold with respect to at least one expected condition may include: comparing by the at least one controller an actual time at which the detected level of light satisfied the first threshold to an expected time when the level of light is predicted to satisfy the first threshold for at least one of a current location or a current date; determining that the result of the comparison is valid if the actual time at which the detected level of light satisfied the first threshold is within a second threshold of the expected time when the level of light is predicted to satisfy the first threshold for the at least one of the current location or the current date; or determining that the result of the comparison is invalid if the actual time at which the detected level of light satisfied the first threshold is not within the second threshold of the expected time when the level of light is predicted to satisfy the first threshold for the at least one of the current location or the current date. Validating a result of the comparison of the detected level of light in the ambient environment to the first threshold with respect to at least one expected condition may include: comparing by the at least one controller the detected level of light in the ambient environment to an expected level of light for at least one of a current location, a current date or a current time; determining that the result of the comparison is valid if the detected level of light in the ambient environment is within a second threshold of the expected level of light for the at least one of the current location, the current date or the current time; or determining that the result of the comparison is invalid if the detected level of light in the ambient environment is not within the second threshold of the expected level of light for the at least one of the current location, the current date or the current time. Comparing the detected level of light in the ambient environment to an expected level of light for at least one of a current time or a current location may include comparing the detected level of light to a value indicative of the expected level of light for the current time at the current location. From time-to-time, detecting a level of light in an ambient environment may include continuously receiving a signal at the at least one controller from an ambient light sensor which is part of the illumination system, the signal indicative of the level of light in the ambient environment. The method may further include receiving a location signal at the at least one controller indicative of the current location; and determining by the at least one controller at least one of an excepted level of light or an expected time at which the level of light is predicted to satisfy the first threshold based on the current location identified by the location signal. The method may further include receiving a time signal at the at least one controller indicative of the current time. Receiving a location signal indicative of the current location may include receiving the location signal from a global positioning system receiver. Receiving a location signal indicative of the current location may include receiving the signal from at least one cellular communications system receiver. Adjusting an output of the at least one light source if both the detected level of light in the ambient environment at least satisfies the first threshold and the result of the comparison is valid with respect to the at least one expected condition may include turning the at least one light source ON if both the detected level of light in the ambient environment is equal or less than a turn ON threshold and an actual time at which the detected level of light satisfied the first threshold is within a second threshold of the expected time when the level of light is predicted to satisfy the first threshold for the at least one of the current location or the current date. Adjusting an output of the at least one light source if both the detected level of light in the ambient environment at least satisfies the first threshold and the result of the comparison is valid with respect to the at least one expected condition may include turning the at least one light source ON if both the detected level of light in the ambient environment is equal or less than a turn ON threshold and the detected level of light in the ambient environment is within the second threshold of the expected level of light for the current time at the current location. Adjusting an output of the at least one light source if both the detected level of light in the ambient environment at least satisfies the first threshold and the result of the comparison is valid with respect to the at least one expected condition may include turning the at least one light source OFF if both the detected level of light in the ambient environment is equal or greater than a turn OFF threshold and an actual time at which the detected level of light satisfied the first threshold is within a second threshold of the expected time when the level of light is predicted to satisfy the first threshold for the at least one of the current location or the current date. Adjusting an output of the at least one light source if both the detected level of light in the ambient environment at least satisfies the first threshold and the result of the comparison is valid with respect to the at least one expected condition may include turning the at least one light source OFF if both the detected level of light in the ambient environment is equal or greater than a turn OFF threshold and the detected level of light in the ambient environment is within the second threshold of the expected level of light for the current time at the current location. The method may further include reducing the output of the at least one light source to a non-zero level when a first real time in a daily cycle is reached. The method may further include detecting motion at least proximate an area being illuminated; and in response to the detecting motion, temporally increasing the output of the at least one light source. The method may further include increasing the output of the at least one light source when a second real time in the daily cycle is reached. When the result of the comparison is invalid with respect to the at least one expected condition, the method may further include repeating at least the reducing and the increasing the output of the at least one light source when the first and the second real times, respectively, are reached for a number of additional daily cycles. Repeating at least the reducing and the increasing of the output of the at least one light source when the first and the second real times, respectively, are reached for a number of additional daily cycles, may further include turning ON the at least one light source at a time in a daily cycle that corresponds to dusk and turning OFF the at least one light source at a time in the daily cycle that corresponds to dawn. The method may further include producing by the controller an external notification if the detected level of light in the ambient environment is not within the second threshold of the expected level of light for the current time at the current location. The method may further include in response to determining that the result of the comparison is invalid, causing the output of the at least one light source to be at least proximate a highest level of the at least one light source.

A system to control illumination may be summarized as including at least one controller that: from time-to-time, receives a signal indicative of a level of light in an ambient environment; compares the detected level of light in the ambient environment to an expected level of light for at least one of a current time or a current location; compares the detected level of light in the ambient environment to a first threshold; validates a result of the comparison of the detected level of light in the ambient environment to the first threshold with respect to at least one expected condition; and adjusts an output of the at least one light source if both the detected level of light in the ambient environment at least satisfies the first threshold and the result of the comparison is valid with respect to the at least one expected condition.

To validate a result of the comparison of the detected level of light in the ambient environment to the first threshold with respect to at least one expected condition, the at least one controller may: compare an actual time at which the detected level of light satisfied the first threshold to an expected time when the level of light is predicted to satisfy the first threshold for at least one of a current location or a current date; determine that the result of the comparison is valid if the actual time at which the detected level of light satisfied the first threshold is within a second threshold of the expected time when the level of light is predicted to satisfy the first threshold for the at least one of the current location or the current date; or determine that the result of the comparison is invalid if the actual time at which the detected level of light satisfied the first threshold is not within the second threshold of the expected time when the level of light is predicted to satisfy the first threshold for the at least one of the current location or the current date. To validate a result of the comparison of the detected level of light in the ambient environment to the first threshold with respect to at least one expected condition, the at least one controller may: compare the detected level of light in the ambient environment to an expected level of light for at least one of a current location, a current date or a current time; determine that the result of the comparison is valid if the detected level of light in the ambient environment is within a second threshold of the expected level of light for the at least one of the current location, the current date or the current time; or determine that the result of the comparison is invalid if the detected level of light in the ambient environment is not within the second threshold of the expected level of light for the at least one of the current location, the current date or the current time. The at least one controller may compare the detected level of light to a value indicative of an expected level of light for the current time at the current location. The system may further include an ambient light sensor, wherein the at least one controller continuously receives a signal from the ambient light sensor, the signal indicative of the level of light in the ambient environment. The at least one controller may further receive a location signal indicative of the current location; and may determine at least one of an excepted level of light or an expected time at which the level of light is predicted to satisfy the first threshold based at least in part on the current location identified by the location signal. The at least one controller may further receive a time signal indicative of the current time. The system may further include an antenna; and a global positioning receiver communicatively coupled to the antenna to receive a global positioning signal from a number of global positioning system satellites, wherein the at least one controller is communicatively coupled to the global positioning receiver to receive the location signal indicative of the current location. The system may further include an antenna; and a cellular communications receiver communicatively coupled to the antenna to receive a cellular communications signal from a number of cellular communications antennas, wherein the at least one controller is communicatively coupled to the cellular communications receiver to receive the location signal indicative of the current location. To adjust the output of the at least one light source if both the detected level of light in the ambient environment at least satisfies the first threshold and the result of the comparison is valid with respect to the at least one expected condition the at least one controller may turn the at least one light source ON if both the detected level of light in the ambient environment is equal or less than a turn ON threshold and an actual time at which the detected level of light satisfied the first threshold is within a second threshold of the expected time when the level of light is predicted to satisfy the first threshold for the at least one of the current location or the current date. To adjust the output of the at least one light source if both the detected level of light in the ambient environment at least satisfies the first threshold and the result of the comparison is valid with respect to the at least one expected condition the at least one controller may turn the at least one light source ON if both the detected level of light in the ambient environment is equal or less than a turn ON threshold and the detected level of light in the ambient environment is within the second threshold of the expected level of light for the current time at the current location. To adjust the output of the at least one light source if both the detected level of light in the ambient environment at least satisfies the first threshold and the result of the comparison is valid with respect to the at least one expected condition the at least one controller may turn the at least one light source OFF if both the detected level of light in the ambient environment is equal or greater than a turn OFF threshold and an actual time at which the detected level of light satisfied the first threshold is within a second threshold of the expected time when the level of light is predicted to satisfy the first threshold for the at least one of the current location or the current date. To adjust the output of the at least one light source if both the detected level of light in the ambient environment at least satisfies the first threshold and the result of the comparison is valid with respect to the at least one expected condition the at least one controller may turn the at least one light source OFF if both the detected level of light in the ambient environment is equal or greater than a turn OFF threshold and the detected level of light in the ambient environment is within the second threshold of the expected level of light for the current time at the current location. The at least one controller may reduce the output of the at least one light source to a non-zero level when a first real time in a daily cycle is reached. The at least one controller may further detect motion at least proximate an area being illuminated; and in response to the detection of motion, temporally increase the output of the at least one light source. The at least one controller may further increase the output of the at least one light source when a second real time in the daily cycle is reached. When the result of the comparison is invalid with respect to the at least one expected condition, the at least one controller may further repeat at least the reducing and the increasing the output of the at least one light source when the first and the second real times, respectively, are reached for a number of additional daily cycles. Repeating at least the reducing and the increasing of the output of the at least one light source when the first and the second real times, respectively, are reached for a number of additional daily cycles may further include turning ON the at least one light source at a time in a daily cycle that corresponds to dusk and turning OFF the at least one light source at a time in the daily cycle that corresponds to dawn. The at least one controller may further produce an external notification if the detected level of light in the ambient environment is not within the second threshold of the expected level of light for the current time at the current location. When the result of the comparison is invalid with respect to the at least one expected condition the at least one controller may cause the output of the at least one light source to be at least proximate a highest level of the at least one light source. The system may further include the at least one light source.

A method of operating an illumination system including at least one light source may be summarized as including determining by a controller, an expected ambient environment illumination condition for a current location at a defined date and time; comparing by the controller, an actual ambient environment illumination condition detected in the ambient environment at the current location with the determined expected ambient environment illumination condition; and in response to determining an existence of a difference between the actual ambient environment illumination condition and the determined expected ambient environment illumination condition, producing by the controller, at least one of a notification or a record indicative of an aberrant event.

The method may further include receiving a location signal by the controller, the location signal indicative of a current location of the illumination system. Determining by a controller an expected ambient environment illumination condition may include determining at least one of an expected time of dusk or an expected time of dawn for the current location based at least in part on the current location indicated by the location signal. Determining by a controller, an expected ambient environment illumination condition may include determining an expected level of illumination in the ambient environment for the current location at a defined time based at least in part on the current location indicated by the location signal. Receiving a location signal by the controller may include receiving a location signal from a global positioning system receiver. Receiving a location signal by the controller may include receiving a location signal from a cellular communications system receiver. The method may further include detecting a level of light in an ambient environment via an ambient light sensor. Producing a notification may include transmitting a signal externally from the illumination system. Producing a notification may include illuminating a warning indicator of the illumination system. Comparing an actual ambient environment illumination condition with the determined expected ambient environment illumination condition may include at least one of: determining whether a detected level of illumination in the ambient environment is below an expected level of illumination by more than the defined threshold or determining whether the detected level of illumination in the ambient environment is above the expected level of illumination by more than the defined threshold. Comparing an actual ambient environment illumination condition with the determined expected ambient environment illumination condition may include at least one of: determining whether an actual time when dusk in the ambient environment is detected is within a first threshold of an expected time at which dusk was predicted or whether an actual time when dawn in the ambient environment is detected is within a second threshold of an expected time at which dawn was predicted.

A system to control illumination may be summarized as including at least one controller that: determines an expected ambient environment illumination condition for a current location at a defined date and time; compares an actual ambient environment illumination condition detected in the ambient environment a the current location with the determined expected ambient environment illumination condition; and in response to a determination that a difference between the actual ambient environmental illumination condition and the determined expected ambient environment illumination condition, produces at least one of a notification or a record indicative of an aberrant event.

The at least one controller may receive a location signal, the location signal indicative of a current location of the illumination system. To determine an expected ambient environment illumination condition the at least one controller may determine at least one of an expected time of dusk or an expected time of dawn for the current location based at least in part on the current location indicated by the location signal. The at least one controller may determine an expected level of illumination in the ambient environment based at least in part on the current location indicated by the location signal. The system may further include an antenna; and a global positioning receiver communicatively coupled to the antenna to receive a global positioning signal from a number of global positioning system satellites, wherein the at least one controller is communicatively coupled to the global positioning receiver to receive the location signal indicative of the current location. The system may further include an antenna; and a cellular communications receiver communicatively coupled to the antenna to receive a cellular communications signal from a number of cellular communications antennas, wherein the at least one controller is communicatively coupled to the cellular communications receiver to receive the location signal indicative of the current location. The system may further include an ambient light sensor communicatively coupled to provide ambient light level signals to the at least one controller. The at least one controller may produce the notification as a signal transmit externally from the system. The at least one controller may produce the notification as an illuminated warning indicator of the system. To compare an actual ambient environment illumination condition with the determined expected ambient environment illumination condition the at least one controller may determine at least one of whether a detected level of illumination in the ambient environment is below an expected level of illumination by more than the defined threshold or whether the detected level of illumination in the ambient environment is above the expected level of illumination by more than the defined threshold. To compare an actual ambient environment illumination condition with the determined expected ambient environment illumination condition the at least one controller may determine whether an actual time when dusk in the ambient environment is detected is within a first threshold of an expected time at which dusk was predicted or whether an actual time when dawn in the ambient environment is detected is within a second threshold of an expected time at which dawn was predicted. The system may further include at least one light source; and wherein the at least one controller adjusts a level of illumination produced by the at least one light source.

A method of operating an illumination system including at least one light source may be summarized as including receiving a signal by a controller from an external source, the signal indicative of at least one of a current location of the illumination system, a current date or a current time; and controlling a level of illumination produced by the at least one light source based at least in part on at least one of the current location of the illumination system, the current date or the current time.

Receiving a signal by the controller may include receiving a signal via a global positioning system receiver from at least one global positioning satellite. The method may further include determining by a controller, an expected level of illumination in an ambient environment based at least in part on at least one of the current location of the illumination system, the current date or the current time; comparing by the controller, a detected level of illumination in the ambient environment with the determined expected level of illumination in the ambient environment; and in response to determining an existence of a difference between the detected level of illumination in the ambient environment and the determined expected level of illumination in the ambient environment which exceeds a defined threshold, producing by the controller, at least one of a notification or a record indicative of the existence. The method may further include determining by a controller, an expected time of at least one of dusk or dawn based at least in part on at least one of the current location of the illumination system, the current date or the current time; comparing by the controller, a detected occurrence of at least one of dusk or dawn in the ambient environment with the determined expected time of at least one of dusk or dawn; and in response to determining an existence of a difference between the detected occurrence of at least one of dusk or dawn and the determined expected time of at least one of dusk or dawn which exceeds a defined threshold, producing by the controller, at least one of a notification or a record indicative of an aberrant condition.

A system to control illumination may be summarized as including at least one antenna; at least one receiver communicatively coupled to the at least one antenna to receive signals from an external source, the signals indicative of at least one of a current location of the illumination system, a current date or a current time; and at least one controller communicatively coupled to the at least one receiver to receive information therefrom, and which controls a level of illumination produced by the at least one light source based at least in part on at least one of the current location of the illumination system, the current date or the current time.

The at least one receiver may be a global positioning receiver communicatively coupled to the antenna to receive a number of global positioning signals from a number of global positioning system satellites. The at least one controller may: determine an expected level of illumination in the ambient environment based at least in part on the current location, the current date or the current time; compare a detected level of illumination in the ambient environment with the determined expected level of illumination in the ambient environment; and in response to determining an existence of a difference between the detected level of illumination in the ambient environment and the determined expected level of illumination in the ambient environment which exceeds a defined threshold, produce at least one of a notification or a record indicative of an aberrant condition. The at least one controller may: determine an expected time of at least one of dusk or dawn based at least in part on at least one of the current location of the illumination system, the current date or the current time; compare a detected occurrence of at least one of dusk or dawn in the ambient environment with the determined expected time of at least one of dusk or dawn; and in response to a determination that an existence of a difference between the detected occurrence of at least one of dusk or dawn and the determined expected time of at least one of dusk or dawn which exceeds a defined threshold, produce at least one of a notification or a record indicative of an aberrant condition.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 6A is a graph showing a level of illumination or output versus time over two daily cycles during a first part of a year, according to another non-limiting illustrated embodiment.

FIG. 6B is a graph showing a level of illumination or output versus time over two daily cycles during a second part of a year where there is less daylight in a daily cycle.

FIG. 6C is a graph showing a level of illumination or output versus time over two daily cycles during the first part of a year, according to another non-limiting illustrated embodiment where a dusk sensing threshold is set to be reached earlier while a dawn sensing threshold is set to be reached later in the daily cycle.

FIG. 6D is a graph showing a level of illumination or output versus time over two daily cycles during the first part of a year, according to another non-limiting illustrated embodiment the dusk and dawn sensing thresholds are set such as to produce uneven durations of high intensity illumination.

FIGS. 7A-7C are a flow diagram showing a high level method of operating an illumination system to provide illumination in an energy efficient manner, according to one non-limiting illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with luminaires and imaging devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Additionally, the terms lighting and illumination are used herein interchangeably. For instance, the phrases "level of illumination" or "level of light output" have the same meanings. Also instance, the phrases "illumination source" and "light source" have the same meanings.

The headings and Abstract of the Disclosure provided herein are for convenience only and do not interpret the scope or meaning of the embodiments.

Figure 1:
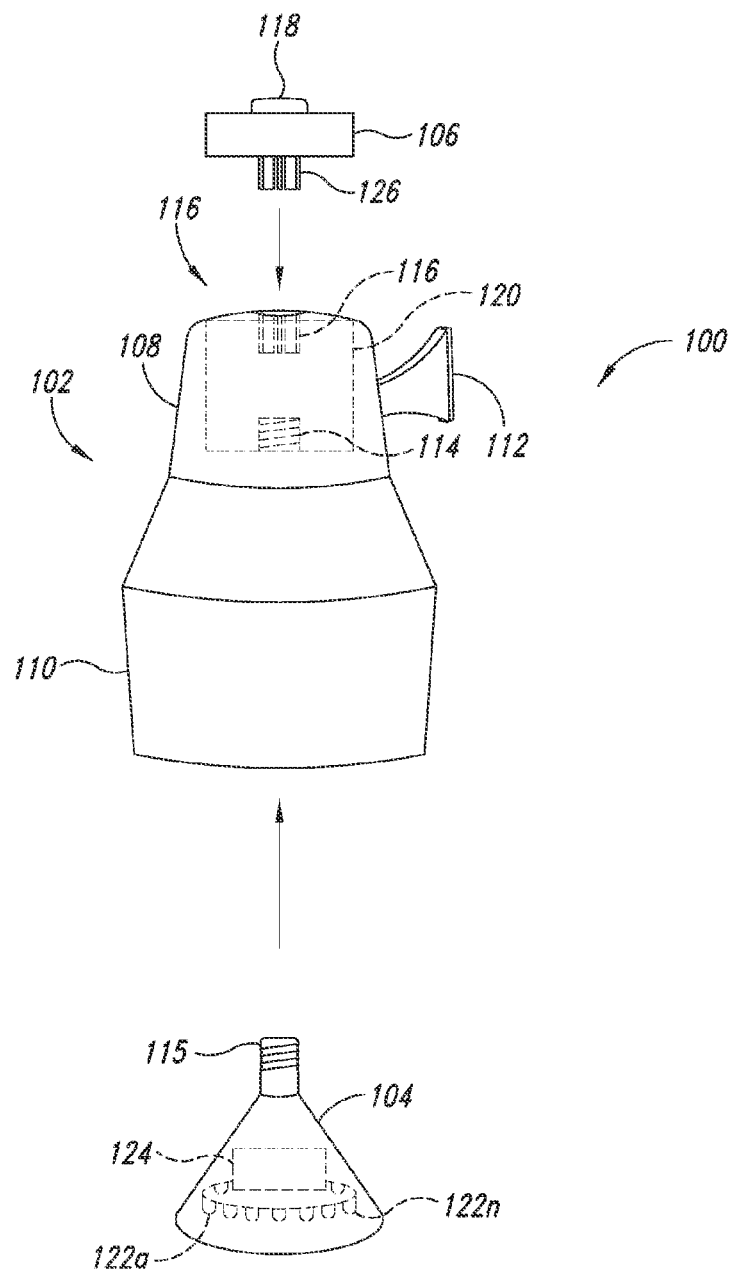
FIG. 1 is a partially exploded isometric diagram showing a conventional luminaire, light source and a retrofit control subsystem selectively attachable in place of the legacy dusk to dawn sensor, according to one non-limiting illustrated embodiment.

FIG. 1 shows an illumination system 100 according to one non-limiting illustrated embodiment. The illumination system 100 includes a conventional luminaire 102, at least one illumination or light source 104, and a retrofit control subsystem 106.

The luminaire 102 may take any of a variety of forms. For example, the luminaire 102 may include a housing 108, a shade 110 and optionally a bracket 112 to allow the luminaire 102 to be hung from a structure. The shade 110 may be transparent or translucent or may be opaque. The luminaire 102 may include a socket, for instance a threaded socket or receptacle 114, sized to removably or interchangeably receive a base 115 of the light source 104 and wiring (not shown in FIG. 1) to provide power to the light source 104 from an external source of electrical power, such as AC mains. As previously noted, such luminaires 102 are conventional and commercially available from a large variety of sources.

The luminaire 102 may also include a socket 116 or other coupler to allow removable physical and electrical mounting of a dusk-to-dawn sensor. Standard NEMA compliant luminaires typically include such a sensor accommodating socket 116, to allow dusk-to-dawn sensors to be easily replaced. The socket 116 may be positioned to allow the dusk-to-dawn sensor to be favorably positioned to have an unimpeded field-of-view. For example, the socket 116 may be positioned on top of the housing 108 such that a sensor mounted thereto generally faces skyward. While illustrated as threaded, other types of sockets, receptacles or couplers may be employed.

The luminaire 102 may include a luminaire control circuit 120. Typically, the luminaire control circuit 120 is configured to turn the light source 104 ON when a level of light detected by a sensor mounted via the socket 116 is below a turn ON threshold and to turn the light source 104 OFF when the level of light detected by the sensor is above a turn OFF threshold. The turn ON and turn OFF thresholds may, or may not, be equal to one another.

The light source 104 may take a variety of forms. The light source may include one or more distinct light bulbs, lights or light emitters 122a-122n (only two called out in FIG. 1). For example, the light source 104 may take the form of one or more incandescent light bulbs. Also for example, the light source 104 may take the form of one or more florescent light bulbs such as HID light bulbs or lights, one or more arc lamps, or one or more gas-discharge lamps. Advantageously, the light source 104 may take the form of one or more solid state light sources, for instance an array of LEDs, OLEDs or PLEDs. While illustrated as a bulb, the light sources do not necessarily have to be enclosed in a bulb structure. For example, the light sources may take the form of one-, two-, or even three-dimensional arrays of individual LEDs or strings of LEDs. Where appropriate, the light source 104 may also include a ballast 124, for example an electronic ballast.

The retrofit control subsystem 106 is selectively attachable, mountable or coupleable to the luminaire 102 and luminaire control circuit 102, and hence to the light source 104. In particular, the retrofit control subsystem 106 includes a base 126 sized to be received in the sensor receiving socket or receptacle 116 of the luminaire 102. Typically, the base 126 will have a three contact plug which allows the base 126 to be removably or detachably received by the socket or receptacle 116 of the luminaire 102. The socket 114 and base 126 provide both physical coupling between the luminaire 102 and the retrofit control system 106 and electrical coupling between the luminaire control circuit 120 and the retrofit control system 106.

The retrofit control subsystem 106 includes at least one sensor 118 (e.g., photosensor, cadmium sulfide cell, photodiode, phototransistor, ambient light sensor integrated circuit) that is responsive to a level (e.g., energy or intensity) of light or illumination in the environment (e.g., daylight or ambient light). The sensor 118 may be positioned to minimize an effect of the light source 104 on the sensor 118. For example, the sensor 118 may be positioned on be on top of the housing 108 when the retrofit control subsystem 106 is mounted via the sensor receiving socket 118.

The retrofit control subsystem 106 also includes electrical circuitry, electronics, software and/or firmware that adjusts an illumination level downward at a time after the light source is turned ON and adjusts the illumination level upward at a time preceding the light source being turned OFF. Such provides lighting at relatively high levels when illumination is typically most useful, while providing lighting at reduced levels when illumination is not typically useful, thereby reducing energy usage. The electrical circuitry, electronics, software and/or firmware may also verify that detected levels of light are within some defined threshold(s) of expected levels of light for a given location, date and/or time. Alternatively, the electrical circuitry, electronics, software and/or firmware may also verify that a time at which an event or condition (e.g., dusk, dawn) is detected is within some defined threshold(s) of expected time at which the event or condition was predicted to occur for a given location, date and/or time. Such validation of levels or time may allow detection of aberrations such as unintentional component failures or interference or even intentional tampering or interference with the luminaire, and automatic notification or alerts regarding the detection of such aberrations. Such may also allow operation to continued, even if an aberrant condition occurs. The electrical circuitry, electronics, software and/or firmware may automatically determine a current location of the luminaire, current date and/or current time, based at least in part on signals received from an external source (e.g., global positioning satellites, cellular communications base stations, WiFi sources). Such may advantageously reduce, or even eliminate, the need for training or adaptive learning over multiple daily cycles, and produce more accurate responses than could be produced using training or adaptive learning based approaches.

Such is possible via a retrofit to existing luminaires. Such may avoid the drawbacks associated with motion or proximity based control, such as the limited range of motion or proximity sensors and lack of sensitivity of such sensors in warm climates. As described in more detail below, the retrofit control subsystem 106 may monitor the local time of day and location from received data, and advantageously employ such in controlling the light source 104. Such can automatically accommodate seasonal changes in the length of daylight or night.

Figure 2:
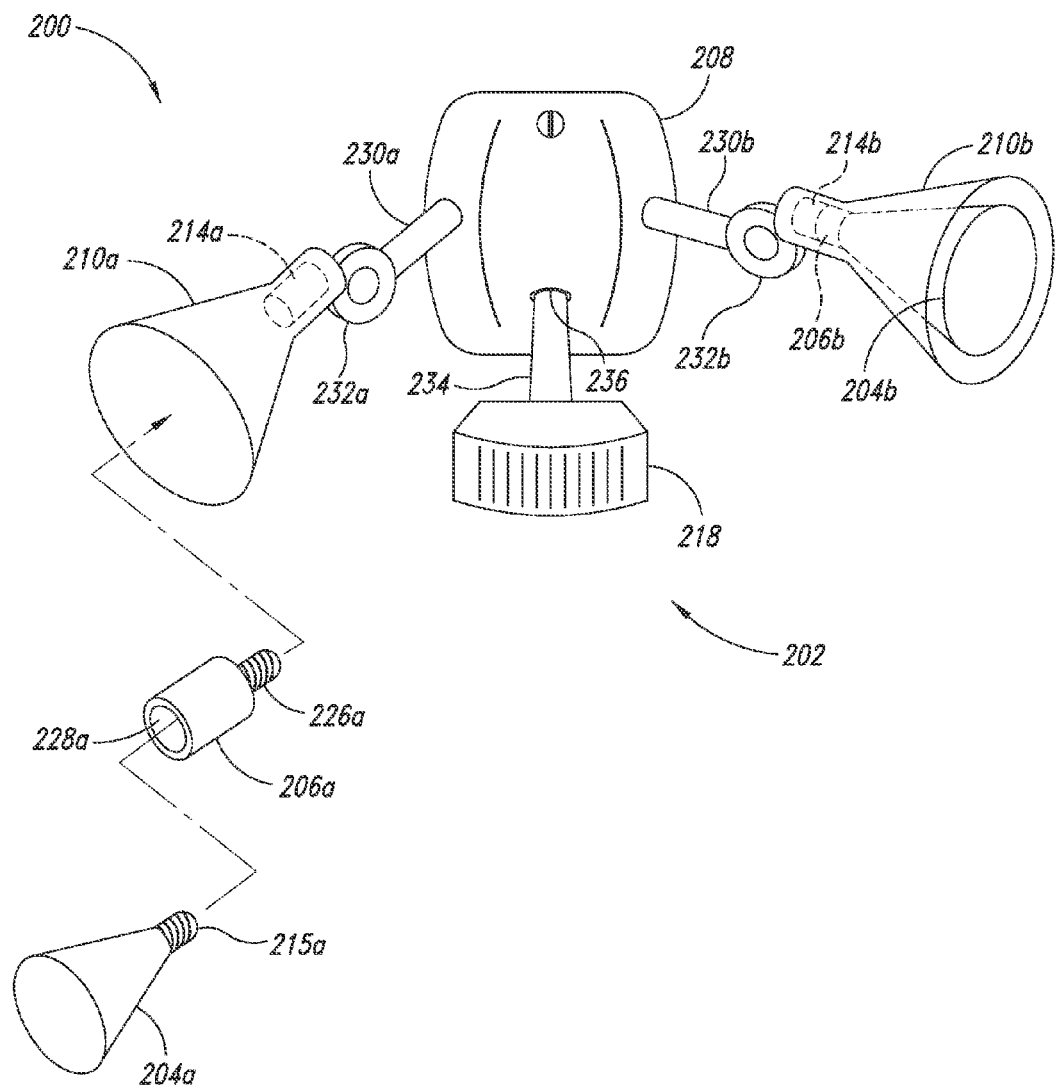
FIG. 2 is a partially exploded isometric diagram showing a conventional luminaire, conventional light sources and a retrofit control subsystem selectively attachable between the luminaire and light source, according to another non-limiting illustrated embodiment.

FIG. 2 shows an illumination system 200 according to another non-limiting illustrated embodiment. The illumination system 200 includes a conventional luminaire 202, illumination or light sources 204a, 204b, and retrofit control subsystems 206a, 206b (only one visible in FIG. 2).

The luminaire 202 may take any of a variety of forms. For example, the luminaire 202 may include a housing 208, two shades 210a, 210b, and at least one optical sensor 218. The housing 208 allows the luminaire 202 to be hung from a structure. The shades 210a, 210b each include a respective socket or receptacle 214a, 214b sized to receive a base 215a (only one visible in FIG. 2) of the light source 204a, 204b. The shades 210a, 210b may be supported from the housing 208 by respective articulated arms 230a, 230b. The arms 230a, 230b may include one or more joints 232a, 232b to provide multiple degrees of freedom which allows the shades 210a, 210b and respective light sources 204a, 204b to be positioned and oriented in any desired manner. The optical sensor 218 may be supported from the housing 208 by an arm 234, for example via a ball joint 236. Such may allow the optical sensor 218 to be positioned and oriented with respect to the housing 208 and any structure to which the housing is mounted. As previously noted, such luminaires 202 are conventional and commercially available from a large variety of sources.

Luminaires 202 of this type typically have a control mechanism that implements both dusk-to-dawn and motion or proximity based control. Thus, the control mechanism relies on signals from the optical sensor to implement motion or proximity sensing only during a period after a level of light or illumination in the environment has fallen below a turn ON threshold (e.g., 10 Lux) and before the level of illuminations exceeds a turn OFF threshold (e.g., 30 Lux). The control mechanism will turn the light sources 204a, 204b ON for a period of time in response to the detection of motion between dusk and dawn, turning the light sources 204a, 204b OFF after the period of time.

Respective retrofit control subsystems 206a, 206b are selectively attachable or coupleable between the sockets or receptacles 214a, 214b of the luminaire 202 and the bases 215a of the light sources 204a, 204b to provide an interface therebetween. In particular, the retrofit control subsystems 206a, 206b include a base 226a (only one visible in FIG. 2) sized to be received in the sockets or receptacles 214a, 214b of the luminaire 202. Typically, the base 226a will have a thread which allows the base 226a to be threadedly removably or detachably received by the socket or receptacle 214a, 241b of the luminaire 202. The socket 214a, 214b and base 214a provide both physical and electrical coupling between the luminaire 202 and the respective retrofit control system 206a, 206b. The retrofit control subsystems 206a, 206b also include a socket or receptacle 228a (only one visible in FIG. 2) sized to receive the base 215a of the light source 204a, 204b. Typically, the socket or receptacle 228a has a thread which allows the base 215a of the light source 204 to be threadedly removably or detachably received by the socket or receptacle 228a. The socket 228a and base 215a provide both physical and electrical coupling between the retrofit control subsystem 206a, 206b and the respective light source 204a, 204b.

As discussed above, the retrofit control subsystems 206a, 206b include electrical circuitry, electronics, software and/or firmware that adjust an illumination level downward (i.e., decrease) at a time after the light source is turned ON and adjust the illumination level upward (i.e., increase) at a time preceding the light source being turned OFF. Such provides lighting at relatively high levels when illumination is typically most useful, while providing lighting at reduced levels when illumination is not typically useful, thereby reducing energy usage. The electrical circuitry, electronics, software and/or firmware may also verify that detected levels of light are within some defined threshold(s) of expected levels of light for a given location, date and/or time. Such may allow detection of aberrations such as unintentional component failures or unintentional interference with, or even intentional tampering or interference with, the luminaire, and automatic notification or alerts regarding the detection of such aberrations. Such may also allow operation to continued, even if an aberrant condition occurs. The electrical circuitry, electronics, software and/or firmware may automatically determine a current location of the luminaire, current date and/or current time, based at least in part on signals received from an external source (e.g., global positioning satellites, cellular communications base stations, WiFi sources). Such may advantageously reduce, or even eliminate, the need for training or adaptive learning over multiple daily cycles, and produce more accurate responses than could be produced using training or adaptive learning based approaches.

Such is possible via a retrofit to existing luminaires. Such may avoid the drawbacks associated with motion or proximity based control, such as the limited range of motion or proximity sensors and lack of sensitivity of such sensors in warm climates. As described in more detail below, the retrofit control subsystem 206a, 206b may monitor the local time of day and location from received data, and advantageously employ such in controlling the light source 204a, 204b. Such can automatically accommodate seasonal changes in the length of daylight or night.

Figure 3:
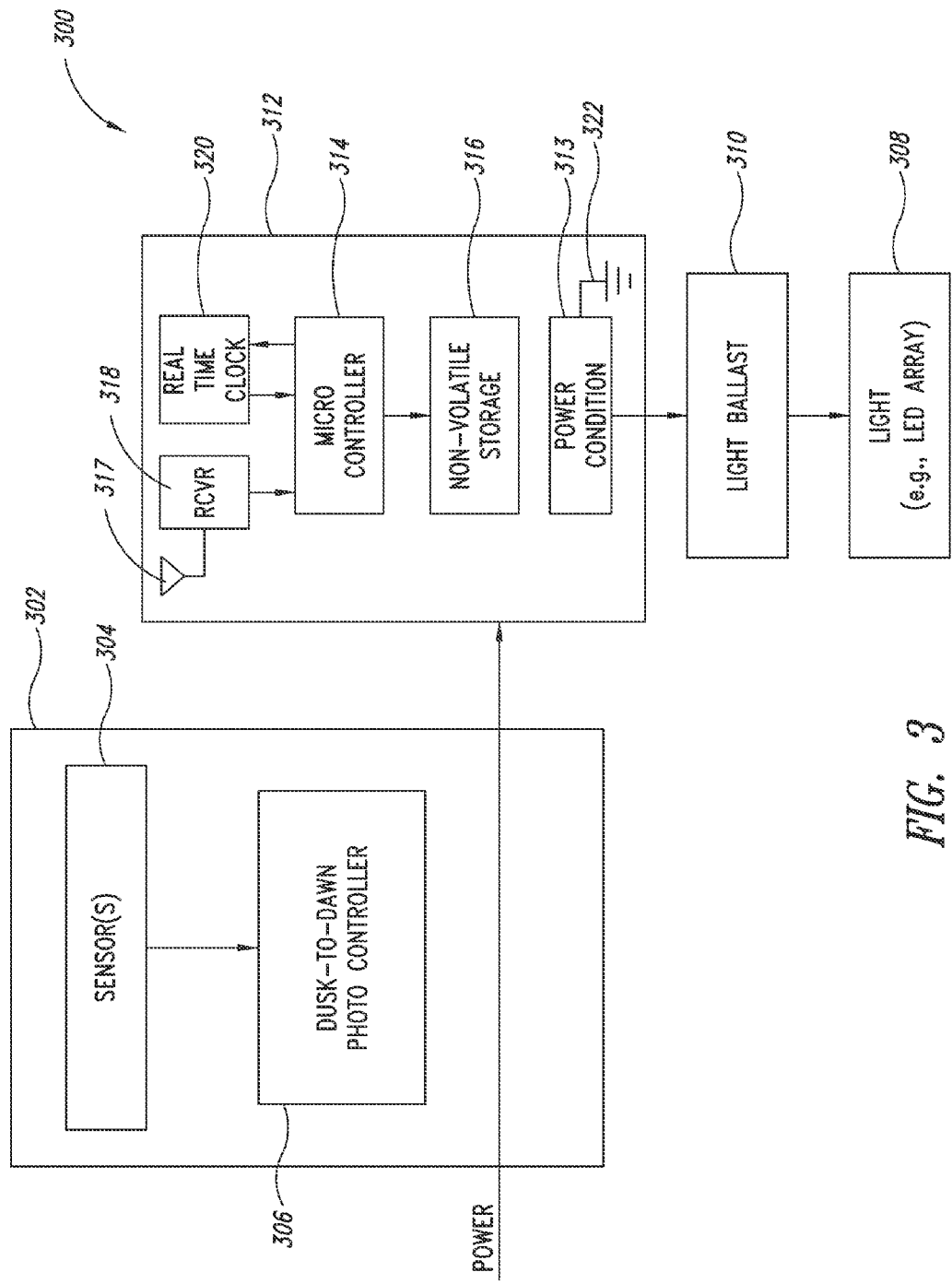
FIG. 3 is a schematic diagram showing a conventional luminaire with optical sensor(s) and a dusk-to-dawn control mechanism, a light source and a retrofit control subsystem, according to one non-limiting illustrated embodiment.

FIG. 3 schematically illustrates an illumination system 300, according to one non-limiting illustrated embodiment.

The illumination system 300 may employ a conventional luminaire 302, for example identical or similar to those illustrated in FIGS. 1 and 2. The luminaire 302 may include an optical sensor 304 and a control mechanism 306. The optical sensor 304 can take any variety of forms, including light sensitive or light responsive photosensors, cadmium sulfide cells, photodiodes, phototransistors, ambient light sensor integrated circuits currently commercially available. The control mechanism 306 may be an analog circuit, digital circuit or may include both analog and digital circuit components, as well as software or firmware instructions executable by one or more processors, for instance microprocessors, digital signal processors, programmable gate arrays or application specific integrated circuits. Again, a conventional commercially available luminaire with an integral control mechanism may be employed.

The illumination system 300 may include at least one illumination or light source 308, for example identical or similar to those discussed with reference to FIG. 1. In particular, the illumination system 300 may employ a light source 308 that includes an array of solid-state light sources or emitters, such as LEDs, OLEDs or PLEDs. The illumination system 300 may include a ballast 310 for the light source 308. The ballast 310 may be an integral or unitary part of the light source 308, or may be a separate discrete component therefrom.

As previously explained, the control mechanism 306 may take the form of a dusk-to-dawn photo control mechanism configured to turn the light source(s) 308 ON when the sensor 304 senses a level of illumination or light in the environment that is at or below a turn ON threshold. The control mechanism 306 may be configured to turn the light source(s) 308 OFF when the sensor 304 senses a level of light in the environment that is at or above a turn OFF threshold. While the turn ON and turn OFF thresholds could be equivalent, such would likely produce undesirable oscillation. Hence, some separation should be maintained between the turn ON and turn OFF thresholds. For example, the turn ON threshold may equal 10 LUX while the turn OFF threshold may equal 30 LUX.

The illumination system 300 may include one more retrofit control subsystems 312. The retrofit control subsystem 312 may be identical or similar to the retrofit control subsystem 106, 206 (FIGS. 1 and 2). The retrofit control subsystem 312 may, for example, include a microcontroller 314 and one or more non-volatile storage media 316 communicatively coupled to the microcontroller 314. The microcontroller 314 may take any of a variety of forms, for example a microprocessor, programmable gate array (PGA), application specific integrated circuit (ASIC), etc. The non-volatile storage media 316 may take any of a variety of forms, for example electrically erasable programmable read only memories (EEPROMs), flash memories, etc.

The retrofit control subsystem 312 may additionally include one or more antennas (only one illustrated) 317 and one or more receivers 318 (only one illustrated) communicatively coupled to at least one of the antennas 317 and to the microcontroller 314. The antenna 317 may be internal to the retrofit control subsystem 312 or may be electrically coupled to the retrofit control subsystem 312 such that the antenna may be extended to an outer side of the shade 110, 210a, 210b (FIGS. 1 and 2). The receiver 318 may also be positioned within the retrofit control subsystem 312. The receivers 318 may take a variety of forms for example a global positioning system (GPS) receiver, a cellular communications system receiver, a wireless telecommunications receiver (e.g., WiFi), a landline transceiver, or a radio (e.g., AM, FM, Satellite) receiver. The receiver 318 may provide information to the retrofit control subsystem 312, such as information which is indicative of a current location of the illumination system, and/or information that is indicative of a current date, and/or time of day. As will be discussed in more detail below, the retrofit control subsystem 312 may use information from the receiver 318 to determine an expected level of light in the ambient environment, for example, to calibrate the dusk-to-dawn controller 306 and/or to implement security features to the illumination system 300.

The retrofit control subsystem 312 is electrically coupled to the control mechanism 306 of the luminaire 302, for example via a socket and base. The components of the retrofit control subsystem 312 may receive power via this coupling or a standalone power source may be included. The retrofit control subsystem 312 may include power supply circuitry 313 that rectifies, steps down a voltage and otherwise transforms or conditions supplied electrical power to a form suitable to power the microcontroller 314, non-volatile storage media 316 and/or other components of the retrofit control subsystem 312.

While the retrofit control subsystem 312 is illustrated as being coupled between the luminaire 302 and light source 308, some embodiments may employ one or more relays (not illustrated) to provide electrical power to the light source 308 from the luminaire 302. The retrofit control subsystem 312 may employ a conventional light dimmer circuit to control light level output by the light source 308. Alternatively or additionally, a network link to a programmable lamp controller may be employed. Alternatively or additionally, an analog voltage applied to a dimmable lamp controller may be employed, or a resistor switched into a dimming input of a dimmable lamp controller. Alternatively or additionally, the retrofit control subsystem may use one or more switches (e.g., contact switches, relays, transistors, triacs) to switch in or out individual or groups of light emitters that make up one or more light sources, or lamp controllers which control the light sources.

The retrofit control subsystem 312 receives signals from the control mechanism 306 of the luminaire 302 which are indicative of when the control mechanism 306 attempts to turn the light source 308 ON and OFF in response to a sensed illumination level being below a turn On threshold and below a turn OFF threshold, respectively. The signals may be as simple as providing electrical power to power the light source 308 then not providing electrical power. The lamp may be turned on to full brightness or almost full brightness in response to the dusk-to-dawn sensor sensing an illumination level falling below a defined threshold (e.g., dusk threshold), then using the data received from a wireless source to adjust the illumination level down at a preprogrammed time of day, then adjust the illumination level back to full illumination at another preprogrammed time of day, and finally turned OFF when the dusk to dawn sensor signals an illumination level above a threshold (e.g., dawn threshold).

The microcontroller 314 can determine an expected level of light for the ambient environment based upon information received by the receiver 318. For instance, the receiver 318 may provide GPS data such as longitude and/or latitude data indicative of the current location of the illumination system 300 and optionally the current time of day. Further, the receiver may provide weather or other information which may be indicative of certain aspects (e.g., expected level of illumination) of the ambient environment for a give time and geographic location. From the location and time of day, the microcontroller 314 may determine times at which to turn lighting ON, turn lighting OFF, increase a level of illumination and/or decrease a level of illumination. The microcontroller 314 may additionally, or alternatively, determined an expected level of light in the ambient environment for a given time of day, based at least in part on the location. The microcontroller 314 may, for example, access data stored within the non-volatile storage 316, such as sunrise/sunset tables, almanac information, and/or daylight savings time tables, to determine and compare an expected level of light for a given time of day with a detected level of light. Differences between the detected level of light and the expected level of light may be used to trigger an event, such as increase the level of light from the illumination system 300, an aural notification (e.g., an alarm), and/or a transmission of a data notification (e.g., through a wireless home network, cellular network, telephone line, or a security system).

In some embodiments, the retrofit control subsystem 312 may include a real time or solar clock 320 (i.e., a clock that tracks time in the real world or with respect to the sun, rather than an internal clock of a processor based system). Alternatively, the microcontroller 314 may implement a real time or solar clock. The real time or solar clocks may be automatically calibrated by the microcontroller 314 based upon information received from the receiver 318. Such embodiments may also include a discrete internal power source 322 (e.g., battery cells, capacitors, super- or ultracapacitors, fuel cell) to supply power to the clock 320 while power is not being received from the control mechanism 302 of the luminaire. The internal power source 322 may be rechargeable, via the power supply circuitry 313. The microcontroller 314 may determine solar midnight, from time-to-time (e.g., each daily cycle). In particular, the microcontroller may divide the average or median time that the light source is ON in half, which should occur at the darkest time of the daily cycle (e.g., solar midnight). The microcontroller 314 may calibrate the real time clock with the determined solar midnight. The microcontroller 314 may control the increasing and decreasing of the level of light output by the light source 308 using the calibrated real time clock 320. This can prevent or reduce the effect of artificial lights on the illumination system 300.

The operation is further described with reference to the methods illustrated in FIGS. 7-18, below.

Figure 4A:
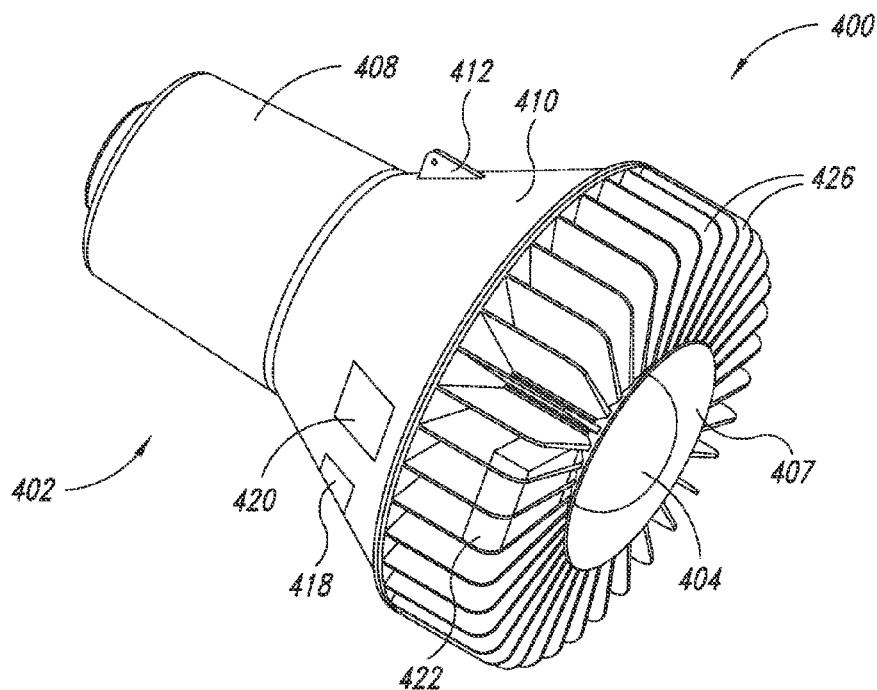
FIG. 4A is an isometric diagram showing a luminaire including an integral control subsystem and a light source, according to another non-limiting illustrated embodiment.
Figure 4B:
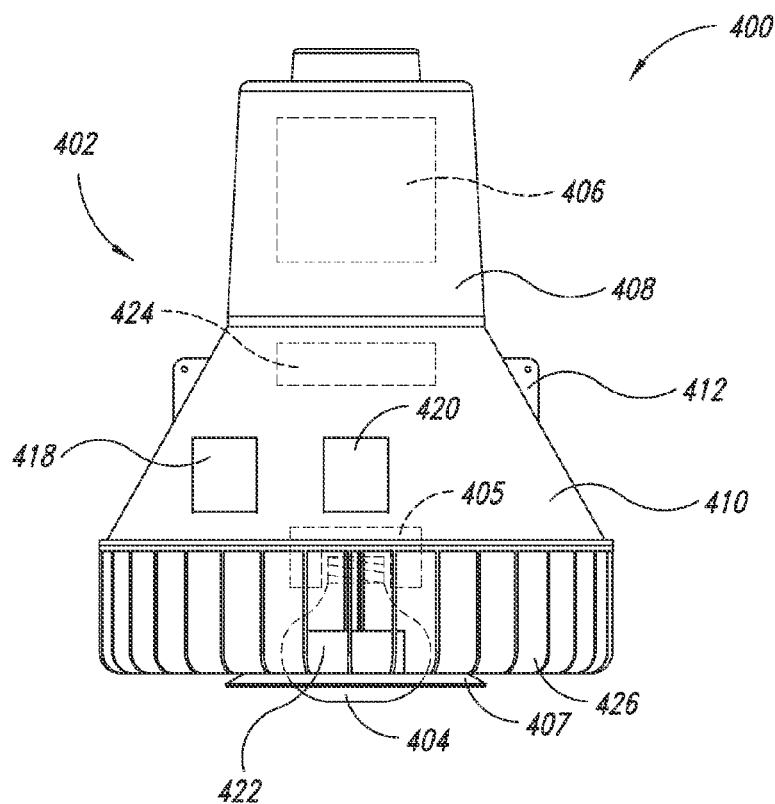
FIG. 4B is right side elevational view of the luminaire of FIG. 4A.

FIGS. 4A and 4B show an illumination system 400 according to one non-limiting illustrated embodiment. The illumination system 400 includes a luminaire 402 and at least one light source 404. The illumination system 400 may also include a sensor 418 that is responsive to a level of light or illumination in the ambient environment, a receiver 420 (e.g., GPS receiver, cellular receiver), and a motion detector 422. The illumination system 400 may further include an integral control subsystem 406 and an antenna 424.

The luminaire 402 may take a variety of forms. Such forms include luminaires that hold one, two, or more light sources 404. The luminaire 402 may also include a reflector 407, a housing 408, a shade 410. The brackets 412 may be used with attachment clips to attach a retrofit luminaire (all parts except 408) to an existing, previously installed housing 408. The housing 408 and shade 410 may be in the shape of a circle, oval, square, rectangle, triangle, or other polygon. The housing 408 and shade 410 may share a common shape or they may be different shapes from one another.

The light source 404 can take a variety of forms. For example, the light source 404 may be comprised of one or more incandescent lamps, fluorescent lamps, or any of the various types of light emitting diodes (LEDs). The light source 404 that is selected for use in the luminaire 402 may be based upon the intended use of the illumination system 400. For example, a brighter illuminating source may be selected over a more energy efficient source based upon whether the area to be illuminated is residential or commercial, densely populated or rural, and secured or public and/or on the relative cost of locating sufficient luminaires to satisfactorily cover the area to be illuminated.

The reflector 407 may be optionally positioned around the light source 404 to mitigate light trespass. For example, the reflector 407 may define and limit the angle of the illumination footprint so as not to illuminate a backyard or window of a neighboring home or structure. The reflector 407 may provide the additional benefit of reducing light pollution, which obscures the stars in the night sky, interferes with astronomical research, and may disrupt ecosystems.

The heat sink 426 may be optionally positioned around the light source 404 to transfer thermal energy away from the light source 404. Trapped thermal energy in solid state devices may alter the color of the light source 404 or alter the operational characteristics, such as threshold voltages in transistors, of components within the light source 404, as well as reduce the life of the light source 404. The heat sink 426 may be composed of one or more thermal conductors such as aluminum and copper or thermally filled polymers, and may include a convoluted surface (e.g., fins, pins) to provide significantly more surface area for a given volume occupied.

The illumination system 400 may use the sensor 418, the receiver 420, and/or the motion detector 422 to determine when to adjust the state of the light source 404 between ON, OFF, and to adjust illumination levels between ON and OFF. In particular, the illumination system 400 may use information received via the receiver 420 to determine an expected level of light in the ambient environment based at least in part on a current location of the illumination system 400 as indicated in the received information, and optionally in conjunction with a current date and/or current time. The illumination system 400 may use a geographical look up table, sunrise/sunset chart, or similar form of organized data stored in non-volatile memory, or may use one or more formulas or algorithms to analytically calculate such based in the received information. In addition, daylight savings time status may be determined by the controller based on the location data and a geographical lookup table other method. The received information may be pre-processed by the receiver 420, for example converting signals from two or more geographically disparate sources into longitude and/or latitude information. Alternatively, a microprocessor or other controller of the integral control subsystem 406 may process the received information to determine the current geographic coordinates and/or current date/time. Alternatively, data encoded in a cellular communications signal may be used to determine local time and location.

As best illustrated in FIG. 4B, the light source 404 may be removably coupled to the luminaire 402, for instance via a threaded socket or receptacle 405. Alternatively, the light source 404 may be integral to the luminaire 402, particularly where the light source 404 includes a plurality of solid-state light emitters.

The integral control subsystem 406 includes circuitry to control operation of the illumination system 400 in a similar fashion to the operation described above. In particular, the integral control subsystem 406 interfaces with at least one sensor 418 (e.g., photosensor, cadmium sulfide cell, photodiode, phototransistor, ambient light sensor integrated circuit) that is responsive to a level of light in the environment (e.g., daylight or ambient light). The sensor 418 may be positioned to minimize an effect of the light source 404 on the sensor 418. For example, the sensor 418 may be positioned on top of the housing 408 or on the shade 410.

In contrast to the illumination system 200 of FIG. 2 which receive signals from the control mechanism, in the illumination system 400 the control subsystem 406 may be coupled to receive signals directly from the sensor 418. Thus, instead of receiving ON and OFF switching or power signals, the control subsystem 406 may receive signals indicative of a sensed level of light in the environment. Thus, in addition to the previously described operation, the control subsystem 406 determines when the sensed level of light is at or below a turn ON threshold and when the sensed level of light is at or above a turn OFF threshold.

The integral control subsystem 406 may also directly interface with the receiver 420 to verify or calibrate the information received from the sensor 418. For example, the control subsystem 406 may use data from a GPS receiver (e.g., Delorme GPS2058-10 GPS receiver), such as latitude, longitude, date, and time to determine an expected level of light. As discussed in detail below, the control subsystem 406 may then compare the expected level of light to the level of light sensed by the sensor 418. Such may allow detection of aberrant conditions, for example aberrant conditions associated with unintentional failure of a component or associated with intentional tampering with the illumination system. The use of data received from an external source may also reduce or eliminate the need for training or learning by the control system which might otherwise be required to establish the solar day (e.g., solar noon, solar midnight) at the location where the luminaire is installed. The control subsystem 406 may run in a variety of modes, e.g., security, calibrate, normal, etc., and produce an output based upon the comparison between the expected level of light and the actually detected level of light and the current operational mode in which the control subsystem 406 is running.

The integral control subsystem 406 may be directly coupled to the antenna 424 to provide communications with external systems. For example, the antenna 424 may be a radio antenna, and the control subsystem 406 may include hardware and/or software to extract location, date and/or time information from the radio (e.g., radio or microwave portions of the electromagnetic spectrum) signals, such as those sent from the National Institute of Standards of Technology (NIST) radio station WWVB located in Fort Collins, Colo. The control subsystem 406 may then synchronize an internal clock using the received date and time (e.g., Universal Coordinated Time or UTS) to provide continued accuracy of ON and OFF switching of the light source 404.

The integral control subsystem 406 may use the antenna 424 to receive cellular communications signals. For example, the control subsystem 406 may include hardware and/or software to enable receiving information from, and optionally transmitting information to, a cellular network. A subscription with a cellular network carrier may enable the control subsystem 406 to acquire location, date, and time data from local cellular base stations. The control subsystem 406 may perform triangulation on signals received from geographically disparate sources, for example received from three cellular system base stations, to determine a current location of the luminaire. The control subsystem may extract location information from data encoded in the signal received from a single cellular base station, for example, by finding the identity of the base station and using stored data to determine longitude and latitude, or by direct encoding of location information in the cellular base station signal. The control subsystem 406 may also extract current date and/or time information from the cellular communications systems signals.

The subscription with a cellular network carrier may also optionally enable the control subsystem 406 to transmit data to the cellular network. For example, the control subsystem 406 may transmit data to notify a person or system of an event, for instance an alert indicative of detection of an aberrant condition. The notification can take the form of a short message service (SMS), text message, email, or data packet. A notification event may be defined by a sensed level of light being detected above or below a threshold of the expected level of light. Such an event may be triggered, for example, when a detected level of light is significantly below (i.e., by more than a defined threshold) an expected level of light, for instance where a person covers the sensor 418. Such an event may be triggered, for example, when a detected level of light is significantly above (i.e., by more than a defined threshold) an expected level of light, for instance where a person shines a laser or other light source at the sensor 418 in order to deceive the illumination system 400 into shutting OFF the light source 404 during non-daylight hours. Thus, both the above described aberrations may be indicative of intentional tampering. Aberrations may alternatively be indicative of an unintentional condition, for example a failed component, for instance a failed ambient light sensor 418. The ambient light sensor 418 may fail, producing a signal indicative of a sensed level of light that is either higher than the actual level of light in the ambient environment or lower than the actual level of light. Detection of aberrant conditions, whether unintentionally or intentionally produced, may be particularly advantageous. Such may allow the aberration to be reported, investigated, with the failed component being replaced or repaired or the tampering individual being apprehended or scared off, or allowing heightened patrolling of a secured area in response.

The integral control subsystem 406 may use the antenna 424, or a separate antenna, to provide wireless telecommunications device services. For example, the control subsystem 406 may include hardware and/or software to enable receiving information from and transmitting information to a personal or commercial WiFi network. By providing wireless device services, the control subsystem 406 may enable a person to set various levels and times of illumination through a graphical user interface via a personal computer. Alternatively, the wireless device service may enable the illumination system 400 to be one of several remotely controlled illumination systems, such as may be used outside of a warehouse, at a shipyard, impoundment lot, motor pool, other transportation facility, energy production facility, military facility or in proximity to some other secured area.

While several embodiments of the integral control subsystem 406 are described in connection to wireless implementations, the present disclosure also includes landline and other wired uses. For example, the control subsystem 406 may include the hardware and/or software to manipulate a landline so as to receive and transmit data at frequencies similar to those used by a facsimile machine or frequencies used by digital subscriber line (DSL) standards.

Figure 5:
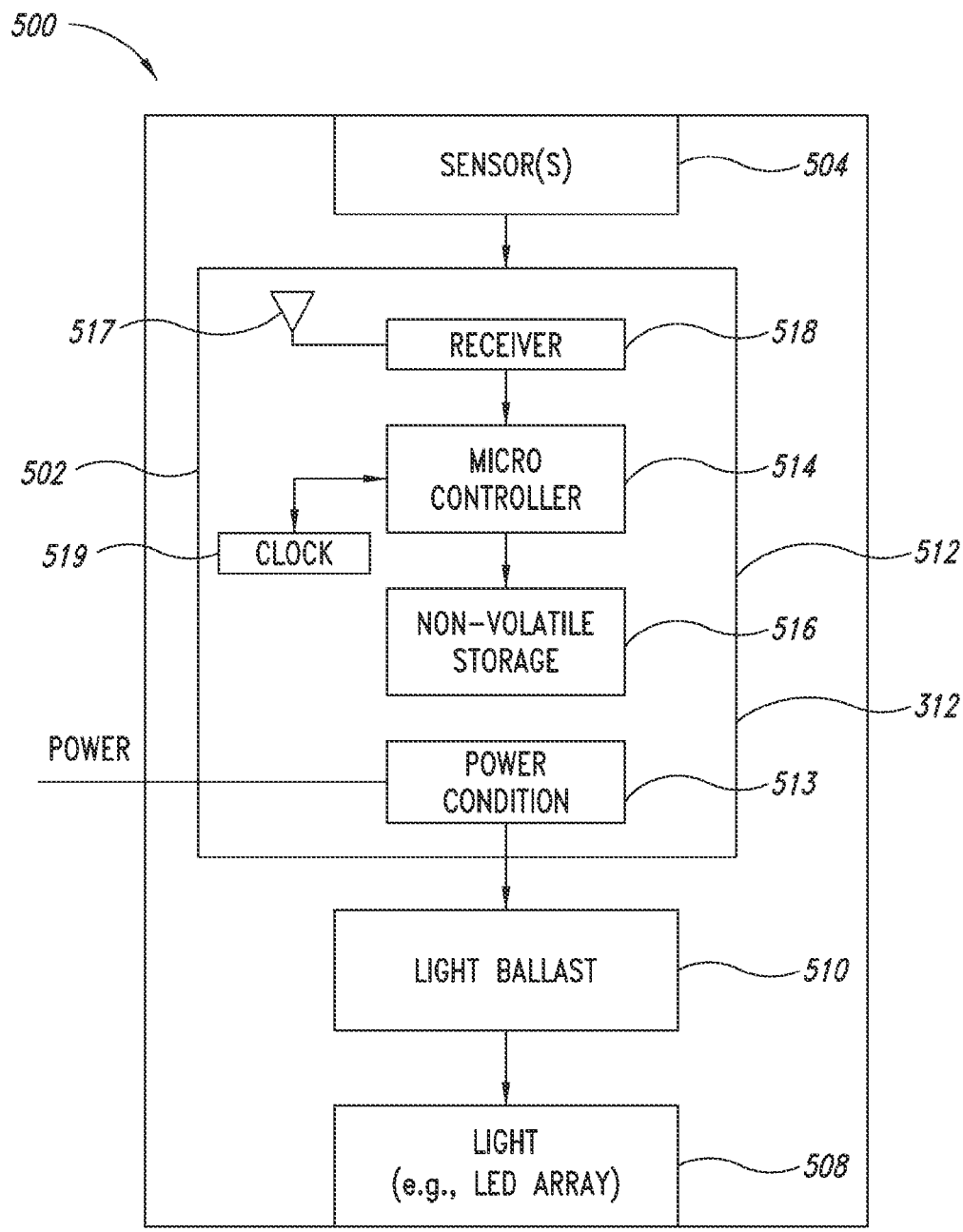
FIG. 5 is a schematic diagram showing the luminaire of FIGS. 4A and 4B with the integral control subsystem, and a light source.

FIG. 5 schematically illustrates an illumination system 500, according to one non-limiting illustrated embodiment. The illumination system 500 may be identical or similar to the illumination system 400 illustrated in FIGS. 4A and 4B.

The illumination system 500 may employ a conventional luminaire 502, for example identical or similar to that illustrated in FIG. 3 or FIGS. 4A and 4B, or of any other style. The illumination system 500 includes one or more light sources 508 and optionally one or more ballasts 510 for the light sources 508. Suitable examples of light sources 508 are described above.

The illumination system 500 includes an integral control subsystem 512 which is integral to the luminaire. The integral control subsystem 512 may be identical or similar to the integral control subsystem 406 (FIG. 4A or FIG. 4B). The integral control subsystem 512 may include a sensor 504 that senses or is responsive to varying levels of light. The sensor 504 may take a variety of forms, some of which are described above. The integral control subsystem 512 may include one or more antennas 517 (only one show) and receivers 518 (only one show). The antenna 517 and receiver 518 may be operable to receive and transmit a variety of signals, some of which are described above. The integral control subsystem 512 may, for example, include a microcontroller 514 and one or more non-volatile storage media 516 communicatively coupled to the microcontroller 514. The microcontroller 514 may take any of a variety of forms, for example a microprocessor, programmable gate array (PGA), application specific integrated circuit (ASIC), etc. The non-volatile storage media 516 may take any of a variety of forms, for example electrically erasable programmable read only memories (EEPROMs), flash memories, etc. The microcontroller 514 may be communicatively coupled to receive signals directly from the sensor 504, the receiver 518, and/or a clock 519. The integral control subsystem 512 may include circuitry 513 that rectifies, steps down a voltage and otherwise conditions supplied electrical power to a form suitable to power the microcontroller 514, non-volatile storage media 516 and/or other components of the integral control subsystem 512.

The integral control subsystem 512 may employ a variety of switches or other mechanisms to turn the light source 508 ON and OFF and to adjust the level of light output by the light source 508. For example, the integral control subsystem 512 may employ various switches or conventional dimmer circuits, for instance those circuits and circuit components discussed above in reference to the retrofit control subsystem 312. Like the retrofit control subsystem 312, the integral control subsystem 512 may adjust the level of light by adjusting a level of light emitted by each discrete light emitter and/or by adjusting the number of discrete light emitters emitting light.

The microcontroller 514 receives signals from the sensor 504 which are indicative of levels of light sensed in the ambient environment around or proximate the sensor 504. The microcontroller 514, or some dedicated circuit, compares the signals to a turn ON threshold and a turn OFF threshold. The microcontroller 514 determines whether the sensed level of light is at or below a turn ON threshold, indicating that lighting is required. In response, the microcontroller 514 may verify that the sensed level of light is within some threshold of an expected level of light, and if so may cause the light source to be turned ON at a first output level, which is typically relative high for the light source. The microcontroller 514 may compare a programmed time of day at which to reduce the illumination level, and if the local time of day is substantially equal to that time, turn down (i.e., decrease) the illumination level. While the illumination is at a lower level, the microcontroller 514 may continue to compare the local time of day with a programmed time of day at which the illumination level is desired to be increased, and increase the illumination level when the said times are substantially equal.

The microcontroller 514 determines whether the sensed level of light is at or above a turn OFF threshold, indicating that lighting is no longer required. In response, the microcontroller 514 may verify that the sensed level of light is within some threshold of an expected level of light, and if so may cause the light source to be turned OFF. In response to a detection of motion, the microcontroller 514 may increase a level of light output or turn ON the light sources.

Appropriate time delays hysteresis may be added or built into the control subsystem 512 before the light source 110 is turned ON or OFF. During these, sensed illumination levels remain approximately constant or the microcontroller 514 will not register a single occurrence of an ON or OFF threshold being met. This suppresses short-term noise events and thereby avoids the microcontroller 514 from being falsely triggered to activate the light source 110 due to short-term events such as vehicle headlights or a transient moving object.

The microcontroller 514 also determines when to adjust the level of output, the adjustment occurring between turning the light source ON and OFF in a daily cycle. Such has been described above, and is described in more detail below with reference to the various methods illustrated in the flow diagrams.

Some embodiments of the integral control subsystem 512 may include or implement the real time or solar clock 519, similar to that discussed with reference to FIG. 3, above. While such embodiment may include a discrete internal power source, such typically would not be necessary where the integrated control subsystem 512 receives power directly from the AC power mains, rather than via a dusk-to-dawn control mechanism. The microcontroller 514 may control the turning ON and OFF as well as the increasing and decreasing of the level of light output by the light source using the calibrated real time clock 519. The microcontroller 514 may also synchronize the real time clock based on received signals indicative of a current date and/or current time at the particular location at which the illumination system 500 is installed.

The microcontroller 514 may use the receiver 518 to obtain information in order to perform various functions. For example, the microcontroller 514 may use the receiver 518 to acquire location data (e.g., GPS data, cellular base station location signal strength, etc.), to determine a current location. The microcontroller 514 may use the receiver 518 to interface with a communications network, for example a cellular network, to receive radio signals including date and time, to interface with a wireless telecommunications network (e.g., WiFi, WAN, LAN, MAN) and/or to interface with a wired or wireless security system. Various additional features that may exist in these embodiments have been discussed above (FIGS. 4A and 4B). For example, the microcontroller 514 may use GPS data to determine an expected level of light for comparison with a sensed level of light. The microcontroller 514 may initiate a notification event or transmit an alert through any one of or combination of a cellular network, a wireless telecommunications network, or a landline interface to transmit notification of anomalies or interferences with normal operations of the illumination system 500. According to one embodiment, the microcontroller 514 interfaces with receiver 518 to provide wireless device services enabling a person to access and set various turn ON and turn OFF thresholds through a graphical user interface (GUI) via a personal computer, mobile computing device, personal data assistant, smart phone, or the like.

FIG. 6A shows a graph 600a of a level of light produced by a light source over time during a first part of a year, according to one non-limiting illustrated embodiment.

In particular, the level of light output by the light source is shown along the Y-axis, while time is shown along the X-axis. In a first daily cycle 602a, the light source is turned ON at 604a to produce light at a first level (e.g., relatively high) 606a. The light source may be turned ON in response detecting a first event or condition, for example that a level of light in the ambient environment has fallen below some defined threshold (e.g., level of light corresponding to dusk or "dusk threshold"). The first level 606a of light is maintained until detection of a second event or condition. For example, the first level 606a of light may be maintained until a real world time at the particular location reaches some defined first adjustment time (e.g., 10 PM). Thus, the first level 606a of light may be maintained for a first duration 608a, which may, for example, be the duration of time between sensing dusk and a defined or set time (e.g., 10 PM). The level of light produced by the light source is then adjusted at 610a to produce a second, lower level 612a. The second level of light 612a may be deemed sufficient to provide some level of lighting when the amount of traffic (e.g., foot or vehicle traffic) in the location is expected to be small, while still being efficient.

The second level 612a of light may be maintained until a detection of a third event or condition. For example, the second level 612a of light may be maintained until a real world time at the particular location reaches some defined second adjustment time (e.g., 6 AM). Thus, the second level 612a of light may be maintained for a second duration 614a, which may, for example, be the duration of time between 10 PM and 6 AM. The level of light produced is then adjusted at 616a to produce a third level 606a of light, higher than the second level 612a. While illustrated as equal to the first level 606a, the third level may be higher or lower than the first level 606a.

The level of light is maintained until detection of a fourth event or condition. For example, the third level of light 606a may be maintained until a level of light in the ambient environment has increased to or above some defined threshold (e.g., level of light corresponding to dawn or "dawn threshold"). Thus, the level of light may be maintained for a third duration 618a, which may, for example, be the duration of time between the set time 6 AM and sensing dawn. As illustrated, this pattern may repeat for additional daily cycles, although the length of the durations 608a, 618a may gradually change, for example as the time of sunrise and sunset varies changes throughout the year.

The thresholds (e.g., turn ON or dusk threshold; turn OFF or dawn threshold) may be factory set or may be user configurable, set based on user input received via a user interface (e.g., buttons, switches, dials, potentiometers, shorting jumpers, wired or wireless communications ports, or via power line carrier control) of the luminaire. The adjustment times 610a, 616a at which the level of light is adjusted may be factory set or may be user configurable, set based on user input received via a user interface (e.g., buttons, switches, dials, potentiometers, shorting jumpers, wired or wireless communications ports, or via power line carrier control) of the luminaire. Such user input may, for instance, indicate a fixed real world time for the second and third thresholds.

FIG. 6B shows a graph 600b of a level of light produced by a light source over time during a second part of a year, according to one non-limiting illustrated embodiment.

Times or durations corresponding to those of FIG. 6A are called out using the same reference numerals but with the lower case letter "b" instead of the lower case letter "a" used in FIG. 6A. The pattern is similar to that illustrated in FIG. 6A, however the first threshold (e.g., turn ON or dusk threshold) is reached at an earlier time 604b in the daily cycle while the fourth threshold (e.g., turn OFF or dawn threshold) is reached at a later time 620b in the daily cycle due to the change in the amount of daylight hours in the daily cycle. Hence, the first duration 608a at the relatively high first level 606b is longer than that illustrated in FIG. 6A, starting earlier. Likewise, the third duration 618b at the relatively high third level 606b is longer than that illustrated in FIG. 6A, ending later. Such is in response to the amount of daylight in the daily cycle 602b being shorter than that illustrated in FIG. 6A. Thus, FIG. 6A may represent summer in the Northern Hemisphere, while FIG. 6B may represent winter in the same location.

FIG. 6C shows a graph 600c of a level of light produced by a light source over time during the first part of a year with dusk and dawn sensing thresholds set to be reached earlier and later in a daily cycle, respectively, according to one non-limiting illustrated embodiment.

Times or durations corresponding to those of FIGS. 6A and 6B are called out using the same reference numerals but with the lower case letter "c" instead of the lower case letter "a" or "b" used in FIGS. 6A and 6B, respectively. The pattern is similar to that illustrated in FIG. 6A, however the threshold at which a level of light corresponding to dusk is sensed is adjusted downward or reduced such that dusk is sensed at an earlier time 604c in a daily cycle (e.g., 5:00 PM), while the threshold at which a level of light corresponding to dawn is sensed is adjusted upward or increased such that dawn is sensed at an earlier time 620c in the daily cycle (e.g., 5:30 AM). Additionally, the time 610c at which the level of illumination is reduced is set to occur later, and the time 616c at which the level of illumination is raised is set to occur earlier than in FIG. 6A. Consequently, first and third durations 608c, 618c at the high level 606c are longer than that illustrated in FIG. 6A. As noted above, the times 610c, 616c at which the level of light is adjusted may be factory set or may be user configurable, set based on user input received via a user interface (e.g., buttons, switches, dials, potentiometers, shorting jumpers, wired or wireless communications ports, or via power line carrier control) of the luminaire.

FIG. 6D shows a graph 600d of a level of light produced by a light source over time during the second part of a year, according to one non-limiting illustrated embodiment.

Times or durations corresponding to those of FIGS. 6A-6C are called out using the same reference numerals but with the lower case letter "d" instead of the lower case letter "a" "b" or "c" used in FIGS. 6A-6C, respectively. The pattern is similar to that illustrated in FIG. 6A, however the third threshold has been changed such that the first and third durations 608d, 618d are of unequal lengths with respect to one another. For example, the third threshold may be set to occur at a later time 616d (e.g., 8 AM), as compared to an earlier time 616a (e.g., 6 AM). As previously noted, the third threshold may be user configurable, set based on user input received via a user interface (e.g., buttons, switches, dials, communications port) of the luminaire.

Figure 7A:
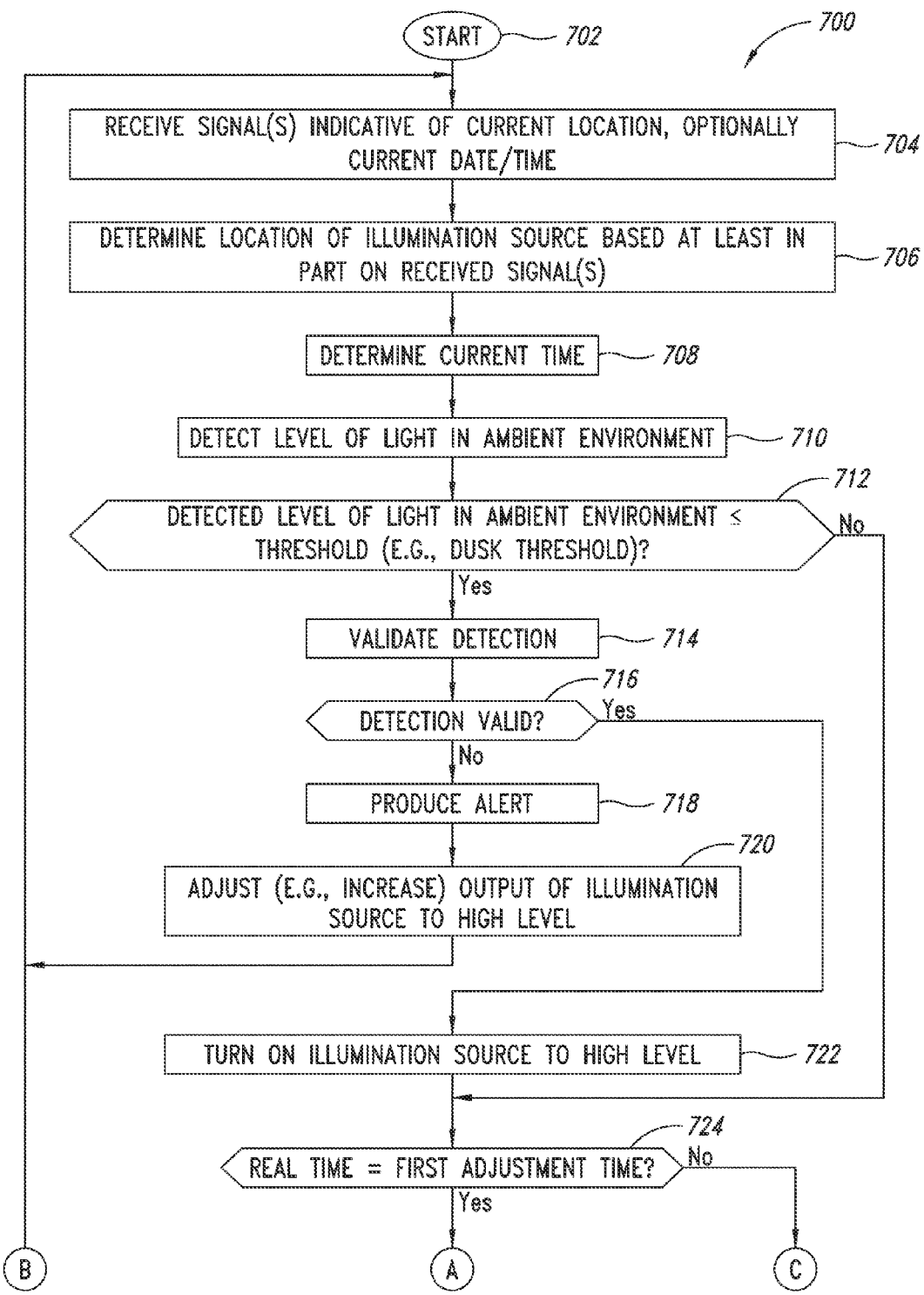
Figure 7C:
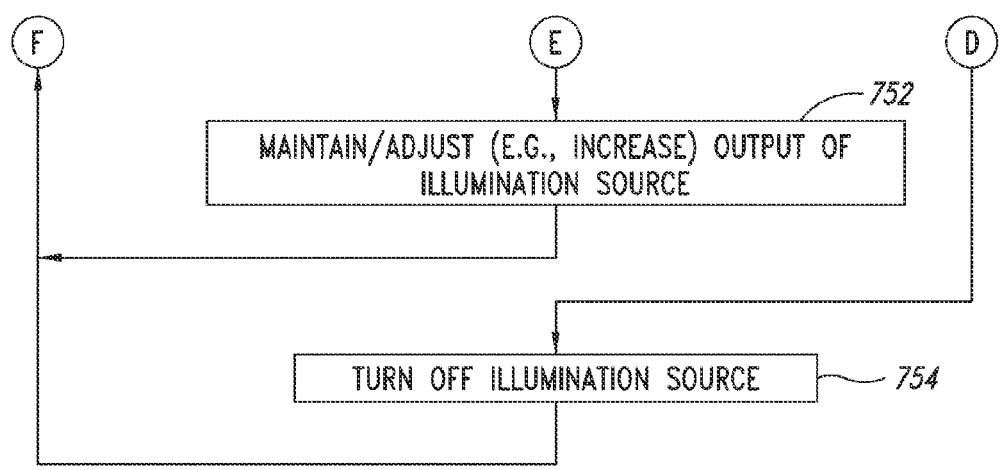

FIGS. 7A-7C show a high level method 700 of operating an illumination system to provide illumination in an area, such as a secured area, according to one non-limiting illustrated embodiment.

The method 700 starts at 702. For example, the method 700 may start upon application of power to the luminaire or turning ON of a switch or relay, either locally or remotely located from the illumination system. The illumination system may, for example, be controlled remotely via one or more communications channels, for example one or more extranets, intranets, or the Internet, or via one or more cellular, plain old telephone service (POTS), or other telecommunications channels or networks.

At 704, at least one component of the illumination system receives one or more signals indicative of a current location of the illumination system. Optionally, the at least one component also receives signals indicative of the current date and/or current time. For example, a control subsystem may include a receiver configured to receive GPS signals from GPS satellites, cellular network signals from cellular base stations, wireless networks signals, landline signals, radio signals, or the like.

At 706, at least one component of the illumination system determines a current location of the illumination source. For example, an integral control subsystem may include a microcontroller operable to decode a stream of data, including latitude and longitude data from a receiver such as a GPS receiver, to determine the current location of the illumination system. The microcontroller may then store information indicative of the current location in a non-volatile memory or storage medium. As another example, the microcontroller may be operable to determine the current location based on signals received from geographically dispersed terrestrial sources, using triangulation or other algorithms or approaches (e.g., signal time of flight). For instance, the microcontroller may be operable to determine the location by querying the receiver which is configured to acquire signals from two or more cellular network radio towers or base stations. One cellular network signal may also be used if the location or identity of the tower is encoded into the transmitted signal.

At 708, at least one component of the illumination system determines the current time. For example, a microprocessor may convert a current time indicated in the received signal from one format to another. For instance, the microprocessor may convert a Universal Coordinate Time (UCT) or Greenwich Mean Time (GMT) representation to a local time based on the determined location of the illumination system. Such may account for whether day light saving time is, or is not in effect, at the determined location. Alternatively, or additionally, the illumination system may include a real time clock or a solar clock. The clock may be initially set by user input or by synchronizing the clock based upon GPS signals, cellular network signals, radio signals, (e.g., UCT signal) or other signals received by the receiver, and may be updated or synchronized from time-to-time (e.g., periodically or aperiodically) based on such signals.

At 710, at least one component of the illumination system detects the level of light in the ambient environment. The illumination system or retrofit may include an ambient light sensor (e.g., photosensor, cadmium sulfide cell, photodiode, phototransistor, ambient light sensor integrated circuit) that is responsive to a level of light in the ambient environment (e.g., daylight or ambient light). The controller subsystem may include a microcontroller and a non-volatile memory or storage medium into which the sensor periodically stores sensed levels of light. An integral subsystem controller of the illumination system may query registers to retrieve stored data representing the current level of light. Alternatively, the sensor may be directly controlled by the integral subsystem controller which may receive real-time indications of levels of light from the sensor.

At 712, the illumination system determines whether the detected level of light is at equal or less than (i.e., equals or below) to a first threshold. The first threshold may represent a level of light at which the illumination is to be turned ON (e.g., dusk threshold). If the detected level of light is less than or below the first threshold, control passes to 714. Otherwise, control passes to 724.

At 714, at least one component of the illumination system validates the result of the comparison of the detected level of light in the ambient environment to the first threshold with respect to at least one expected condition. In other words, the component validates the detection of the occurrence of an event or condition (e.g., dusk). For example, the microprocessor may compare an actual level of illumination detected to an expected level of illumination for the particular location, at the current time and current date. Also for example, the microprocessor can compare the actual time the event (e.g., dusk) occurred or was detected to an expected or predicted time of the event at the particular location and current date. Such approaches are may identify malfunctioning components, unintentional interference or even intentional tampering. Detecting such aberrations facilitates preventing or detecting false positive or false negative results. Such approaches are discussed in detail below, in reference to FIGS. 8 and 9.

At 716, at least one component of the illumination system determines whether the detection was valid. If the detection was valid control passes to 722. If the detection was not valid or was invalid, control passes to 718.

At 718, at least one component of the illumination system produces a notification or alert. The notification or alert may take many forms. An aural alert may include a wide range of alarms sounds produce via one or more speakers, sirens, klaxons, either commonly located with the illumination system or remote therefrom. The aural alert may be provided at a user selectable volume. A visible alert may include flashing, blinking or strobing one or more lights located commonly with the illumination system, and/or remotely therefrom. Such may a flashing pattern executed by the illumination source itself. A data alert may be transmitted through a cellular network, a wireless network, a landline, or other communications networks or channels. The data alert may be sent to a security center, to a multimedia center which initiates video capture of the vicinity, or to the personal computer or smart phone of a person responsible for the area illuminated by the illumination system. Such an alert system may satisfy a governmental or other requirement or condition for security lighting. Further, on the occurrence of an aberration or fault, whether unintentional or intentional, the control system may default to an ON condition, at the brightest level of illumination.

Optionally at 720, at least one component of the illumination system may adjust a level of output of the at least one illumination source. For example, the microprocessor may increase the output of the illumination sources to a relatively high level, which may be at or proximate a highest output level of the illumination sources. Such may be particular appropriate where failure of a component (e.g., sensor) or tampering may be suspected based on the determination that the detection was not valid. For example, such may be a particularly appropriate response where a high level of light is detected in the ambient environment at a time when a low level is expected since such may indicate that someone is deliberately shining a light at the sensor to trick the illumination system. Control then returns to 704, and the method 700 is repeated, or may be called again by a calling routine or program.

In response to determining that a detected level of light in the ambient environment is equal to or below a first threshold (e.g. dusk threshold) at 712 and determining the detected condition is valid at 716, at least one component of the illumination system turns ON the at least one illumination source at 722. For example, the microcontroller may control a power supply or other circuit to cause electrical power to be supplied to one or more of the illumination sources. For instance, depending on the particular type of light source, the control mechanism, may rectify and/or reduce a voltage, current, or duty cycle of the electrical power via any variety of electrical or electronic circuitry (e.g., rheostat, DC/DC converter, other power regulator). The illumination sources may, for example, be turned ON to a relatively high level, for instance proximate to the full rated output of the illumination sources. Additionally, or alternatively, all or a large number of the commonly located illumination sources may be turned ON, to provide the desired level of illumination. The method may then continue at 724.

At 724, at least one component of the illumination system determines whether the level of illumination should be adjusted. For example, the microprocessor may determine whether the real world time is equal to a defined first adjustment time. The first adjustment time may be a user or otherwise defined time at which the level of illumination produced by the at least one light source is programmed or configured to be reduced. For instance, a user or other individual or entity may determine that the amount of traffic (e.g., foot traffic) in a retail parking lot or a public park is minimal sometime after the retail hours (e.g., 11 PM). Thus, there is generally no need for maintaining illumination at full output. Thus, a time for decreasing illumination levels may be set, using the real world local time of the location. Such not only results in energy efficient operation, but does so using an easy to understand, intuitive user interface making it more likely that this feature is used, and used correctly.

If the first adjustment time has been reached, the level of illumination is adjusted at 726. For example, at least one component of the illumination system decreases or reduces the amount of illumination provided by the at least one illumination source. For instance, the microcontroller may control a power supply or other circuit to cause electrical power to be supplied to one or more of the illumination sources. The amount of power delivered to respective ones of the illuminations sources may be reduced, for instance using a shorter duty cycle in a pulse width modulated system. Alternatively, or additionally, fewer of the illumination sources may be powered or turned ON, some of the illumination sources being turned OFF to reduce the cumulative illumination level output by the illumination sources.

In such an embodiment, a first number of illumination sources are powered to achieve a relatively high level of illumination, while a second number of illumination sources, less than the first, are powered to produce the relatively lower, yet non-zero level of illumination. When operated in this fashion, at least one component of the illumination may vary the particular illuminations sources that are powered and those which are not, for example from daily cycle to daily cycle. Such may cause any wear to be distributed relatively evenly across the total number of illumination sources. This may help to achieve relatively uniform illumination output between the various illumination sources, particularly where the output varies with use over time. This may also reduce the number of times that any given set of illumination sources need to be serviced, since this approach will cause all of the illumination sources to tend to reach the end of their useful lives around the same time. The variation may be or may be varied randomly, for example using a random number generator to select which ones of the illumination sources will be ON and which OFF to achieve the lower level of illumination.

At 728, at least one component of the illumination system determines whether motion is sensed in the illuminated area. Such may employ any of a variety of motion sensors (e.g., photosensor, cadmium sulfide cell, photodiode, phototransistor, ambient light sensor integrated circuit, Videocon, CCD array).

If motioned is sensed, control passes to 730 where a timer is started. The timer is used to control how long (e.g., 1 minute, 5 minutes, 15 minutes) an elevated illumination will be provided in response to sensing motion on the illuminated area. The timer may be integral to the microprocessor or may be a distinct timer.

At 732, at least one component of the illumination system adjusts the output of the illumination source. For example, in response to sensing motion, the microprocessor may cause an output of the at least one light source to be increased. For instance, the microcontroller may control a power supply or other circuit to cause electrical power to be supplied to one or more of the illumination sources. The amount of power delivered to respective ones of the illuminations sources may be increased, for instance using a longer duty cycle in a pulse width modulated system. Alternatively, or additionally, a greater number of the illumination sources may be powered or turned ON, to increase the cumulative illumination level output by the illumination sources.

At 734, at least one component of the illumination system determines whether the timer has reached the first defined time, repeating a wait loop until the defined time condition is reached. Upon reaching the defined time, at least one component of the illumination system adjusts the output of the illumination sources at 736, for example reducing the output back to the relatively low, non-zero, level of illumination that was being provided before the motion was sensed. Again, the microcontroller may control a power supply or other circuit to cause electrical power to be supplied to one or more of the illumination sources. The amount of power delivered to respective ones of the illuminations sources may be reduced, for instance using a shorter duty cycle in a pulse width modulated system. Alternatively, or additionally, fewer of the illumination sources may be powered or turned ON, some of the illumination sources being turned OFF to reduce the cumulative illumination level output by the illumination sources. At 738, the timer is reset in preparation for future use.

At 740, at least one component of the illumination system determines whether the level of illumination should be adjusted. For example, the microprocessor may determine whether the real world time is equal to a defined second adjustment time. The second adjustment time may be a user or otherwise defined time at which the level of illumination produced by the at least one light source is programmed or configured to be increased. For instance, a user or other individual or entity may determine that the amount of traffic (e.g., foot traffic) in a retail parking lot is increases sometime before the retail hours (e.g., 8 AM) or sometime before dawn (e.g., 5 AM-9 AM). Consequently, there is generally a need for maintaining illumination at full output. Thus, a time for increasing illumination levels may be set, using the real world local time of the location. Such not only results in energy efficient operation, but does so using an easy to understand, intuitive user interface making it more likely that this feature is used, and used correctly.

If the second adjustment time has been reached, the level of illumination is adjusted at 742. For example, at least one component of the illumination system increases the amount of illumination provided by the at least one illumination source. For instance, the microcontroller may control a power supply or other circuit to cause electrical power to be supplied to one or more of the illumination sources. The amount of power delivered to respective ones of the illuminations sources may be increased, for instance using a longer duty cycle in a pulse width modulated system. Alternatively, or additionally, a greater number of the illumination sources may be powered or turned ON to increase the cumulative illumination level output by the illumination sources. In such an embodiment, a first number of illumination sources are powered to achieve a relatively high level of illumination, while a second number of illumination sources, less than the first, are powered to produce the relatively lower, yet non-zero level of illumination.

At 744, at least one component of the illumination system determines whether the detected level of light is equal to or greater than a second threshold. The second threshold may represent a level of light at which the illumination is to be turned OFF (e.g., dawn threshold). If the detected level of light is at least equal to the second threshold, control passes to 746. Otherwise, control returns to 704 and the method 700 may repeat.

At 746, at least one component of the illumination system validates the result of the comparison of the detected level of light in the ambient environment to the second threshold with respect to at least one expected condition. In other words, the component validates the detection of the occurrence of an event or condition (e.g., dawn). For example, the microprocessor may compare an actual level of illumination detected to an expected level of illumination for the particular location, at the current time and current date. Also for example, the microprocessor can compare the actual time of the event or detection thereof to an expected or predicted time of the event (e.g., dawn) at the particular location and current date. Such approaches are may identify malfunctions, unintentional interference with, or even intentional tampering. Identifying such aberrations may facilitate in preventing or detecting false positive or false negative results. Such approaches are discussed in detail below, in reference to FIGS. 8 and 9.

At 748, at least one component of the illumination system determines whether the detection was valid. If the detection was valid control passes to 754. If the detection was not valid or was invalid, control passes to 750.

At 750, at least one component of the illumination system produces a notification or alert. As previously discussed, the notification or alert may take many forms, which will not be repeated here in the interest of brevity.

Optionally at 752, at least one component of the illumination system may maintain or adjust a level of output of the at least one illumination source. For example, the microprocessor may cause the output of the illumination sources to be maintained or increased to a relatively high level, at or proximate a highest output level of the illumination sources. Such may be particular appropriate where failure of a component (e.g., sensor) or tampering may be suspected based on the determination that the detection was not valid. Control then returns to 704, and the method 700 is repeated, or may be called again by a calling routine or program.

In response to determining that a detected level of light in the ambient environment is equal to or greater than a second threshold (e.g. dawn threshold) at 744 and determining the detected condition is valid at 748, at least one component of the illumination system turns OFF the at least one illumination source at 754. For example, the microcontroller may control a power supply or other circuit to cause cessation of electrical power being supplied to one or more of the illumination sources. Control may pass to 704, and the method 700 repeated.

The method 700 may be implemented to automatically turn ON and turn OFF illumination in response to detected ambient conditions, and to selectively increase and decrease the level of illumination at selected times and/or in response to detection of motion. Such may reduce, or even eliminate, the need to train, learn or adjust to the lighting conditions at a current location, or may eliminate that training, learning, or adjustment to refinements related to artificial light sources or conditions at the location. Thus, for example, a single retrofit or integral control subsystem may be sold and/or installed in locations at widely different latitudes (e.g., Miami, Fla. and Nome, Ak.) with little or no self training required by the system. Notably, the variation in the length of daylight/nighttime is more extreme the farther a location is from the Equator. Such retrofit or integral control subsystem can automatically accommodate to the significant differences between locales. The microcontroller may store the time (e.g., time relative to turning ON, time indicated by real time clock) in the non-volatile storage media. The method 700 may advantageously include verification of the detection of conditions or events, allowing detection of suspected instances of unintentional failure of one or more components, unintentional interference and/or intentional tampering with one or more components.

Figure 8:
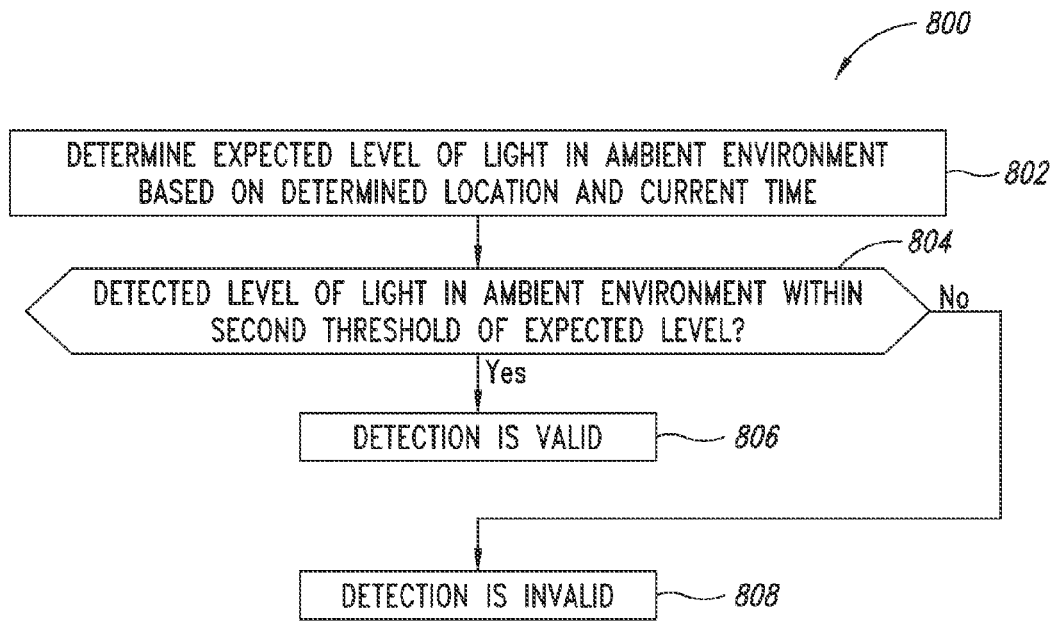
FIG. 8 is a flow diagram showing a low level method of operating a control subsystem of an illumination system to validate a detection, according to one non-limiting illustrated embodiment.

FIG. 8 shows a method 800 of performing validating a detection of a condition or event, according to one illustrated embodiment. The method 800 may be useful in performing the validating 714, 746 (FIGS. 7A-7C) of the method 700.

At 802, at least one component of the illumination system determines the level of light expected in the ambient environment for the determined current location, current date and/or the current time. The current location may be derived from one or more signals received from an external source, for instance from one or more GPS satellites or cellular communications base stations. The current date and/or current time may likewise be derived from one or more signals received from an external source, or alternatively, or additionally be derived from a calendar and/or real world time clock maintained by the illumination system. The illumination system may from time to time synchronize the calendar and/or real world time clock maintained thereby with the current date and/or time indicated in the signal(s) received from the external source(s).

A microcontroller may access lookup tables stored in non-volatile memory to determine the expected level of light based on the determined current location, current date and/or the current time. The lookup tables may include data representing solar midnight and solar noon, and/or times for sunrise and sunset. Alternatively, or additionally, the microcontroller may analytically calculate the expected level of light information based on the determined current location, current date and/or the current time using one or more formulas. The microcontroller may also adjust the expected level of illumination based on whether day light savings applies in the particular location. The microcontroller may even adjust the expected level of illumination based on current or forecasted weather conditions, which may be indicated in the received signals. As a further alternative, the microcontroller may wirelessly query a remote database via a wireless network with the determined current location, current date and/or the current time, to obtain the expected level of light.

At 804, at least one component of the illumination system determines whether a detected level of light in the ambient environment is within a defined threshold of an expected level of light in the ambient environment for the determined current location, current date and/or the current time. In other words, the component, for instance the microprocessor, validates the detection by ensuring that the actual level of light detected in the ambient environment is what is expected or predicted for the time of day, at the time of year and the particular location. Otherwise, the detection may be the result of an aberrant condition, for example a failure of a component or intentional tampering or unintentional interference.

The defined threshold provides a margin of variability in expected light level in the ambient environment, compensating for fluctuations due to high light pollution, clouds, phases of the moon, and other natural causes of variation in nighttime levels of light. In some instances it may be useful to set the defined threshold to detect unwanted covering of the ambient light sensors, such as by a hand, bag or dark plastic or the shinning of some other light source at the sensor. Thus, the illumination system sensitivity may be adjusted to differentiate between natural causes of changing light levels and the actions of perpetrators seeking to manually defeat the purpose of the illumination system.

So, at 804, the illumination system is essentially determining whether the determination or measurement of ambient light conditions made is consistent with what is expected for the particular current location and/or current date and/or time. If the detected level of light in the ambient environment is within a defined threshold of an expected level of light in the ambient environment, the detection is identified as valid at 806, and if not the detection is identified as not valid or invalid at 808.

Figure 9:
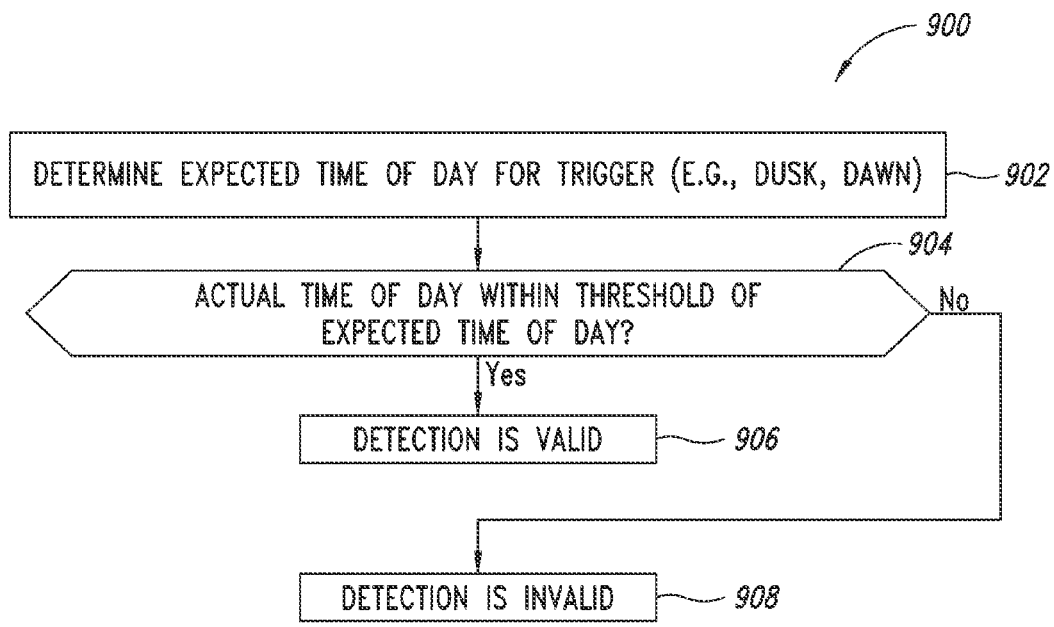
FIG. 9 is a flow diagram showing a low level method of operating a control subsystem to validate a detection, according to another non-limiting illustrated embodiment.

FIG. 9 shows a method 900 of performing validating a detection of a condition or event, according to another illustrated embodiment. The method 900 may be useful in performing the validating 714, 746 (FIGS. 7A-7C) of the method 700.

At 902, at least one component of the illumination system determines an expected time of day at which a particular trigger event or condition (e.g., light levels associated with dusk and/or dawn) is predicted to occur for the determined current location, current date and/or the current time. The current location may be derived from one or more signals received from an external source, for instance from one or more GPS satellites or cellular communications base stations. The current date and/or current time may likewise be derived from one or more signals received from an external source, or alternatively, or additionally be derived from a calendar and/or real world time clock maintained by the illumination system. The illumination system may from time to time synchronize the calendar and/or real world time clock maintained thereby with the current date and/or time indicated in the signal(s) received from the external source(s).

The microcontroller may access lookup tables stored in non-volatile memory or storage media to determine the expected level of light based on the determined current location, current date and/or the current time. The lookup tables may include data representing solar midnight and solar noon, and/or times for sunrise and sunset. Alternatively, or additionally, the microcontroller may analytically calculate the expected time information based on the determined current location, current date and/or the current time using one or more formulas. The microcontroller may also adjust the expected time based on whether day light savings time is in effective or applicable in the particular location. The microcontroller may even adjust the expected time based on current or forecasted weather conditions, which may be indicated in the received signals. As a further alternative, the microcontroller may wirelessly query a remote database via a wireless network with the determined current location, current date and/or the current time, to obtain the expected time.

At 904, at least one component of the illumination system determines whether a detected time at which the event or condition occurred or was sensed in the ambient environment is within a defined threshold of the expected time that the event or condition was predicted to occur for the determined current location, current date and/or the current time. In other words, the component, for instance the microprocessor, validates the detection by ensuring that the actual time that the event or condition occurred or was sensed is what is expected for the time of day, at the time of year and the particular location. Otherwise, the detection may be the result of an aberrant condition, for example a failure of a component or intentional tampering or unintentional interference.

The defined threshold provides a margin of variability in expected time, compensating for fluctuations due to high light pollution, clouds, phases of the moon, and other natural causes of variation in nighttime levels of light. In some instances it may be useful to set the defined threshold to detect unwanted covering of the ambient light sensors, such as by a hand, bag or dark plastic or the shinning of some other light source at the sensor. Thus, the illumination system sensitivity may be adjusted to differentiate between natural causes of changing light levels and the actions of perpetrators seeking to manually defeat the purpose of the illumination system.

So, at 904, the illumination system is essentially determining whether the determination or measurement of ambient light conditions made is consistent with what is expected for the particular current location and/or current date and/or time. If the detected time that the event or condition actually occurred is within a defined threshold of an expected time that the event or condition was predicted to occur, the detection is identified as valid at 906, and if not the detection is identified as not valid or invalid at 908.

Figure 10:
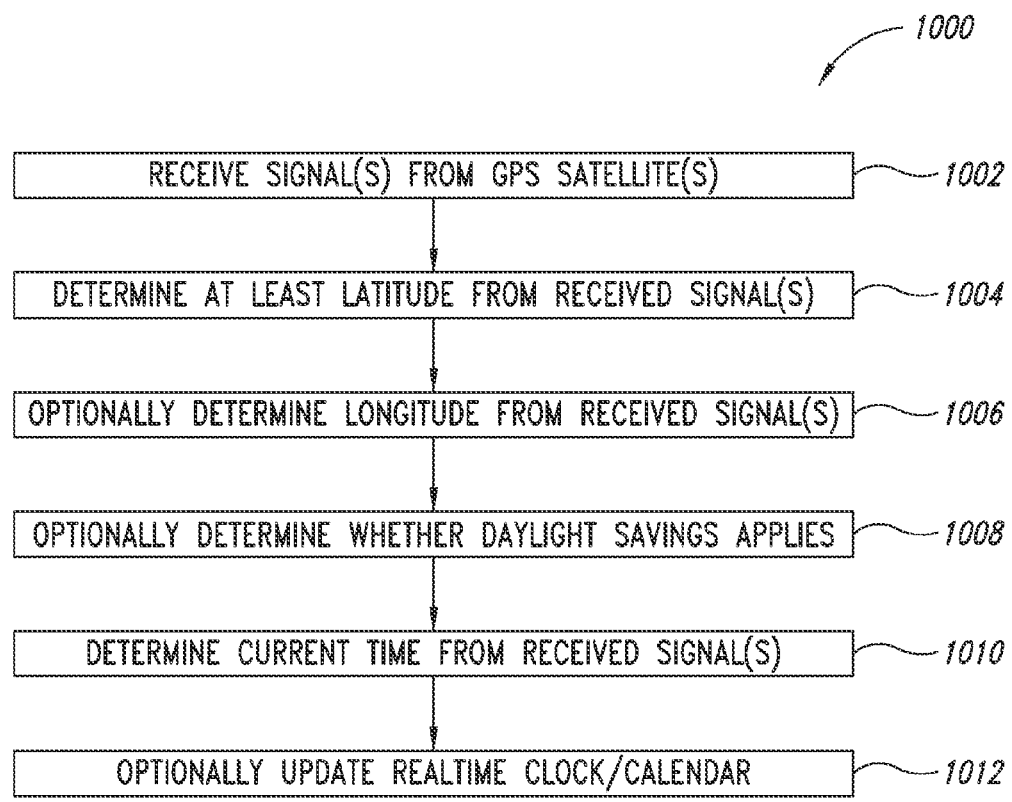
FIG. 10 is a flow diagram showing a low level method of operating a control subsystem of an illumination system to determine a location of the illumination system based on global positioning system signals, and to determine an expected level of light based at least in part on the determined location, according to one non-limiting illustrated embodiment.

FIG. 10 shows a method 1000 of operating a retrofit or integral control subsystem to determine a location of the illumination system based at least in part on GPS data from GPS satellites and to determine an expected level of light based at least in part on the determined location, according to one non-limiting illustrated embodiment. The method 1000 may be employed with the method 700 (FIGS. 7A-7C).

At 1002, a receiver receives signals from GPS satellites. The receiver may employ a passive or active antenna, although signal reception is significantly better with active antennas when compared to passive antennas. The receiver synchronizes with and receives information from and about at least one satellite. Each GPS satellite transmits the date, time, the satellite's orbit information, and an orbit almanac of the other GPS satellites. While date and time may be acquired from a single satellite, determination of a static location typically requires synchronization with at least three GPS satellites. Notably, the GPS receiver may be an integral part of the illumination system or even the luminaire or may be separate and distinct therefrom.

At 1004, the retrofit or integral control subsystem determines at least a current latitude of the illumination system from the received signals. Determining latitude may be particularly important when compensating for differences in lengths of days and lengths of nights as a location of interest moves further away from the equator. The retrofit or integral control subsystem determines the latitude of the illumination system by triangulating the signals received from multiple GPS satellites.

Optionally, at 1006, the retrofit or integral control subsystem determines a current longitude of the illumination system from the received signals. Determining latitude and/or longitudinal allows control subsystems to be advantageously manufactured without any knowledge of or regard for the particular locations where those systems may be installed.

Optionally, at 1008, the retrofit or integral control subsystem determines whether daylight savings applies for the particular location and date. The control subsystem may use a lookup table which may include information regarding the time zones of continents, countries, states or other geographical or political boundaries. The lookup table may, for example, produce an offset from coordinated universal time (UTC) based upon inputs of latitude, longitude, and the date of the request.

At 1010, the retrofit or integral control subsystem determines the current time from the received signals. The control subsystem determines the current time by parsing the data stream output from the GPS receiver.

Optionally, at 1012, the retrofit or integral control subsystem updates the real time clock. Common electronics use quartz based real time clocks because quartz crystal-based clocks are cheaper to manufacture than the more precise time keeping alternatives. The determined current time from the received signals may be used to update the real time clock of the illumination system.

The method 1000 may be integrated with the method 700, method 800, method 900 and/or any of the other previously described methods.

Figure 11:
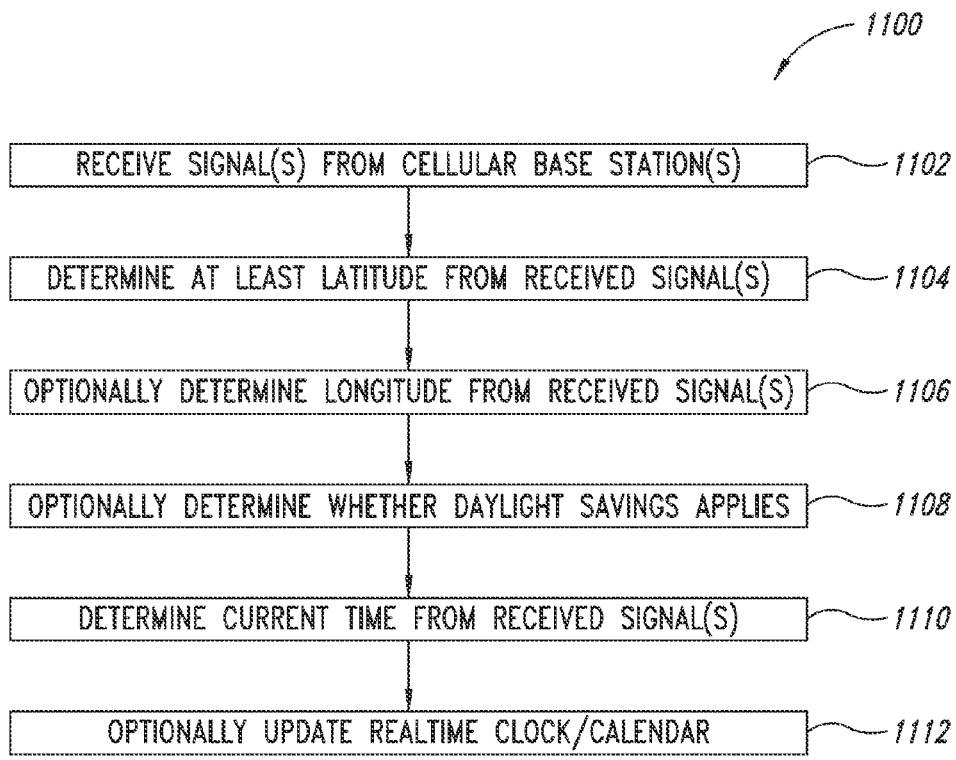
FIG. 11 is a flow diagram showing a low level method of operating a control subsystem of an illumination system to determine a location of the illumination system based on cellular system signals, and to determine an expected level of light based at least in part on the determined location, according to another non-limiting illustrated embodiment.

FIG. 11 shows a method 1100 of operating a retrofit or integral control subsystem to determine a current location of a lighting system based at least in part on signals from one or more cellular base stations, and to determine an expected level of light based at least in part on the determined location, according to one non-limiting illustrated embodiment. The method 1100 may be employed with the method 700 (FIGS. 7A-7C).

At 1102, a cellular communications receiver receives signals from one or more cellular base stations. The received signals may include information identifying the carrier, the signal strength, the state and county of the base station, and general handshaking instructions for the receiving device to follow.

At 1104, the retrofit or integral control subsystem determines at least a current latitude of the illumination system from the received signals. The cellular base stations track the locations of cellular receivers/transceivers using triangulation or other methods. The one or more cellular base stations may transmit latitude coordinate of the illumination system to the receiver upon receipt of a proper query to the base station. Alternatively, the retrofit or integral control subsystem may perform the triangulation or other position estimating algorithm based on signals received from two or more geographically disparate cellular base stations. Notably, the cellular communications receiver may be an integral part of the illumination system or even the luminaire or may be separate and distinct therefrom.

Optionally, at 1106, the retrofit or integral control subsystem determines a current longitude coordinate of the illumination system. For example, the retrofit or integral control subsystem may transmit a query to the one or more cellular base stations and may decode the reply received from the one or more cellular base stations. Determining latitude and/or longitudinal allows control subsystems to be advantageously manufactured without any knowledge of or regard for the particular locations where those systems may be installed.

Optionally, at 1108, the retrofit or integral control subsystem determines whether daylight savings applies for the particular location and date. The control subsystem may use a lookup table which may include information regarding the time zones of continents, countries, states or other geographical or political boundaries. The lookup table may, for example, produce an offset from coordinated universal time (UTC) based upon inputs of latitude, longitude, and the current date.

At 1110, the retrofit or integral control subsystem determines the current time from the received signals. The control subsystem determines the current time by decoding the stream of data transmitted by the cellular base stations. The time may already be adjusted for daylight savings time, the time may be in UTC format, or the time may be adjusted for the location serviced by the cellular base station.

Optionally, at 1112, the retrofit or integral control subsystem updates the real time clock. Common electronics use quartz based real time clocks because quartz crystal-based clocks are cheaper to manufacture than the more precise time keeping alternatives. The determined current time from the received signals may be used to update the real time clock of the illumination system.

The method 1100 may be integrated with the method 700, method 800, method 900 and/or any of the other previously described methods.

Figure 12:
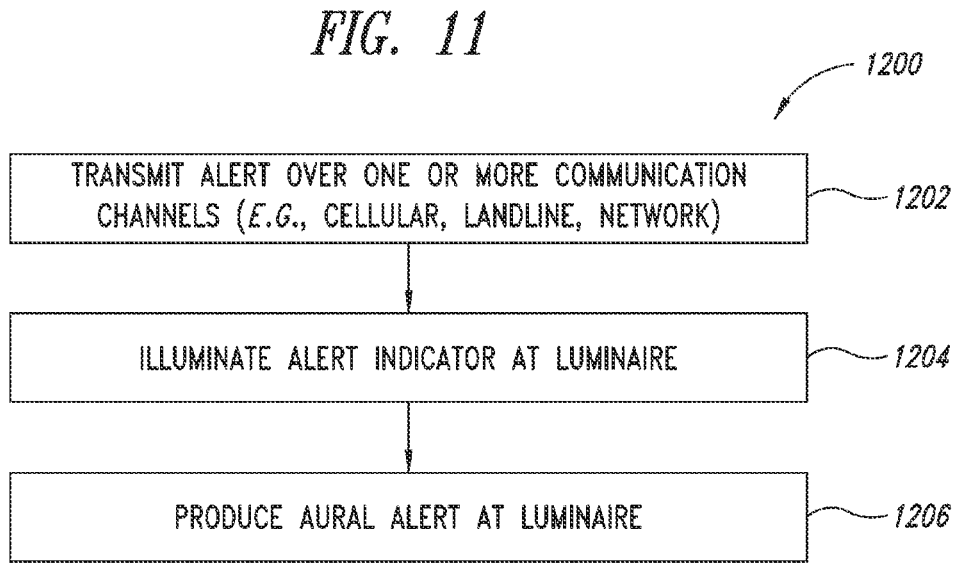
FIG. 12 is a flow diagram showing a low level method of operating a control subsystem of an illumination system to produce a security notification, according to one non-limiting illustrated embodiment.

FIG. 12 shows a low level method 1200 of operating a control subsystem of an illumination system to produce a notification, according to one non-limiting illustrated embodiment. The method 1200 may be employed with the method 700 (FIGS. 17A-17C).

At 1202, at least one component of the illumination system transmits an alert over one or more communications channels. The employed communications channel may take a variety of forms. The data-based alert may take the form of an SMS, text message, or email message over a cellular network. The illumination system may transmit the alert by utilizing the communications protocols of facsimile or DSP over a landline to transmit an alert to a server, telephone, or fax machine. Alternatively, the illumination system may transmit an alert over a wireless network, such as a LAN, WAN, or MAN. The alert may be directed to a central system controlling several illumination systems, a personal computer, or an automated system which initiates video recording of the area proximate to the illumination device.

At 1204, at least one component of the illumination system illuminates an alert at the luminaire and/or remotely therefrom. The illumination system may illuminate one or more lights of uniform or differing colors. The illumination system may illuminate the lights in an alarming pattern, such as rapid flashing, to indicate a error or problem has occurred.

At 1206, at least one component of the illumination system produces an aural alert at the luminaire and/or remotely therefrom. The aural alert may take on a variety of forms. For example, the alert may be a recording which repeats the phrase "an error has been detected." As another example, the alert may be an alarming sound such as a siren, klaxon, repeated horn honks, or a series of chimes that gradually grow louder.

Figure 13:
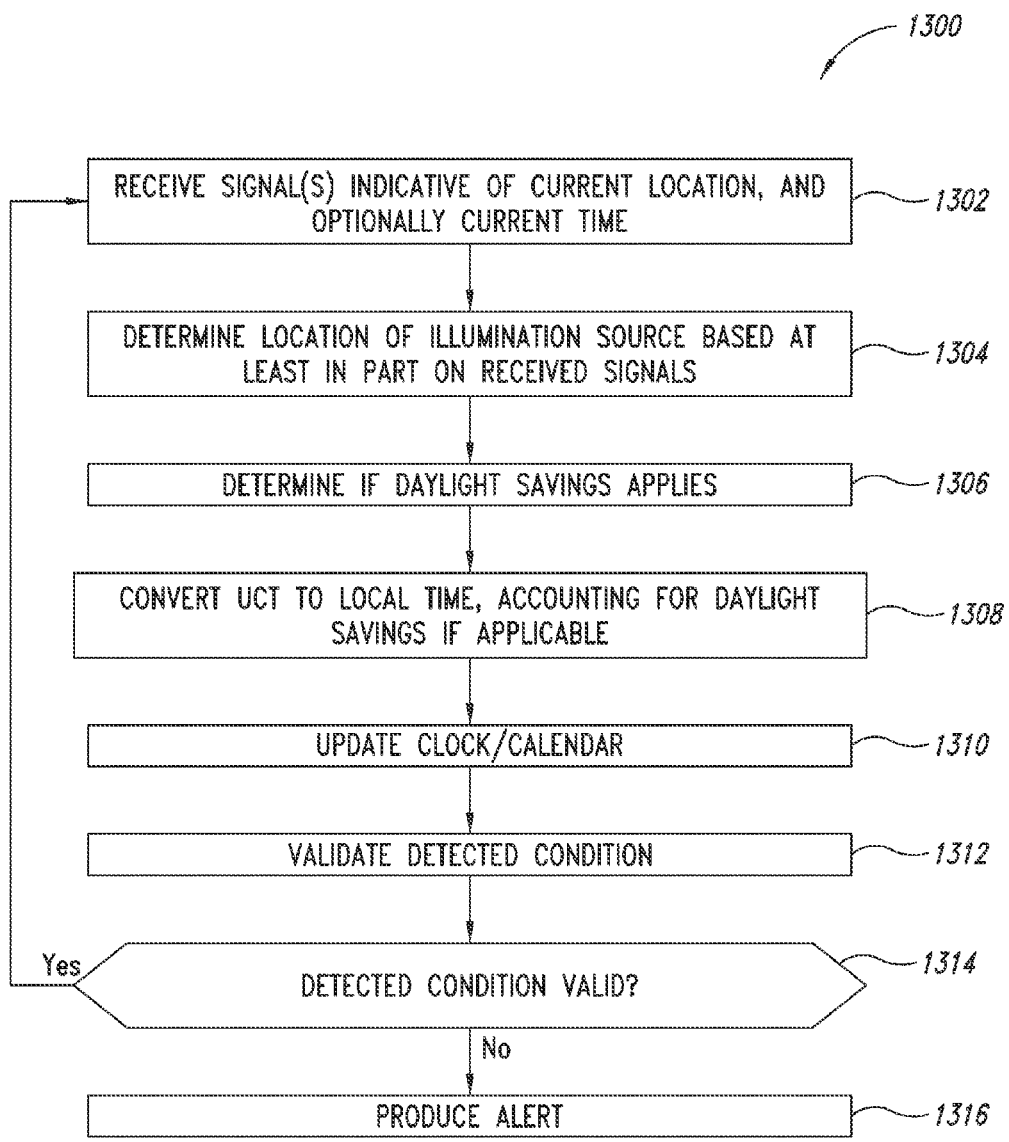
FIG. 13 is a flow diagram showing a high level method of operating a control subsystem of an illumination system, according to another non-limiting illustrated embodiment.

FIG. 13 shows a high level method 1300 of operating a control system of an illumination system to provide illumination, according to one non-limiting illustrated embodiment.

At 1302, at least one component of the illumination system receives one or more signals indicative of a current location of the illumination system. Optionally, the at least one component also receives signals indicative of the current time. For example, an integral control subsystem may include a receiver configured to receive GPS signals, cellular network signals, wireless networks signals, landline signals, radio signals, or the like.

At 1304, at least one component of the illumination system determines the location of the illumination source. The illumination system may include an integral control subsystem that include a microcontroller configured to decode a stream of data, including latitude and longitude data from a receiver such as a GPS receiver, to determine the location of the illumination system. The microcontroller may then store the location in a non-volatile memory. As another example, the microcontroller may be operable to determine the location by querying a receiver which is configured to acquire latitude and longitude data from cellular network radio towers.

At 1306, at least one component of the illumination system determines whether day light saving times applies at a current location. The illumination system may include a real time or solar clock and/or calendar. The clock may be initially set by user input or by synchronizing the clock based upon GPS signals, cellular network signals, radio signals, or other signals received by the receiver. A microprocessor of the illumination system may use a lookup table stored in a non-transitory storage medium or create a database query for the location and date to determine whether: 1) the location employees day light savings time, and if so 2) whether day light savings time is in effect on that date in at the location. Alternatively, the microprocessor may wirelessly query a remote.

At 1308, at least one component such as a microprocessor of the illumination system converts time from one format (e.g., UCT, GMT) to a local time format. Such may include accounting for time zone differences between UCT or GMT and the time zone in which the location is located. Such may also include accounting for day light savings time if in effect for the current location on the current date.

Optionally at 1310, at least one component of the illumination system updates or synchronizes an internal clock and/or calendar based on current time and/or current date information received from one or more external sources.

At 1312, at least one component of the illumination system validates the determined condition. For example, a microprocessor may determine whether the detected level of light is within a threshold of an expected or predicted level of light. The expected level of light may be based upon the determined location of the illumination system on the Earth, the determined current date or season of the year, and/or the determined current time. Also for example, a microprocessor may determine whether an actual time at which an event (e.g., dusk, dawn) occurred or was sensed is within a threshold of an expected time at which the event was predicted to occur or be sensed. The threshold accommodates reasonable differences in actual conditions, for example, amount of cloud cover, phases of the moon, typical amounts of reflection associated with particular areas (e.g. urban, suburban, rural).

At 1314, at least one component of the illumination system determines if the detected condition was determined to be valid. If the actual or detected does not fall within the threshold of the expected, then the condition is considered invalid, and control passes to 1316 where an alert or notification is produced. Otherwise, control returns 1302 and the method 1300 may repeat.

Also, for example, the various methods may include additional acts, omit some acts, and/or may perform the acts in a different order than set out in the various flow diagrams. The use of ordinals such as first, second and third does not necessarily imply a ranked sense of order, but rather may only distinguish between multiple instances of an act or structure.

Also, for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Patent Publication No. US 2009/0278474, published Nov. 12, 2009; U.S. Patent Publication No. US 2009/0284155, published Nov. 19, 2009; U.S. Patent Publication No. US 2010/0090577, published Apr. 15, 2010; U.S. Provisional Patent Application No. 61/051,619 filed May 8, 2008; U.S. Provisional Patent Application No. 61/052,924 filed May 13, 2008; U.S. Provisional Patent Application No. 61/088,651 filed Aug. 13, 2008; U.S. Provisional Patent Application No. 61/115,438 filed Nov. 17, 2008; U.S. Provisional Patent Application No. 61/154,619 filed Feb. 23, 2009; U.S. Provisional Patent Application No. 61/174,913 filed May 1, 2009; U.S. Provisional Patent Application No. 61/180,017 filed May 20, 2009; U.S. Provisional Patent Application No. 61/229,435 filed Jul. 29, 2009; U.S. Non-Provisional patent application Ser. No. 12/619,535, filed Nov. 16, 2009; U.S. Provisional Patent Application No. 61/295,519 filed Jan. 15, 2010; U.S. Non-Provisional patent application Ser. No. 12/769,956, filed Apr. 29, 2010; U.S. Provisional Patent Application Ser. No. 61/333,983, filed May 12, 2010; U.S. Provisional Patent Application Ser. No. 61/346,263, filed May 19, 2010; Nonprovisional patent application Ser. No. 12/784,091, filed May 20, 2010; U.S. Nonprovisional patent application Ser. No. 12/784,093, filed May 20, 2010; and U.S. Nonprovisional patent application Ser. No. 13/085,301, filed Apr. 12, 2011; are incorporated herein by reference, in their entirety. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of controlling operations of an illumination system generally described above.

For example, while the illumination systems are generally described above as embodied in a luminaire, the control subsystem may control multiple luminaires. As used herein and in the claims, luminaire is used in its broadest sense to refer to any lighting fixture or structure. While a single step adjustment downward and upward in the level of illumination has been described and illustrated, illumination level may be adjusted in multiple steps, or even continuously to gradually ramp downward some time after turning ON the light source, then eventually back upward some time before turning OFF the light source. Additionally, or alternatively, the embodiments described herein may be combined with motion or proximity detecting, either as implemented by a luminaire control mechanism or by a retrofit or integral control subsystem.

The microcontroller 314, 514 or control system 406 may be programmable and may include one or more input ports (not illustrated) through which a user can program the microcontroller 314, 514 or control system 406. For example, the time delays and the various illumination levels of the light source may be programmed. The input port may include switches and/or potentiometers that can be set to program the microcontroller 314, 514 or control system 406. Alternatively, the input port may include communications interface for the user to remotely program the microcontroller 314, 514 or control system 406 whether through a wire or wirelessly. The input port may be the ambient light sensor which is connected to the microcontroller 314, 514 or control system 406. For example, the microcontroller 314, 514 or control system 406 may be programmable optically via one or more images captured by an image capture device or imager (not illustrated). For instance, the image sensor may capture images of printed barcode symbols, which encode information used to set delay times and other parameters used by the microcontroller 314, 514 or control system 406. The microcontroller 314, 514 or control system 406 may also receive a one-bit input via the input port to activate or deactivate the light source. For example, a binary bit of "0" turns OFF the light source 110 and a binary bit of "1" turns ON the light source.

Also for example, the control subsystem 312, 512, 406 may further include a communication device. The communication device may be communicatively coupled to the microcontroller 314, 514 or control system 406. The communication device may be further coupled to an external data network using protocols in compliance with any or all of the Ethernet, the RS-485 and wireless communication standards, such as the IEEE 802.11 standards for example, or commercially or proprietary power line carrier control standards. The communication device may be used to remotely program the microcontroller 314, 514 or control system 406. Alternatively, the communication device may be used to transmit information from the control subsystem 312, 512 or control system 406 to a remote user or processor based system. For example, the communication device may be used to transmit a notification signal from the microcontroller 314, 514 or control system 406 indicative of turning ON, turning OFF, increasing or decreasing output from a light source. The communication device may be used to transmit an actuation signal from the microcontroller 314, 514 or control system 406 to actuate a device such as an alarm or an automatic door.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of operating an illumination system including at least one light source and at least one controller, the method comprising:
   detecting a level of light in an ambient environment;
   comparing by the at least one controller the detected level of light in the ambient environment to a first threshold;
   validating by the at least one controller a result of the comparison of the detected level of light in the ambient environment to the first threshold with respect to at least one expected condition, the at least one expected condition comprising an expected level of light for at least one of a current location, a current date or a current time; and
   adjusting by the at least one controller an output of the at least one light source when both the detected level of light in the ambient environment at least satisfies the first threshold and the result of the comparison is valid with respect to the at least one expected condition.

2. The method of claim 1 wherein validating a result of the comparison of the detected level of light in the ambient environment to the first threshold with respect to at least one expected condition includes: comparing by the at least one controller an actual time at which the detected level of light satisfied the first threshold to an expected time when the level of light is predicted to satisfy the first threshold for at least one of a current location or a current date; determining that the result of the comparison is valid when the actual time at which the detected level of light satisfied the first threshold is within a second threshold of the expected time when the level of light is predicted to satisfy the first threshold for the at least one of the current location or the current date; or determining that the result of the comparison is invalid when the actual time at which the detected level of light satisfied the first threshold is not within the second threshold of the expected time when the level of light is predicted to satisfy the first threshold for the at least one of the current location or the current date.

3. The method of claim 1 wherein validating a result of the comparison of the detected level of light in the ambient environment to the first threshold with respect to at least one expected condition includes: comparing by the at least one controller the detected level of light in the ambient environment to an expected level of light for at least one of a current location, a current date or a current time; determining that the result of the comparison is valid when the detected level of light in the ambient environment is within a second threshold of the expected level of light for the at least one of the current location, the current date or the current time; or determining that the result of the comparison is invalid when the detected level of light in the ambient environment is not within the second threshold of the expected level of light for the at least one of the current location, the current date or the current time.

4. The method of claim 3 wherein comparing the detected level of light in the ambient environment to an expected level of light for at least one of a current time or a current location includes comparing the detected level of light to a value indicative of the expected level of light for the current time at the current location.

5. The method of claim 1 wherein detecting a level of light in an ambient environment includes continuously receiving a signal at the at least one controller from an ambient light sensor which is part of the illumination system, the signal indicative of the level of light in the ambient environment.

6. The method of claim 1, further comprising:
   receiving a location signal at the at least one controller indicative of the current location; and
   determining by the at least one controller at least one of an excepted level of light or an expected time at which the level of light is predicted to satisfy the first threshold based on the current location identified by the location signal.

7. The method of claim 6, further comprising:
   receiving a time signal at the at least one controller indicative of the current time.

8. The method of claim 6 wherein receiving a location signal indicative of the current location includes receiving the location signal from a global positioning system receiver.

9. The method of claim 6 wherein receiving a location signal indicative of the current location includes receiving the signal from at least one cellular communications system receiver.

10. The method of claim 1 wherein adjusting an output of the at least one light source when both the detected level of light in the ambient environment at least satisfies the first threshold and the result of the comparison is valid with respect to the at least one expected condition includes turning the at least one light source ON when both the detected level of light in the ambient environment is equal or less than a turn ON threshold and an actual time at which the detected level of light satisfied the first threshold is within a second threshold of the expected time when the level of light is predicted to satisfy the first threshold for the at least one of the current location or the current date.

11. The method of claim 1 wherein adjusting an output of the at least one light source when both the detected level of light in the ambient environment at least satisfies the first threshold and the result of the comparison is valid with respect to the at least one expected condition includes turning the at least one light source ON when both the detected level of light in the ambient environment is equal or less than a turn ON threshold and the detected level of light in the ambient environment is within the second threshold of the expected level of light for the current time at the current location.

12. The method of claim 1 wherein adjusting an output of the at least one light source when both the detected level of light in the ambient environment at least satisfies the first threshold and the result of the comparison is valid with respect to the at least one expected condition includes turning the at least one light source OFF when both the detected level of light in the ambient environment is equal or greater than a turn OFF threshold and an actual time at which the detected level of light satisfied the first threshold is within a second threshold of the expected time when the level of light is predicted to satisfy the first threshold for the at least one of the current location or the current date.

13. The method of claim 1 wherein adjusting an output of the at least one light source when both the detected level of light in the ambient environment at least satisfies the first threshold and the result of the comparison is valid with respect to the at least one expected condition includes turning the at least one light source OFF when both the detected level of light in the ambient environment is equal or greater than a turn OFF threshold and the detected level of light in the ambient environment is within the second threshold of the expected level of light for the current time at the current location.

14. The method of claim 1, further comprising:
reducing the output of the at least one light source to a non-zero level when a first real time in a daily cycle is reached.

15. The method of claim 14, further comprising:
detecting motion at least proximate an area being illuminated; and
in response to the detecting motion, temporally increasing the output of the at least one light source.

16. The method of claim 15, further comprising:
increasing the output of the at least one light source when a second real time in the daily cycle is reached.

17. The method of claim 16 when the result of the comparison is invalid with respect to the at least one expected condition, further comprising:
repeating at least the reducing and the increasing the output of the at least one light source when the first and the second real times, respectively, are reached for a number of additional daily cycles.

18. The method of claim 16 wherein repeating at least the reducing and the increasing the output of the at least one light source when the first and the second real times, respectively, are reached for a number of additional daily cycles, further includes turning ON the at least one light source at a time in a daily cycle that corresponds to dusk and turning OFF the at least one light source at a time in the daily cycle that corresponds to dawn.

19. The method of claim 1, further comprising:
producing by the controller an external notification when the detected level of light in the ambient environment is not within the second threshold of the expected level of light for the current time at the current location.

20. The method of claim 19, further comprising:
in response to determining that the result of the comparison is invalid, causing the output of the at least one light source to be at least proximate a highest level of the at least one light source.

21. A system to control illumination, the system comprising:
at least one controller that:
receives a signal indicative of a level of light in an ambient environment;
compares the detected level of light in the ambient environment to an expected level of light for at least one of a current time or a current location;
compares the detected level of light in the ambient environment to a first threshold;
validates a result of the comparison of the detected level of light in the ambient environment to the first threshold with respect to at least one expected condition, the at least one expected condition comprising an expected level of light for at least one of a current location, a current date or a current time; and
adjusts an output of the at least one light source when both the detected level of light in the ambient environment at least satisfies the first threshold and the result of the comparison is valid with respect to the at least one expected condition.

22. The system of claim 21 wherein to validate a result of the comparison of the detected level of light in the ambient environment to the first threshold with respect to at least one expected condition, the at least one controller: compares an actual time at which the detected level of light satisfied the first threshold to an expected time when the level of light is predicted to satisfy the first threshold for at least one of a current location or a current date; determines that the result of the comparison is valid when the actual time at which the detected level of light satisfied the first threshold is within a second threshold of the expected time when the level of light is predicted to satisfy the first threshold for the at least one of the current location or the current date; or determines that the result of the comparison is invalid when the actual time at which the detected level of light satisfied the first threshold is not within the second threshold of the expected time when the level of light is predicted to satisfy the first threshold for the at least one of the current location or the current date.

23. The system of claim 21 wherein to validate a result of the comparison of the detected level of light in the ambient environment to the first threshold with respect to at least one expected condition, the at least one controller: compares the detected level of light in the ambient environment to an expected level of light for at least one of a current location, a current date or a current time; determines that the result of the comparison is valid when the detected level of light in the ambient environment is within a second threshold of the expected level of light for the at least one of the current location, the current date or the current time; or determines that the result of the comparison is invalid when the detected level of light in the ambient environment is not within the second threshold of the expected level of light for the at least one of the current location, the current date or the current time.

24. The system of claim 23 wherein the at least one controller compares the detected level of light to a value indicative of an expected level of light for the current time at the current location.

25. The system of claim 21, further comprising:
an ambient light sensor, wherein the at least one controller continuously receives a signal from the ambient light sensor, the signal indicative of the level of light in the ambient environment.

26. The system of claim 21 wherein the at least one controller further receives a location signal indicative of the current location; and determines at least one of an excepted level of light or an expected time at which the level of light is predicted to satisfy the first threshold based at least in part on the current location identified by the location signal.

27. The system of claim 26 wherein the at least one controller further receives a time signal indicative of the current time.

28. The system of claim 26, further comprising:
an antenna; and
a global positioning receiver communicatively coupled to the antenna to receive a global positioning signal from a number of global positioning system satellites, wherein the at least one controller is communicatively coupled to the global positioning receiver to receive the location signal indicative of the current location.

29. The system of claim 26, further comprising:
an antenna; and
a cellular communications receiver communicatively coupled to the antenna to receive a cellular communications signal from a number of cellular communications antennas, wherein the at least one controller is communicatively coupled to the cellular communications receiver to receive the location signal indicative of the current location.

30. The system of claim 21 wherein to adjust the output of the at least one light source when both the detected level of light in the ambient environment at least satisfies the first threshold and the result of the comparison is valid with respect to the at least one expected condition the at least one controller turns the at least one light source ON when both the detected level of light in the ambient environment is equal or less than a turn ON threshold and an actual time at which the detected level of light satisfied the first threshold is within a second threshold of the expected time when the level of light is predicted to satisfy the first threshold for the at least one of the current location or the current date.

31. The system of claim 21 wherein to adjust the output of the at least one light source when both the detected level of light in the ambient environment at least satisfies the first threshold and the result of the comparison is valid with respect to the at least one expected condition the at least one controller turns the at least one light source ON when both the detected level of light in the ambient environment is equal or less than a turn ON threshold and the detected level of light in the ambient environment is within the second threshold of the expected level of light for the current time at the current location.

32. The system of claim 21 wherein to adjust the output of the at least one light source when both the detected level of light in the ambient environment at least satisfies the first threshold and the result of the comparison is valid with respect to the at least one expected condition the at least one controller turns the at least one light source OFF when both the detected level of light in the ambient environment is equal or greater than a turn OFF threshold and an actual time at which the detected level of light satisfied the first threshold is within a second threshold of the expected time when the level of light is predicted to satisfy the first threshold for the at least one of the current location or the current date.

33. The system of claim 21 wherein to adjust the output of the at least one light source when both the detected level of light in the ambient environment at least satisfies the first threshold and the result of the comparison is valid with respect to the at least one expected condition the at least one controller turns the at least one light source OFF when both the detected level of light in the ambient environment is equal or greater than a turn OFF threshold and the detected level of light in the ambient environment is within the second threshold of the expected level of light for the current time at the current location.

34. The system of claim 21 wherein the at least one controller reduces the output of the at least one light source to a non-zero level when a first real time in a daily cycle is reached.

35. The system of claim 34 wherein the at least one controller further:
detects motion at least proximate an area being illuminated; and
in response to the detection of motion, temporally increases the output of the at least one light source.

36. The system of claim 35 wherein the at least one controller, further:
increases the output of the at least one light source when a second real time in the daily cycle is reached.

37. The system of claim 36 wherein when the result of the comparison is invalid with respect to the at least one expected condition, the at least one controller further:
repeats at least the reducing and the increasing the output of the at least one light source when the first and the second real times, respectively, are reached for a number of additional daily cycles.

38. The system of claim 36 wherein repeating at least the reducing and the increasing the output of the at least one light source when the first and the second real times, respectively, are reached for a number of additional daily cycles, further includes turning ON the at least one light source at a time in a daily cycle that corresponds to dusk and turning OFF the at least one light source at a time in the daily cycle that corresponds to dawn.

39. The system of claim 21 wherein the at least one controller further produces an external notification when the detected level of light in the ambient environment is not within the second threshold of the expected level of light for the current time at the current location.

40. The system of claim 39 wherein when the result of the comparison is invalid with respect to the at least one expected condition the at least one controller causes the output of the at least one light source to be at least proximate a highest level of the at least one light source.

41. The system of claim 21, further comprising:
the at least one light source.

* * * * *